(12) United States Patent
Goto et al.

(10) Patent No.: US 10,367,194 B2
(45) Date of Patent: Jul. 30, 2019

(54) SECONDARY BATTERY AND MANUFACTURING METHOD OF THE SAME

(71) Applicant: Semiconductor Energy Laboratory Co., LTD., Atsugi-shi, Kanagawa-ken (JP)

(72) Inventors: Junya Goto, Kanagawa (JP); Mako Motoyoshi, Kanagawa (JP); Yuika Sato, Kanagawa (JP); Takahiro Kawakami, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 14/921,126

(22) Filed: Oct. 23, 2015

(65) Prior Publication Data
US 2016/0126541 A1 May 5, 2016

(30) Foreign Application Priority Data
Oct. 24, 2014 (JP) .................................. 2014-217229

(51) Int. Cl.
| | |
|---|---|
| H01M 4/36 | (2006.01) |
| H01M 4/04 | (2006.01) |
| H01M 4/131 | (2010.01) |
| H01M 4/133 | (2010.01) |
| H01M 4/485 | (2010.01) |
| H01M 4/587 | (2010.01) |
| H01M 4/134 | (2010.01) |
| H01M 4/62 | (2006.01) |

(Continued)

(52) U.S. Cl.
CPC ......... H01M 4/364 (2013.01); H01M 4/0445 (2013.01); H01M 4/131 (2013.01); H01M 4/133 (2013.01); H01M 4/134 (2013.01); H01M 4/485 (2013.01); H01M 4/587 (2013.01); H01M 4/625 (2013.01); H01M 4/70 (2013.01); *H01M 2004/027* (2013.01)

(58) Field of Classification Search
None
See application file for complete search history.

(56) References Cited

U.S. PATENT DOCUMENTS

| | | |
|---|---|---|
| 6,461,769 B1 | 10/2002 | Ando et al. |
| 6,740,454 B1 | 5/2004 | Ando et al. |

(Continued)

FOREIGN PATENT DOCUMENTS

| | | |
|---|---|---|
| JP | 2012-038528 A | 2/2012 |
| JP | 2013-089606 A | 5/2013 |
| WO | WO-2007/074654 | 7/2007 |

*Primary Examiner* — Carmen V Lyles-Irving
(74) *Attorney, Agent, or Firm* — Nixon Peabody LLP; Jeffrey L. Costellia

(57) ABSTRACT

A negative electrode and a secondary battery including the negative electrode are provided. A plurality of projections and depressions are provided in a negative electrode active material layer and a negative electrode current collector. The plurality of projections and depressions in the negative electrode active material layer absorb expansion of the negative electrode active material and suppress deformation thereof. The plurality of projections and depressions in the negative electrode current collector suppress deformation of the negative electrode current collector caused by expansion and contraction of the negative electrode active material.

10 Claims, 32 Drawing Sheets

(51) Int. Cl.
  *H01M 4/70* (2006.01)
  *H01M 4/02* (2006.01)

(56) References Cited

U.S. PATENT DOCUMENTS

| | | |
|---|---|---|
| 2009/0123840 A1 | 5/2009 | Shirane et al. |
| 2010/0209784 A1 | 8/2010 | Yamazaki et al. |
| 2010/0277443 A1 | 11/2010 | Yamazaki et al. |
| 2010/0277448 A1 | 11/2010 | Okamoto et al. |
| 2012/0208084 A1* | 8/2012 | Hiraoka ............ H01M 4/134 429/211 |
| 2013/0071739 A1 | 3/2013 | Tajima et al. |
| 2013/0071751 A1 | 3/2013 | Tajima et al. |
| 2013/0071762 A1 | 3/2013 | Tajima et al. |
| 2013/0084495 A1 | 4/2013 | Tajima et al. |
| 2013/0143090 A1 | 6/2013 | Hosoya et al. |
| 2013/0149605 A1 | 6/2013 | Kakehata et al. |
| 2013/0164611 A1 | 6/2013 | Nanba et al. |
| 2014/0127576 A1* | 5/2014 | Kato ............ H01M 4/131 429/213 |
| 2014/0186686 A1 | 7/2014 | Takahashi et al. |
| 2015/0243962 A1 | 8/2015 | Hiroki et al. |
| 2015/0340691 A1 | 11/2015 | Inoue et al. |

\* cited by examiner

FIG. 3A1
111
FIG. 3A2
111
FIG. 3A3
111
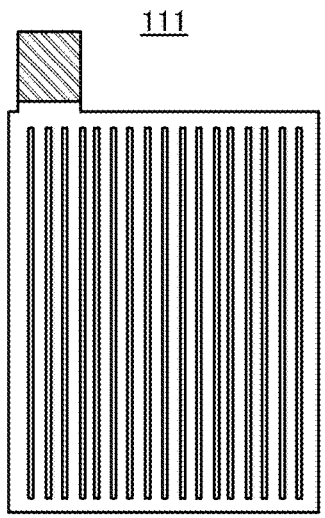
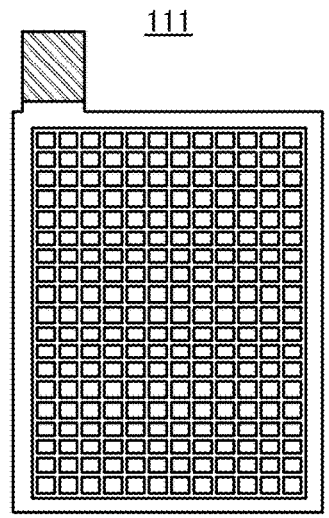
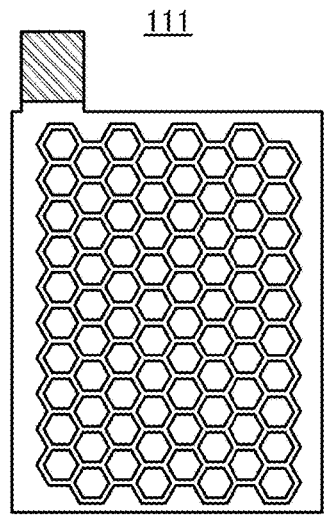
FIG. 3B1
FIG. 3B2
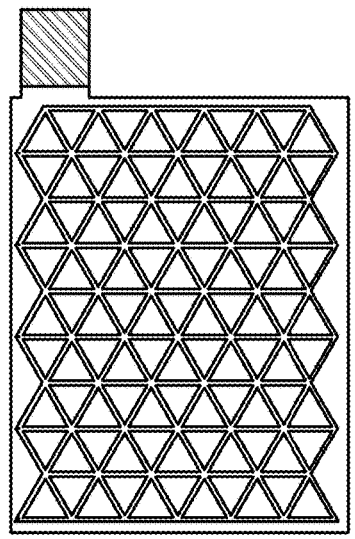
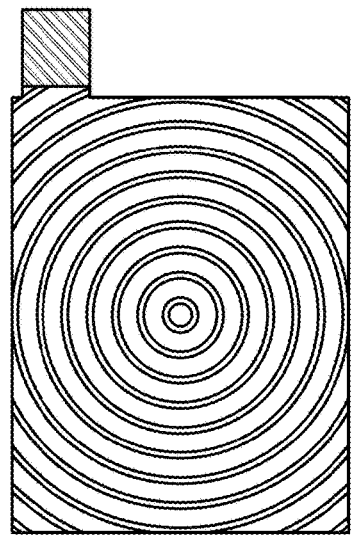

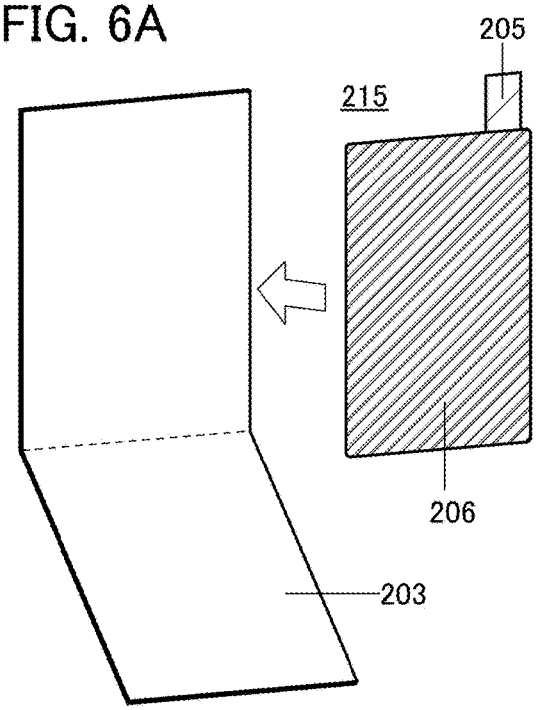
FIG. 6A
FIG. 6B
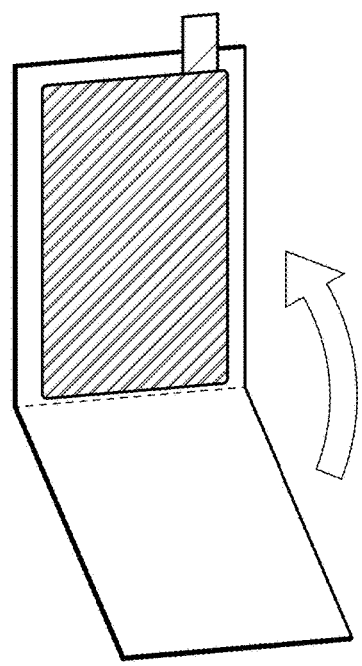
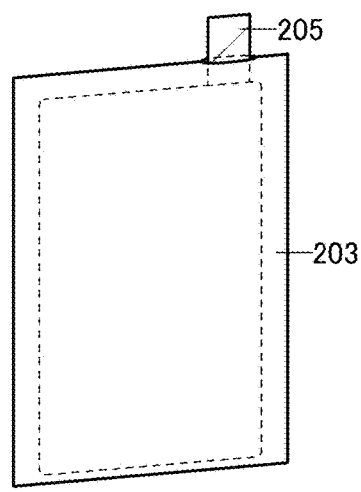
FIG. 6C
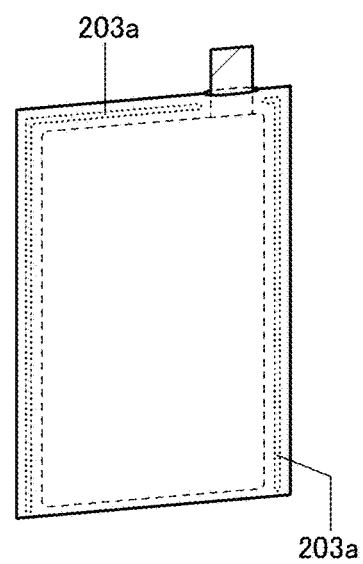
FIG. 6D

FIG. 8A
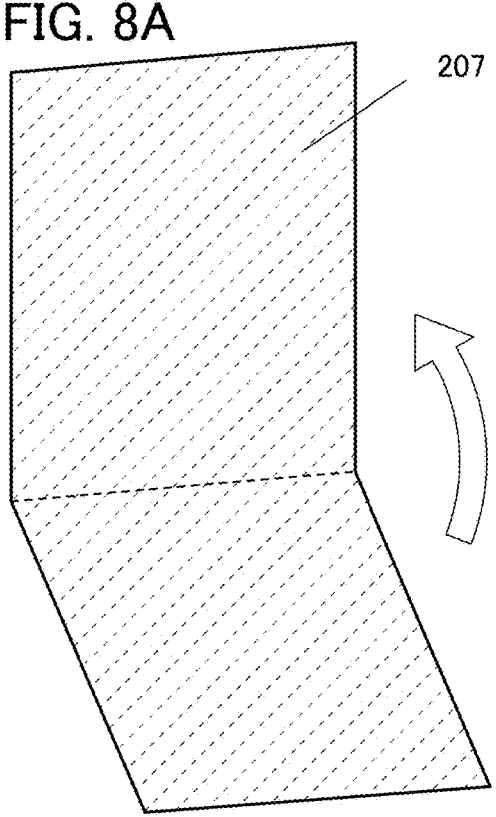
FIG. 8B
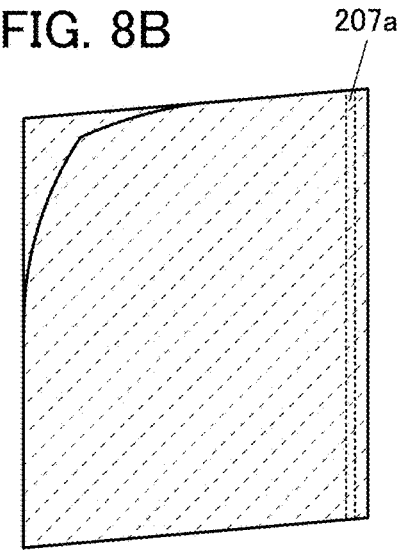
FIG. 8C
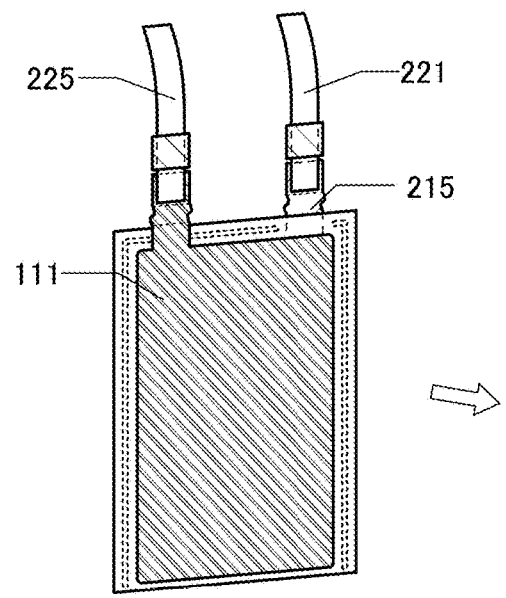
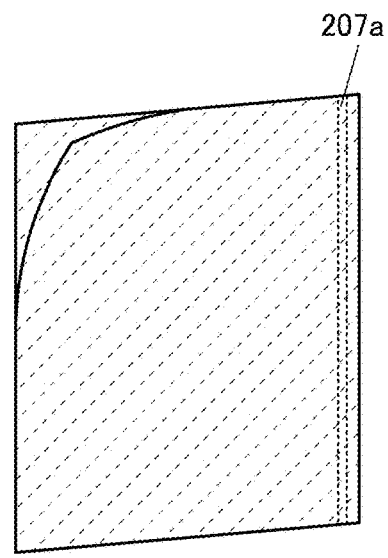

FIG. 13A
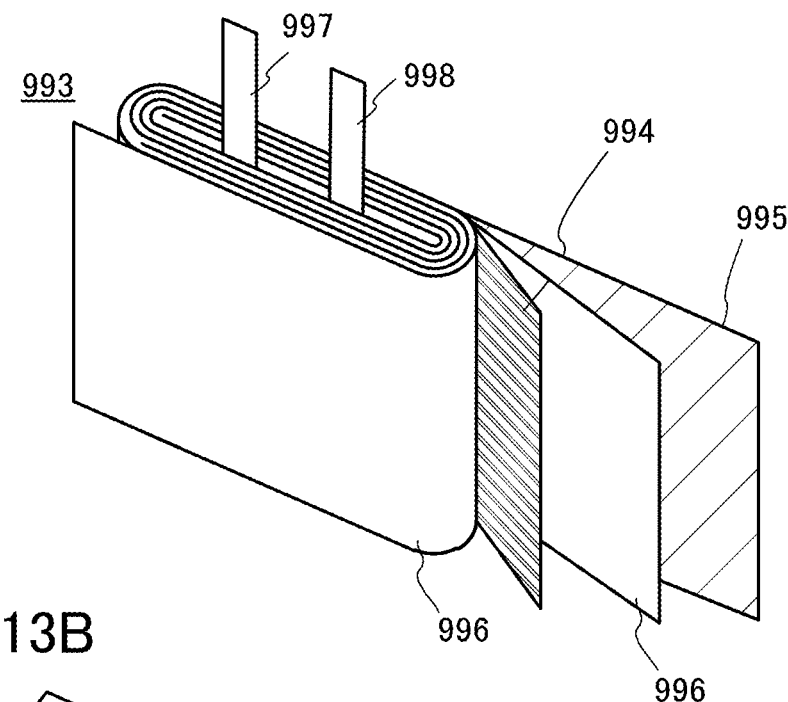
FIG. 13B
FIG. 13C
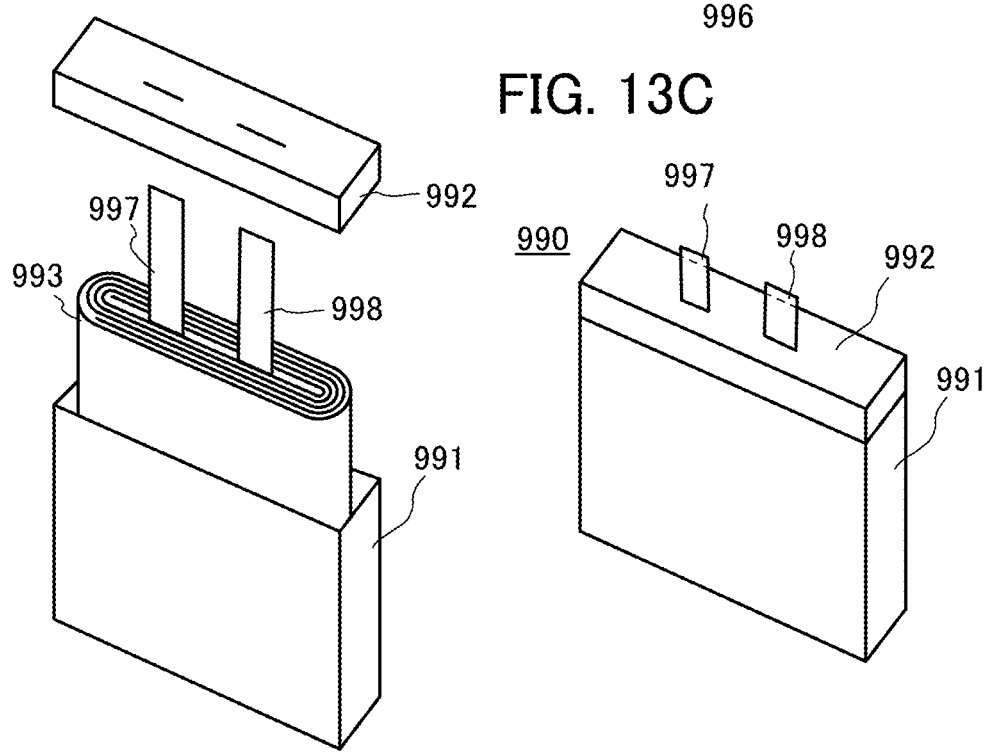

FIG. 15A1
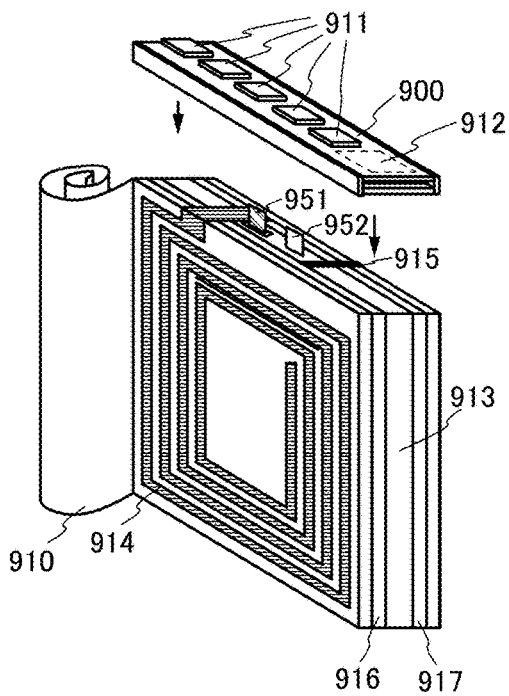
FIG. 15A2
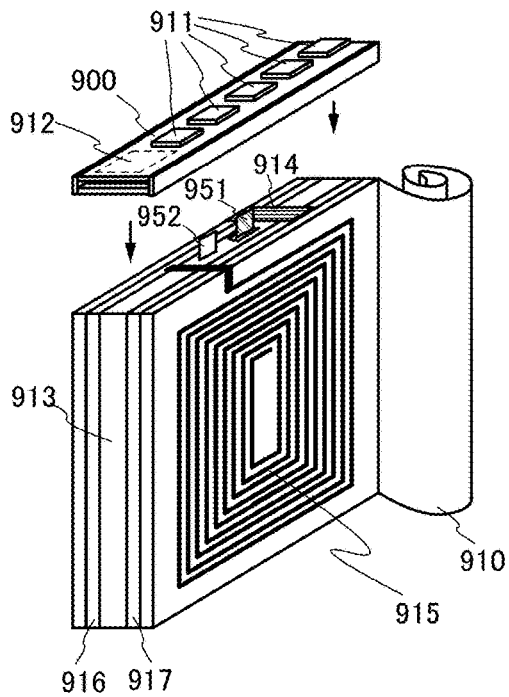
FIG. 15B1
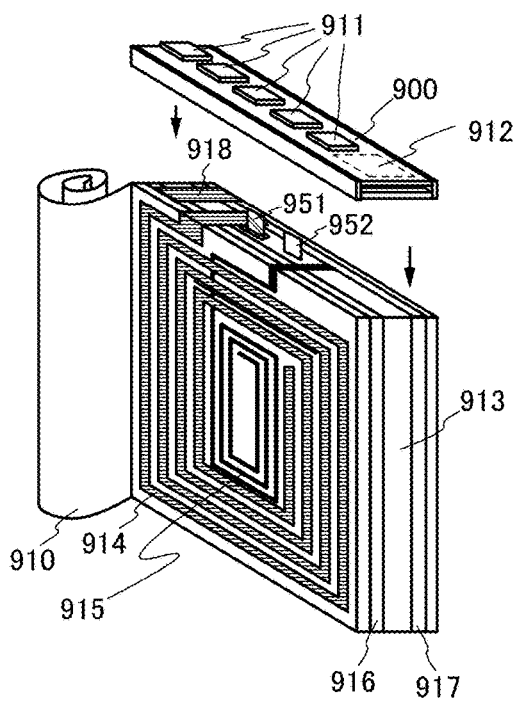
FIG. 15B2
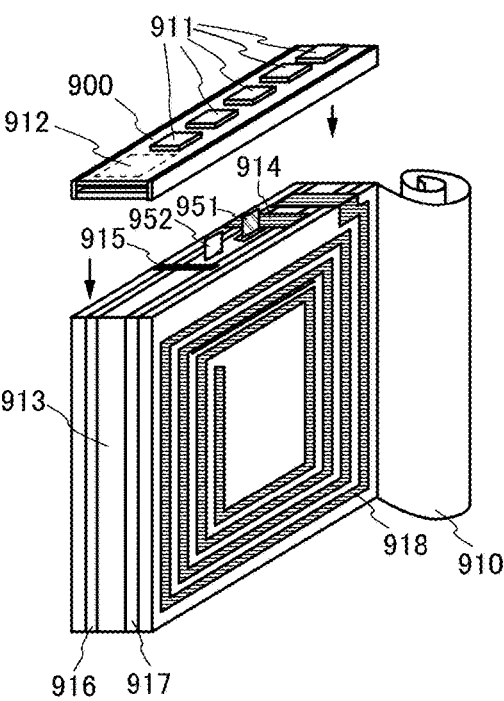

BT00

SECONDARY BATTERY AND MANUFACTURING METHOD OF THE SAME

BACKGROUND OF THE INVENTION

1. Field of the Invention

The present invention relates to an object, a method, or a manufacturing method. In addition, the present invention relates to a process, a machine, manufacture, or a composition of matter. In particular, one embodiment of the present invention relates to a semiconductor device, a display device, a light-emitting device, a power storage device, an imaging device, a driving method thereof, or a manufacturing method thereof. In particular, one embodiment of the present invention relates to a negative electrode for a secondary battery and a secondary battery.

2. Description of the Related Art

As portable information terminals typified by smart phones and tablet terminals and mobile devices such as laptop personal computers and portable game machines became popular, secondary batteries having high energy density which are small and lightweight became urgently necessary, and some of them have been developed in recent years.

It is important to increase capacity density of a negative electrode in order to increase the energy density of a secondary battery. Graphite, which is widely used as a negative electrode active material of a lithium-ion secondary battery, has a theoretical density of capacity of 372 mAh/g, and already has 360 mAh/g or more capacity density which is close to the theoretical capacity.

To further increase the energy density of a secondary battery, a negative electrode active material with higher theoretical density of capacity has been examined, and silicon (Si), tin (Sn), germanium (Ge), and gallium (Ga) which are alloyed with lithium, an oxide thereof, an alloy thereof, and the like have attracted attention.

For example, Patent Document 1 and Patent Document 2 disclose a secondary battery in which a material containing silicon is used for a negative electrode active material.

REFERENCE

Patent Document

[Patent Document 1] International Publication WO 2007/074654 Pamphlet
[Patent Document 2] Japanese Published Patent Application No. 2012-38528

SUMMARY OF THE INVENTION

However, the volume of these materials alloyed with lithium, an oxide thereof, an alloy thereof, or the like is greatly changed due to charging and discharging. For example, the volume of the alloy of silicon and lithium increases to be approximately 4 times that of silicon.

This causes a problem in that, for example, a negative electrode active material is pulverized and separated from a current collector because of repeated expansion and contraction, or a negative electrode current collector is stretched as the volume of the negative electrode active material increases, leading to wrinkles in the negative electrode current collector. The separation of the negative electrode active material reduces the capacity of a secondary battery. In addition, when large wrinkles are generated in the negative electrode current collector, the volume of the secondary battery including an exterior body is increased, whereby the energy density of the secondary battery is decreased.

Thus, an object of one embodiment of the present invention is to provide a novel negative electrode for a secondary battery and a novel secondary battery. Specifically, an object of one embodiment of the present invention is to provide a negative electrode which can absorb expansion of a negative electrode active material when the negative electrode active material is alloyed, and a secondary battery including the negative electrode.

An object of one embodiment of the present invention is to provide a novel power storage device, a novel negative electrode, an electronic device on which a secondary battery including the negative electrode is provided, or the like. Note that the descriptions of these objects do not disturb the existence of other objects. In one embodiment of the present invention, there is no need to achieve all the objects. Other objects will be apparent from and can be derived from the description of the specification, the drawings, the claims, and the like.

In order to achieve any of the above objects, in one embodiment of the present invention, a plurality of projections and depressions are provided in a negative electrode active material layer and a negative electrode current collector. The plurality of projections and depressions provided in the negative electrode active material layer absorb expansion of the negative electrode active material and suppress deformation of the negative electrode active material layer. In addition, a plurality of projections and depressions provided in the negative electrode current collector suppress deformation of the negative electrode current collector caused by expansion and contraction of the negative electrode active material.

One embodiment of the present invention is a secondary battery including a negative electrode, a positive electrode, an electrolyte solution, and a separator. The negative electrode includes a negative electrode current collector and a negative electrode active material layer. The negative electrode active material layer includes a compound containing silicon as a negative electrode active material. The negative electrode active material layer has a first pair of a projection and a depression and a second pair of a projection and a depression. The negative electrode current collector has a third pair of a projection and a depression and a fourth pair of a projection and a depression. The first pair of the projection and the depression of the negative electrode active material layer and the third pair of the projection and the depression of the negative electrode current collector overlap with each other. The second pair of the projection and the depression of the negative electrode active material layer and the fourth pair of the projection and the depression of the negative electrode current collector overlap with each other.

According to one embodiment of the present invention, a novel negative electrode for a secondary battery and a secondary battery can be provided. Specifically, a negative electrode which can absorb expansion of a negative electrode active material when the negative electrode active material is alloyed, and a secondary battery including the negative electrode can be provided.

Furthermore, a novel power storage device, a novel negative electrode for a secondary battery, an electronic device including a secondary battery, or the like can be provided. Note that the description of these effects does not disturb the existence of other effects. One embodiment of the present invention does not necessarily achieve all the objects listed above. Other effects will be apparent from and can be

BRIEF DESCRIPTION OF THE DRAWINGS

FIGS. 3A1, 3A2, 3A3, 3B1, and 3B2 are top views of a negative electrode which can be used in a secondary battery.

FIGS. 6A to 6D illustrate an example of a manufacturing method of a secondary battery.

FIGS. 8A to 8C illustrate an example of a manufacturing method of a secondary battery.

FIGS. 13A to 13C illustrate an example of a secondary battery.

FIGS. 15A1, 15A2, 15B1, and 15B2 illustrate an example of a power storage system.

DETAILED DESCRIPTION OF THE INVENTION

Figure 1A:
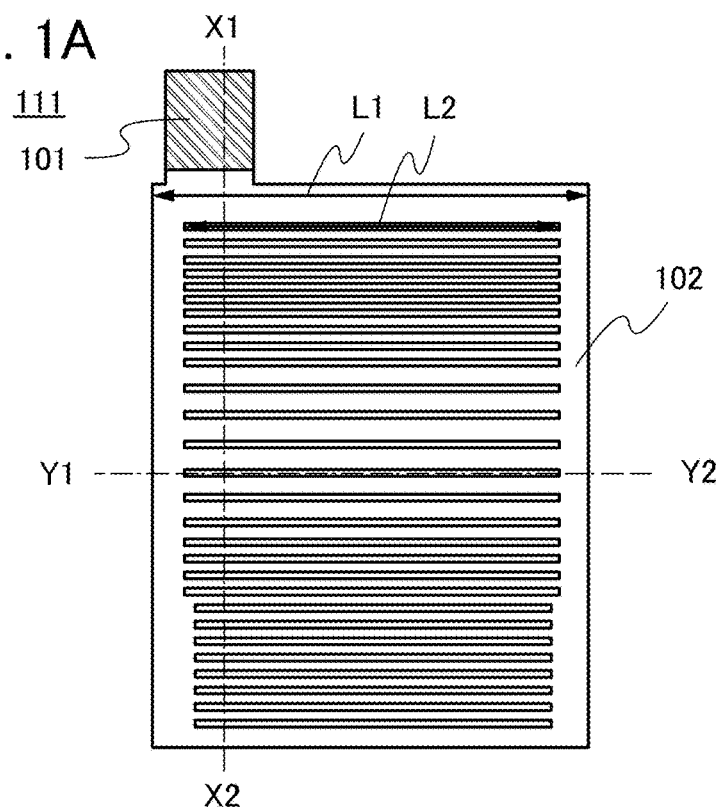
FIG. 1A is a top view of a negative electrode which can be used in a secondary battery and FIGS. 1B and 1C are cross-sectional views thereof.

Embodiments of the present invention will be described below in detail with reference to the drawings. However, the present invention is not limited to the description below, and it is easily understood by those skilled in the art that modes and details disclosed herein can be modified in various ways. Further, the present invention is not construed as being limited to description of the embodiments and the examples.

The term "electrically connected" includes the case where components are connected through an "object having any electric function". There is no particular limitation on the "object having any electric function" as long as electric signals can be transmitted and received between the components connected through the object.

Note that the position, size, length, range, or the like of each structure illustrated in the drawings and the like is not accurately represented in some cases for easy understanding. Therefore, the disclosed invention is not necessarily limited to the position, the size, the length, the range, or the like disclosed in the drawings and the like.

The ordinal number such as "first", "second", and "third" are used to avoid confusion among components.

Embodiment 1

In this embodiment, a negative electrode which can be used in a secondary battery of one embodiment of the present invention is described with reference to FIGS. 1A to 1C, FIGS. 2A to 2D, and FIGS. 3A1, 3A2, 3A3, 3B1, and 3B2.

Figure 1B:
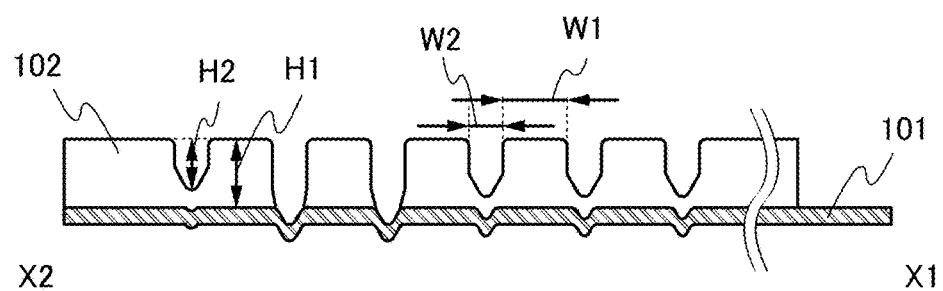
Figure 1C:
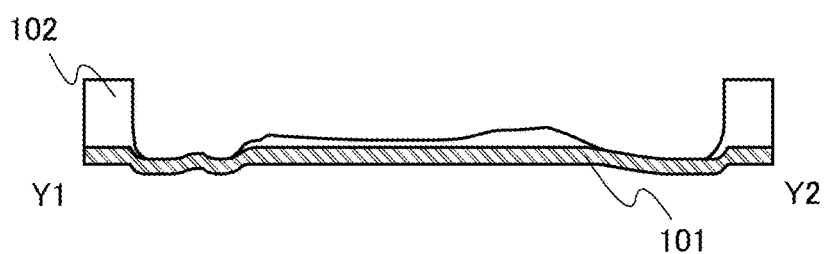

FIG. 1A is a top view of a negative electrode 111 which can be used in the secondary battery of one embodiment of the present invention, and FIG. 1B is a cross-sectional view taken along line X1-X2 in FIG. 1A, and FIG. 1C is a cross-sectional view taken along line Y1-Y2 in FIG. 1A.

The negative electrode 111 includes a negative electrode current collector 101 and a negative electrode active material layer 102 formed over the negative electrode current collector 101. The negative electrode active material layer 102 includes a negative electrode active material. The negative electrode active material layer 102 may further include a binder for increasing adhesion of negative electrode active materials, a conductive additive for increasing the conductivity of the negative electrode active material layer, and the like.

There is no particular limitation on the materials used for the negative electrode current collector 101 as long as it has high conductivity without causing a significant chemical change in the secondary battery. For example, the current collector can be formed using a metal such as gold, platinum, iron, nickel, copper, aluminum, titanium, tantalum, or manganese, or an alloy thereof (e.g., stainless steel). Furthermore, coating with carbon, nickel, titanium, or the like may be performed. Silicon, neodymium, scandium, molybdenum, or the like may be added to improve heat resistance. The current collector can each have any of various shapes including a foil-like shape, a sheet-like shape, a plate-like shape, a net-like shape, a cylindrical shape, a coil shape, a punching-metal shape, an expanded-metal shape, a porous shape, and a shape of non-woven fabric as appropriate. The current collector may be formed to have micro irregularities on the surface thereof in order to enhance adhesion to the active material. The current collector preferably has a thickness of more than or equal to 5 µm and less than or equal to 30 µm.

As a negative electrode active material included in the negative electrode active material layer 102, a material which enables charge-discharge reaction by alloying and dealloying reaction with lithium ion can be used. Typically, silicon (Si), tin (Sn), zinc (Zn), germanium (Ge), gallium (Ga), an oxide thereof, an alloy thereof, and the like can be given. The use of a material which can be alloyed with lithium, an oxide thereof, an alloy thereof, and the like enables the secondary battery with higher capacity than that in the case of using a carbon-based negative electrode material. Therefore, it is particularly preferable to use a material containing silicon such as SiO as a negative electrode active material.

Note that SiO refers to the powder of a silicon oxide including a silicon-rich portion and can also be referred to as $SiO_y$ (2>y>0). Examples of SiO include a material containing one or more of $Si_2O_3$, $Si_3O_4$, and $Si_2O$ and a mixture of Si powder and silicon dioxide ($SiO_2$). In particular, Si particles with a particle size of less than or equal to 10 µm are preferably dispersed in each of SiO particles. When small Si particles are dispersed in each of SiO particles, a crack of SiO particles caused by expansion and contraction of Si can be suppressed. Here, a composition of the SiO particle is preferably within a range of $SiO_y$ (0.95≤y≤1.05). Furthermore, SiO may contain another element (e.g., carbon, nitrogen, iron, aluminum, copper, titanium, calcium, and manganese). In other words, SiO refers to a colored material containing two or more of single crystal silicon, amorphous silicon, polycrystal silicon, $Si_2O_3$, $Si_3O_4$, $Si_2O$, and $SiO_2$. Thus, SiO can be distinguished from $SiO_x$ (x is 2 or more), which is clear and colorless or white. Note that in the case where a secondary battery is fabricated using SiO as a material thereof and the SiO is oxidized because of repeated charge and discharge cycles, SiO is changed into $SiO_2$ in some cases.

As another example of a material which enables charge-discharge reaction by alloying and dealloying reaction with lithium ion, a material containing at least one of Mg, Ca, Al, Ge, Sn, Pb, As, Sb, Bi, Ag, Au, Zn, Cd, Hg, In, and the like can be used. Examples of an alloy-based material using such elements include $Mg_2Si$, $Mg_2Ge$, SnO, $SnO_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, SbSn, and the like.

As a binder which can be used in the negative electrode active material layer 102, polyimide, PVDF, polytetrafluoroethylene, polyvinyl chloride, ethylene-propylene-diene polymer, styrene-butadiene rubber, acrylonitrile-butadiene rubber, fluorine rubber, polyvinyl acetate, polymethyl methacrylate, polyethylene, nitrocellulose, or the like is given. Polyimide is particularly preferable because polyimide can withstand expansion and contraction of the negative electrode active material due to charging and discharging.

As a conductive additive which can be used in the negative electrode active material layer 102, acetylene black, graphene, graphite, graphene oxide, graphite oxide, a carbon nanotube, fullerene or the like is given.

The negative electrode current collector 101 and the negative electrode active material layer 102 each have a plurality of projections and depressions. In addition, the projections and depressions of the negative electrode current collector 101 and those of the negative electrode active material layer 102 overlap with each other. In FIGS. 1A to 1C, the negative electrode current collector 101 and the negative electrode active material layer 102 have a plurality of linear depressions which are parallel to each other.

As illustrated in FIGS. 1B and 1C, the depression of the negative electrode active material layer 102 may have a shallower depth than the thickness of the negative electrode active material layer 102, or may be deep enough to expose the negative electrode current collector 101. In other words, the negative electrode current collector 101 may be exposed at part of the bottoms of the depressions of the negative electrode active material layer 102. Furthermore, the depressed portions with different depths may be formed. As illustrated in FIG. 1A, the depressed portions may be provided with different intervals.

The depressions in the negative electrode active material layer 102 can absorb expansion of the negative electrode active material and suppress the deformation of the negative electrode active material layer 102 even when a negative electrode active material having a large volume change caused by charging and discharging is used. Thus, it is possible to suppress separation of the negative electrode active material from the current collector due to pulverization caused by repetitive volume expansion and contraction, and improve the cycle characteristics of the secondary battery. Since wrinkles in the negative electrode current collector 101, which are generated when the negative electrode current collector 101 is stretched as the volume of the negative electrode active material increases, can be suppressed, the volume increase of the negative electrode can be suppressed, so that a decrease in energy density of the secondary battery can be prevented.

In addition, depressions in the negative electrode current collector 101 can suppress deformation of the negative electrode current collector caused by expansion and contraction of the negative electrode active material.

The region where projections and depressions are formed in the negative electrode current collector 101 and the negative electrode active material layer 102 is preferably a region overlapping with a positive electrode when incorporated in the secondary battery. This is because a negative electrode active material largely expands and contracts in its region overlapping with the positive electrode. Therefore, it is preferable that a length L2 of the depression in the negative electrode current collector 101 and the negative electrode active material layer 102 illustrated in FIG. 1A be approximately the same as a width of the overlapping positive electrode.

It is effective to make the area of the negative electrode 111 larger than that of the positive electrode in order to suppress lithium deposition on the surface of the negative electrode 111 caused by charging and discharging of the secondary battery. However, in the case where the difference in area between the positive electrode and the negative electrode 111 is too large, the energy density of the secondary battery is decreased. Therefore, for example, the length L2 of the depression is preferably 80% or more and 100% or less of a length L1 of a side of the negative electrode current collector 101 which is parallel to the depression, more preferably 85% or more and 98% or less of the length L1.

A depth H2 of a depression of the negative electrode active material layer 102 is preferably as deep as possible, in which case expansion of the negative electrode active material can be absorbed more easily. Therefore, H2 is preferably 90% or more and 100% or less of a thickness H1 of the negative electrode active material layer 102, for example.

A smaller width W1 between adjacent depressions in the negative electrode current collector 101 and the negative electrode active material layer 102 is advantageous in absorbing expansion of the negative electrode active material; however, when W1 is too small, the negative electrode capacity is decreased and energy density of the secondary battery is decreased. Therefore, W1 is preferably greater than or equal to 0.1 mm and less than or equal to 5 mm, more preferably greater than or equal to 0.5 mm and less than or equal to 2 mm, for example.

A larger width W2 of a depression in the negative electrode current collector 101 and the negative electrode active material layer 102 is advantageous in absorbing the expansion of the negative electrode active material; however, when W2 is too large, the negative electrode capacity is decreased and energy density of the secondary battery is decreased. Therefore, W2 is preferably less than or equal to W1. W2 is preferably greater than or equal to 0.1 mm and less than or equal to 1 mm, more preferably greater than or equal to 0.25 mm and less than or equal to 0.45 mm.

Figure 2A:
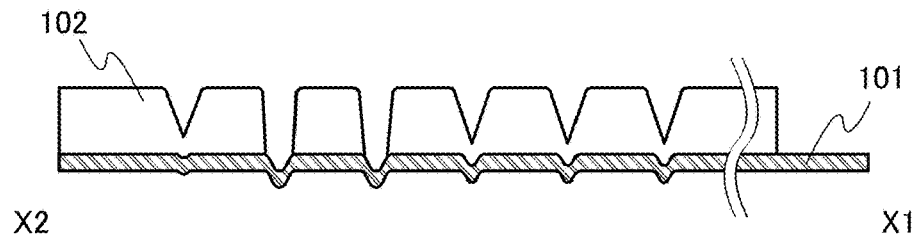
FIGS. 2A to 2D are cross-sectional views of a negative electrode which can be used in a secondary battery.
Figure 2B:
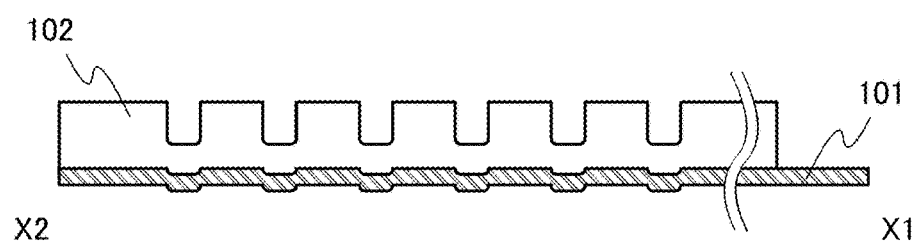

The shape of the projections and depressions of the negative electrode active material layer 102 and the negative electrode current collector 101 is not limited to that illustrated in FIGS. 1A to 1C. For example, the depression may have a shape close to a triangular prism as illustrated in FIG. 2A. Alternatively, for example, the depression may have a shape close to a quadrangular prism as illustrated in FIG. 2B.

Figure 2C:
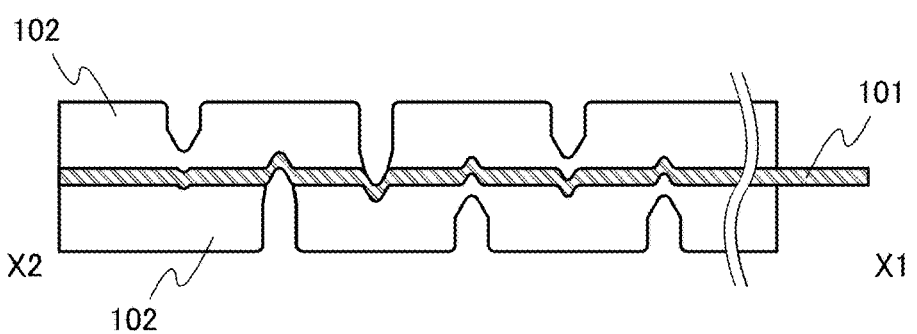
Figure 2D:
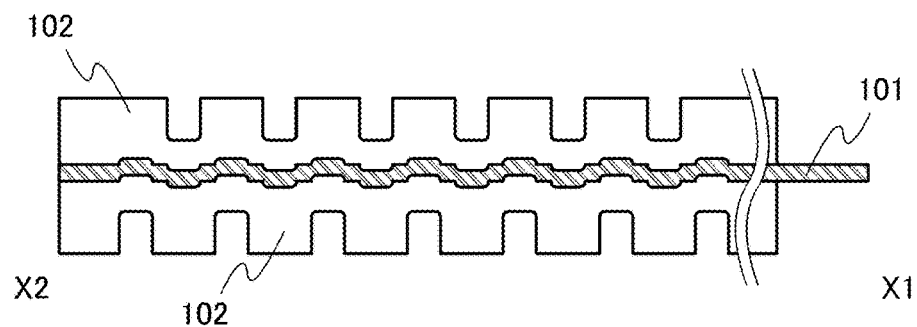

Furthermore, although the negative electrode active material layer 102 is formed on one surface of the negative electrode current collector 101 in FIGS. 1A to 1C and FIGS. 2A and 2B, the negative electrode active material layer 102 may be formed on both surfaces of the negative electrode current collector 101 as illustrated in FIGS. 2C and 2D. Forming the negative electrode active material layer 102 on both surfaces of the negative electrode current collector 101 increases the capacity of the secondary battery.

In the case where the negative electrode active material layer 102 is formed on both surfaces of the negative electrode current collector 101, it is preferable that the positions of the depressions in one surface of the negative electrode active material layer 102 do not align with those of the depressions in the other surface of the negative electrode active material layer 102 as illustrated in FIGS. 2C and 2D. This is because the strength of the negative electrode current collector 101 might be reduced when positions of the depressions on the both surfaces align with each other.

Furthermore, the pattern of forming projections and depressions is not limited to those illustrated in FIGS. 1A and 1B and FIGS. 2A to 2D. For example, as illustrated in FIG. 3A1, the uneven pattern of the negative electrode active material layer 102 and the negative electrode current collector 101 may be formed parallel to the long side of the negative electrode current collector 101. Alternatively, as illustrated in FIG. 3A2, the uneven pattern may be a lattice pattern. Alternatively, as illustrated in FIG. 3A3, the uneven pattern may be a pattern that is formed by a series of continuing hexagonal shapes. Alternatively, as illustrated in FIG. 3B1, the uneven pattern may be a pattern that is formed by a series of continuing triangles. Alternatively, as illustrated in FIG. 3B2, the uneven pattern may be a pattern of concentric circles.

In Embodiment 1, one embodiment of the present invention has been described. Other embodiments of the present invention are described in Embodiments 2 to 8. Note that one embodiment of the present invention is not limited to the above examples. That is, since various embodiments of the present invention are disclosed in Embodiment 1 and Embodiments 2 to 8, one embodiment of the present invention is not limited to a specific embodiment. The example in which one embodiment of the present invention is applied to a lithium-ion secondary battery is described; however, one embodiment of the present invention is not limited thereto. Depending on circumstances or conditions, one embodiment of the present invention may be applied to a variety of secondary batteries such as a lead storage battery, a lithium-ion polymer secondary battery, a nickel-hydrogen storage battery, a nickel-cadmium storage battery, a nickel-iron storage battery, a nickel-zinc storage battery, a silver oxide-zinc storage battery, a solid-state battery, and an air battery, a primary battery, a capacitor, a lithium ion capacitor, and the like. Alternatively, for example, depending on circumstances or conditions, one embodiment of the present invention is not necessarily applied to a lithium-ion secondary battery. For example, the example in which the negative electrode current collector or the negative electrode active material has projections and depressions is described; however, one embodiment of the present invention is not limited to thereto. Alternatively, for example, depending on circumstances or conditions, a material other than the negative electrode current collector or the negative electrode current material layer may have projections and depressions. Alternatively, for example, depending on circumstances or conditions, the negative electrode current collector or the negative electrode current material layer may have a shape other than projections and depressions in one embodiment of the present invention. Alternatively, for example, depending on circumstances or conditions, the negative electrode current collector and the negative electrode active material layer do not necessarily have projections and depressions in one embodiment of the present invention.

Embodiment 2

In one embodiment of the present invention, a specific structure and a specific material of the secondary battery of one embodiment of the present invention are described with reference to FIG. 4 and FIGS. 5A and 5B. In this embodiment, an example where one of a positive electrode and a negative electrode is covered with a bag-shaped separator will be described below.

Figure 4:
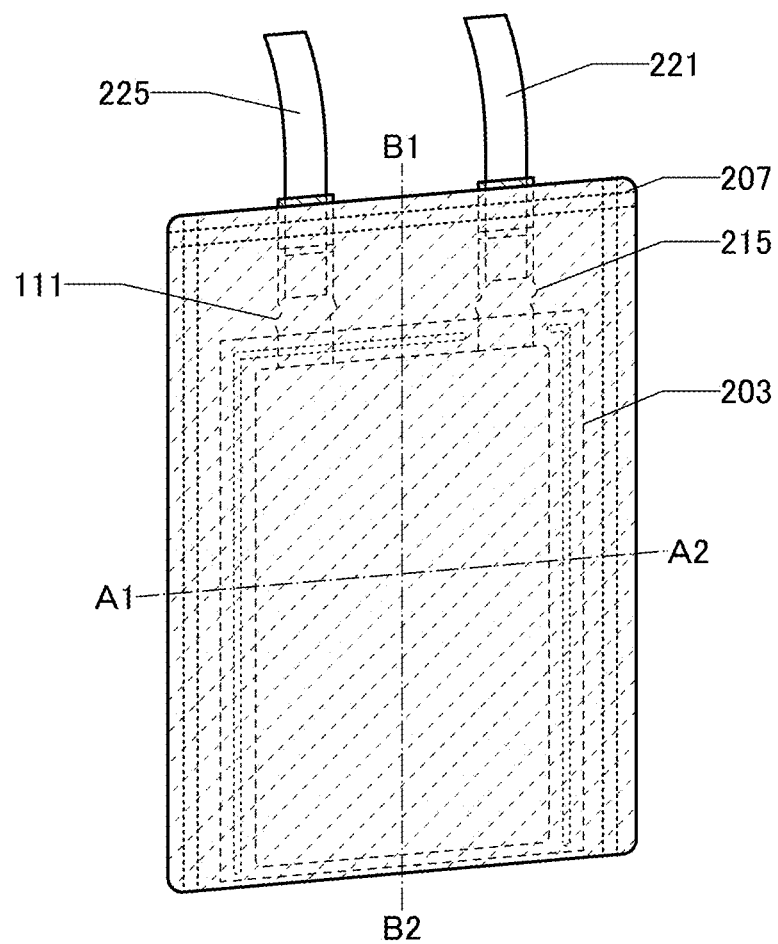
FIG. 4 is a perspective view illustrating an example of a secondary battery.

FIG. 4 is a perspective view showing an appearance of the secondary battery 200. FIG. 5A is a cross-sectional view of a portion indicated by the dashed-dotted line A1-A2 in FIG. 4. FIG. 5B is a cross-sectional view of a portion along dashed-dotted line B1-B2 in FIG. 4.

The secondary battery 200 of one embodiment of the present invention includes a positive electrode 215 covered with a separator 203, the negative electrode 111, and an electrolyte solution 204 in an exterior body 207. In this embodiment, an example of a secondary battery including two positive electrode current collectors each having a positive electrode active material layer on both surfaces, two negative electrode current collectors each having a negative electrode active material layer on one surface, and one negative electrode current collector having a negative electrode active material layer on both surfaces. The positive electrode 215 is electrically connected to a positive electrode lead 221. The negative electrode 111 is electrically connected to a negative electrode lead 225. Each of the positive electrode lead 221 and the negative electrode lead 225 is also referred to as a lead electrode or a lead terminal. Parts of the positive electrode lead 221 and the negative electrode lead 225 are positioned outside the exterior body. The secondary battery 200 is charged and discharged through the positive electrode lead 221 and the negative electrode lead 225.

Figure 5A:
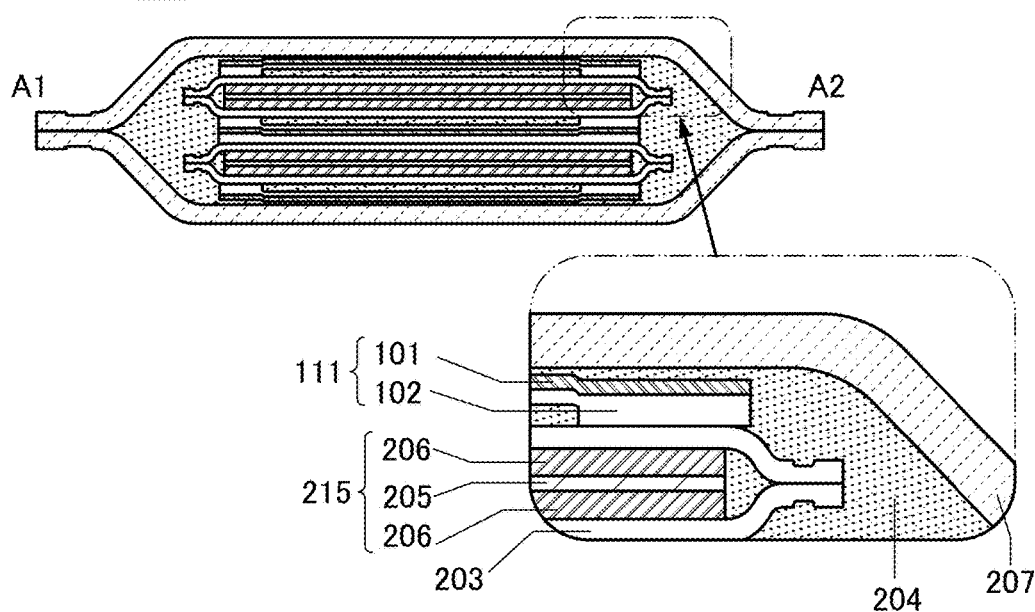
FIGS. 5A and 5B illustrate cross-sectional views of an example of a secondary battery.
Figure 5B:
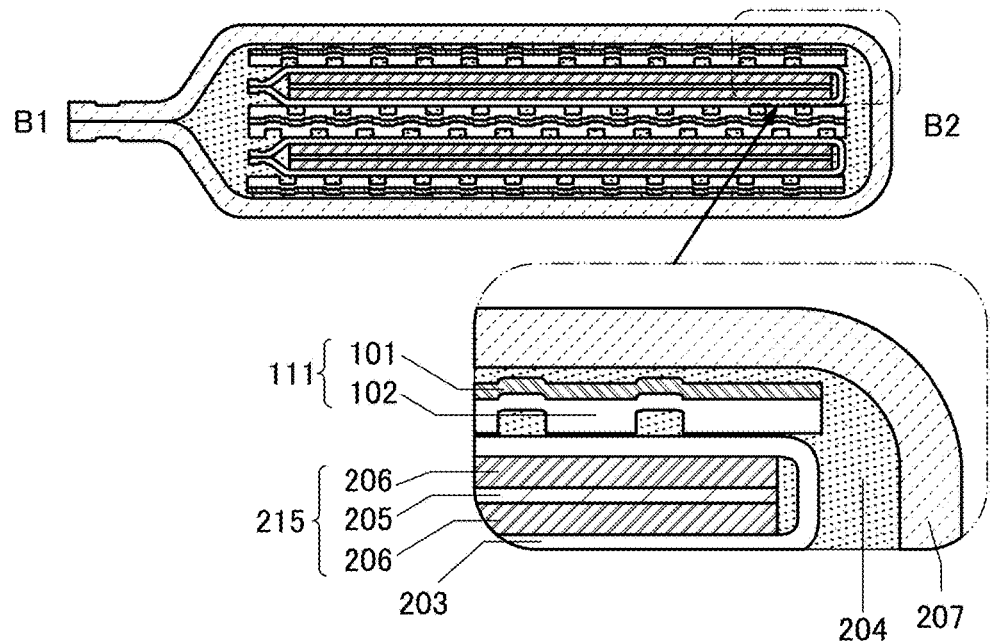

Although FIGS. 5A and 5B illustrate the example in which the positive electrode 215 is covered with the separator 203, but one embodiment of the present invention is not limited thereto. For example, the positive electrode 215 is not necessarily covered with the separator 203; instead of the positive electrode 215, the negative electrode 111 may be covered with the separator 203.

[1. Positive Electrode]

The positive electrode 215 includes the positive electrode current collector 205, the positive electrode active material layer 206 formed on the positive electrode current collector 205, and the like. FIG. 5 illustrates an example where the positive electrode active material layer 206 is formed on both surfaces of the positive electrode current collector 205 with a sheet shape (or a strip-like shape); however, the positive electrode active material layer 206 may be formed on one surface of the positive electrode current collector 205.

The positive electrode current collector 205 can be formed using a material that has high conductivity and does not cause a significant chemical change, such as a metal typified by stainless steel, gold, platinum, aluminum, or titanium, or an alloy thereof. Alternatively, an aluminum alloy to which an element which improves heat resistance, such as silicon, titanium, neodymium, scandium, or molybdenum, is added can be used. Still alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The positive electrode current collector 205 can have a foil-like shape, a plate-like shape (a sheet-like shape), a net-like shape, a punching-metal shape, an expanded-metal shape, or the like as appropriate. The positive electrode current collector 205 preferably has a thickness greater than or equal to 5 μm and less than or equal to 30 μm. The surface of the positive electrode current collector 205 may be provided with an undercoat using graphite or the like.

The positive electrode active material layer 206 may further include a binder for increasing adhesion of positive electrode active materials, a conductive additive for increasing the conductivity of the positive electrode active material layer 206, and the like in addition to the positive electrode active materials.

Examples of a positive electrode active material used for the positive electrode active material layer 206 include a composite oxide with an olivine crystal structure, a composite oxide with a layered rock-salt crystal structure, and a composite oxide with a spinel crystal structure. As the positive electrode active material, a compound such as $LiFeO_2$, $LiCoO_2$, $LiNiO_2$, $LiMn_2O_4$, $V_2O_5$, $Cr_2O_5$, and $MnO_2$ is used.

$LiCoO_2$ is particularly preferable because it has high capacity, stability in the air higher than that of $LiNiO_2$, and thermal stability higher than that of $LiNiO_2$, for example.

It is preferable to add a small amount of lithium nickel oxide ($LiNiO_2$ or $LiNi_{1-x}M_xO_2$ (M=Co, Al, or the like)) to a lithium-containing material with a spinel crystal structure which contains manganese such as $LiMn_2O_4$ because characteristics of the secondary battery using such a material can be improved. Typically, a material represented by a composition formula $Li_{1.68}Mn_{0.8062}Ni_{0.31803}$ can be given.

Alternatively, a complex material ($LiMPO_4$ (general formula) (M is one or more of Fe(II), Mn(II), Co(II), and Ni(II))) can be used. Typical examples of the general formula $LiMPO_4$ which can be used as a material are lithium compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

$LiFePO_4$ is particularly preferable because it meets requirements with balance for a positive electrode active material, such as safety, stability, high capacity density, and the existence of lithium ions that can be extracted in initial oxidation (charging).

Alternatively, a complex material such as $Li_{(2-j)}MSiO_4$ (general formula) (M is one or more of Fe(II), Mn(II), Co(II), and Ni(II); 0≤j≤2) may be used. Typical examples of the general formula $Li_{(2-j)}MSiO_4$ which can be used as a material are lithium compounds such as $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l≤1, 0<k<1, and 0<l<1), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ (m+n+q≤1, 0<m<1, 0<n<1, and 0<q<1), and $Li_{(2-j)}Fe_rNi_sCo_tMn_uSiO_4$ (r+s+t+u≤1, 0<r<1, 0<s<1, 0<t<1, and 0<u<1).

Still alternatively, a nasicon compound expressed by $A_xM_2(XO_4)_3$ (general formula) (A=Li, Na, or Mg, M=Fe, Mn, Ti, V, or Nb, X=S, P, Mo, W, As, or Si) can be used for the positive electrode active material. Examples of the nasicon compound are $Fe_2(MnO_4)_3$, $Fe_2(SO_4)_3$, and $Li_3Fe_2(PO_4)_3$. Further alternatively, a compound expressed by $Li_2MPO_4F$, $Li_2MP_2O_7$, or $Li_5MO_4$ (general formula) (M=Fe or Mn), a perovskite fluoride such as $NaFeF_3$ and $FeF_3$, a metal chalcogenide (a sulfide, a selenide, or a telluride) such as $TiS_2$ and $MoS_2$, an oxide with an inverse spinel structure such as $LiMVO_4$ (M=Mn, Co, Ni), a vanadium oxide ($V_2O_5$, $V_6O_{13}$, $LiV_3O_8$, or the like), a manganese oxide, an organic sulfur compound, or the like can be used as the positive electrode active material.

In the case where carrier ions are alkali metal ions other than lithium ions or alkaline-earth metal ions, the positive electrode active material may contain, instead of lithium, an alkali metal (e.g., sodium or potassium) or an alkaline-earth metal (e.g., calcium, strontium, barium, beryllium, or magnesium). For example, the positive electrode active material may be a layered oxide containing sodium such as $NaFeO_2$ or $Na_{2/3}[Fe_{1/2}Mn_{1/2}]O_2$.

Further alternatively, any of the aforementioned materials may be combined to be used as the positive electrode active material. For example, a solid solution obtained by combining two or more of the above materials can be used as the positive electrode active material. For example, a solid solution of $LiCo_{1/3}Mn_{1/3}Ni_{1/3}O_2$ and $Li_2MnO_3$ can be used as the positive electrode active material.

Note that although not shown, a conductive material such as a carbon layer may be provided on a surface of the positive electrode active material layer 206. With the conductive material such as the carbon layer, conductivity of the electrode can be increased. For example, the positive electrode active material layer 206 can be coated with a carbon layer by mixing a carbohydrate such as glucose at the time of baking the positive electrode active material.

The average particle diameter of the primary particle of the positive electrode active material layer 206 is preferably greater than or equal to 50 nm and less than or equal to 100 μm.

Examples of the conductive additive include acetylene black (AB), graphite (black lead) particles, carbon nanotubes, graphene, and fullerene.

A network for electric conduction can be formed in the positive electrode 215 by the conductive additive. The conductive additive also allows maintaining of a path for electric conduction between the particles of the positive electrode active material layer 206. The addition of the conductive additive to the positive electrode active material layer 206 increases the electric conductivity of the positive electrode active material layer 206.

As the binder, instead of polyvinylidene fluoride (PVDF) as a typical one, polyimide, polytetrafluoroethylene, polyvinyl chloride, ethylene-propylene-diene polymer, styrene-butadiene rubber, acrylonitrile-butadiene rubber, fluorine rubber, polyvinyl acetate, polymethyl methacrylate, polyethylene, nitrocellulose or the like can be used.

The content of the binder in the positive electrode active material layer 206 is preferably greater than or equal to 1 wt % and less than or equal to 10 wt %, more preferably greater than or equal to 2 wt % and less than or equal to 8 wt %, and still more preferably greater than or equal to 3 wt % and less than or equal to 5 wt %. The content of the conductive additive in the positive electrode active material layer 206 is preferably greater than or equal to 1 wt % and less than or equal to 10 wt %, more preferably greater than or equal to 1 wt % and less than or equal to 5 wt %.

In the case where the positive electrode active material layer 206 is formed by a coating method, the positive electrode active material, the binder, and the conductive additive are mixed to form a positive electrode paste (slurry), and the positive electrode paste is applied to the positive electrode current collector 205 and dried.

[2. Negative Electrode]

The negative electrode described in Embodiment 1 can be used as the negative electrode 111.

Graphene may be formed on a surface of the negative electrode active material layer 102. In the case of using silicon as the negative electrode active material, the volume of silicon is greatly changed due to occlusion and release of carrier ions in charge-discharge cycles. Therefore, adhesion between the negative electrode current collector 101 and the negative electrode active material layer 102 is decreased, resulting in degradation of battery characteristics caused by charge and discharge. Thus, graphene is preferably formed on a surface of the negative electrode active material layer 102 containing silicon because even when the volume of silicon is changed in charge-discharge cycles, decrease in the adhesion between the negative electrode current collector 101 and the negative electrode active material layer 102 can be inhibited, which makes it possible to reduce degradation of battery characteristics.

Further, a coating film of oxide or the like may be formed on the surface of the negative electrode active material layer 102. A coating film formed by decomposition or the like of an electrolyte solution or the like in charging cannot release electric charges used at the formation, and therefore forms irreversible capacity. In contrast, the film of an oxide or the like provided on the surface of the negative electrode active material layer 102 in advance can reduce or prevent generation of irreversible capacity.

As the coating film coating the negative electrode active material layer 102, an oxide film of any one of niobium, titanium, vanadium, tantalum, tungsten, zirconium, molybdenum, hafnium, chromium, aluminum, and silicon or an oxide film containing any one of these elements and lithium can be used. Such a film is denser than a conventional film formed on a surface of a negative electrode due to a decomposition product of an electrolyte solution.

For example, niobium oxide ($Nb_2O_5$) has a low electric conductivity of $10^{-9}$ S/cm and a high insulating property. For this reason, a niobium oxide film inhibits electrochemical decomposition reaction between the negative electrode active material and the electrolyte solution. On the other hand, niobium oxide has a lithium diffusion coefficient of $10^{-9}$ $cm^2$/sec and high lithium ion conductivity. Therefore, niobium oxide can transmit lithium ions. Alternatively, silicon oxide or aluminum oxide may be used.

A sol-gel method can be used to coat the negative electrode active material layer 102 with the coating film, for example. The sol-gel method is a method for forming a thin film in such a manner that a solution of metal alkoxide, a metal salt, or the like is changed into a gel, which has lost its fluidity, by hydrolysis reaction and polycondensation reaction and the gel is baked. Since a thin film is formed from a liquid phase in the sol-gel method, raw materials can be mixed uniformly on the molecular scale. For this reason, by adding a negative electrode active material such as graphite to a raw material of the metal oxide film which is a solvent, the active material can be easily dispersed into the gel. In such a manner, the coating film can be formed on the surface of the negative electrode active material layer 102. A decrease in the capacity of the power storage unit can be prevented by using the coating film.

[3. Separator]

As a material of the separator 203, a porous insulator such as cellulose, polypropylene (PP), polyethylene (PE), polybutene, nylon, polyester, polysulfone, polyacrylonitrile, polyvinylidene fluoride, or tetrafluoroethylene can be used. Alternatively, nonwoven fabric of a glass fiber or the like, or a diaphragm in which a glass fiber and a polymer fiber are mixed may be used.

[4. Electrolyte Solution]

As a solvent of an electrolyte solution 204 used for the secondary battery 200, an aprotic organic solvent is preferable. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

When a gelled high-molecular material is used as the solvent for the electrolyte solution, safety against liquid leakage and the like is improved. Further, a secondary battery can be thinner and more lightweight. Typical examples of gelled high-molecular materials include a silicone gel, an acrylic gel, an acrylonitrile gel, a polyethylene oxide-based gel, a polypropylene oxide-based gel, a fluorine-based polymer gel, and the like.

Alternatively, the use of one or more ionic liquids (room temperature molten salts) which are less likely to burn and volatilize as the solvent for the electrolyte solution can prevent the power storage unit from exploding or catching fire even when the secondary battery internally shorts out or the internal temperature increases due to overcharging or the like.

In the case of using a lithium ion as a carrier ion, as an electrolyte dissolved in the above-described solvent, one of lithium salts such as $LiPF_6$, $LiClO_4$, $LiAsF_6$, $LiBF_4$, LiAlCl$_4$, LiSCN, LiBr, La, Li$_2$SO$_4$, Li$_2$B$_{10}$Cl$_{10}$, Li$_2$B$_{12}$Cl$_{12}$, LiCF$_3$SO$_3$, LiC$_4$F$_9$SO$_3$, LiC(CF$_3$SO$_2$)$_3$, LiC(C$_2$F$_5$SO$_2$)$_3$, LiN(CF$_3$SO$_2$)$_2$, LiN(C$_4$F$_9$SO$_2$) (CF$_3$SO$_2$), and LiN(C$_2$F$_5$SO$_2$)$_2$ can be used, or two or more of these lithium salts can be used in an appropriate combination in an appropriate ratio.

The electrolyte solution used for the secondary battery preferably contains a small amount of dust particles and elements other than the constituent elements of the electrolyte solution (hereinafter, also simply referred to as impurities) so as to be highly purified. Specifically, the weight ratio of impurities to the electrolyte solution is less than or equal to 1%, preferably less than or equal to 0.1%, and more preferably less than or equal to 0.01%. An additive agent such as vinylene carbonate may be added to the electrolyte solution.

[5. Exterior Body]

There are a variety of structures of the exterior body of the secondary battery, and a film is used for formation of the exterior body 207 in this embodiment. In this embodiment, a film is used for the exterior body 207. Note that the film used for the exterior body 207 is a single-layer film selected from a metal film (e.g., an aluminum film, a stainless steel film, and a nickel steel film), a plastic film made of an organic material, a hybrid material film including an organic material (e.g., an organic resin or fiber) and an inorganic material (e.g., ceramic), and a carbon-containing inorganic film (e.g., a carbon film or a graphite film); or a stacked-layer film including two or more of the above films. Forming depressions or projections by embossing increases the surface area of the exterior body 207 exposed to outside air, achieving efficient heat dissipation.

In the case where the secondary battery 200 is changed in form by externally applying force, bending stress is externally applied to the exterior body 207 of the secondary battery 200. This might partly deform or damage the exterior body 207. Projections or depressions formed on the exterior body 207 can relieve a strain caused by stress applied to the exterior body 207. Thus, the secondary battery 200 can have higher reliability. Note that a "strain" is the scale of change in form indicating the displacement of a point of an object relative to the reference (initial) length of the object. By forming projections or depressions on the exterior body 207, the influence of a strain caused by externally applying force to the power storage unit can be reduced to be acceptable. Thus, the power storage unit having high reliability can be provided.

This embodiment can be implemented in appropriate combination with any of the other embodiments and example.

Embodiment 3

In this embodiment, another example of a method for manufacturing the secondary battery 200 will be described with reference to FIGS. 6A to 6D, FIGS. 7A and 7B, FIGS. 8A to 8C, and FIGS. 9A and 9B.

1. Covering Positive Electrode with Separator

First, the positive electrode 215 in which the positive electrode active material layer 206 is formed is positioned over the separator 203 (see FIG. 6A). Next, the separator 203 is folded along a dotted line in FIG. 6A (see FIG. 6B) so that the positive electrode 215 is interposed between the surfaces of the separator 203 (see FIG. 6C).

Then, the outer edges of the separator 203 outside the positive electrode 215 are bonded to form the bag-like separator 203 (see FIG. 6D). The bonding of the outer edges of the separator 203 can be performed with the use of an adhesive or the like, by ultrasonic welding, or by thermal fusion bonding.

In this embodiment, polypropylene is used as the separator 203, and the outer edges of the separator 203 are bonded by heating. A bonding portion 203a is shown in FIG. 6D. In this manner, the positive electrode 215 can be covered with the separator 203. The separator 203 is formed so as to cover the positive electrode active material layer 206 and does not necessarily cover the whole positive electrode 215.

Note that although the separator 203 is folded in FIGS. 6A to 6D, one embodiment of the present invention is not limited thereto. For example, the positive electrode 215 may be interposed between two separators. In that case, the bonding portion 203a may be formed to surround almost all of four sides of the separators.

The outer edges of the separator 203 may be bonded, using dashed line-like or dot-like bonding portions provided at regular intervals.

Alternatively, bonding may be performed on only one side of the outer edges. Alternatively, bonding may be performed on only two sides of the outer edges. Alternatively, bonding may be performed on four sides of the outer edges. Accordingly, the four sides can be in an even state.

Note that although the case where the positive electrode 215 is covered with the separator 203 is shown in FIGS. 6A to 6D and the like, one embodiment of the present invention is not limited thereto. For example, the positive electrode 215 is not necessarily covered with the separator 203; instead of the positive electrode 215, the negative electrode 111 may be covered with the separator 203.

In this embodiment, two positive electrodes in each of which the positive electrode active material layer 206 is formed on both surfaces of the positive electrode current collector are used.

2. Preparing Negative Electrode

Next, the negative electrode 111 in which projections and depressions are formed on a negative electrode current collector and a negative electrode active material layer is prepared. In this embodiment, two negative electrode current collectors each having a negative electrode active material layer on one surface and one negative electrode current collector having a negative electrode active material layer on both surfaces are used.

3. Connecting Leads to Positive Electrode and Negative Electrode

Figure 7A:
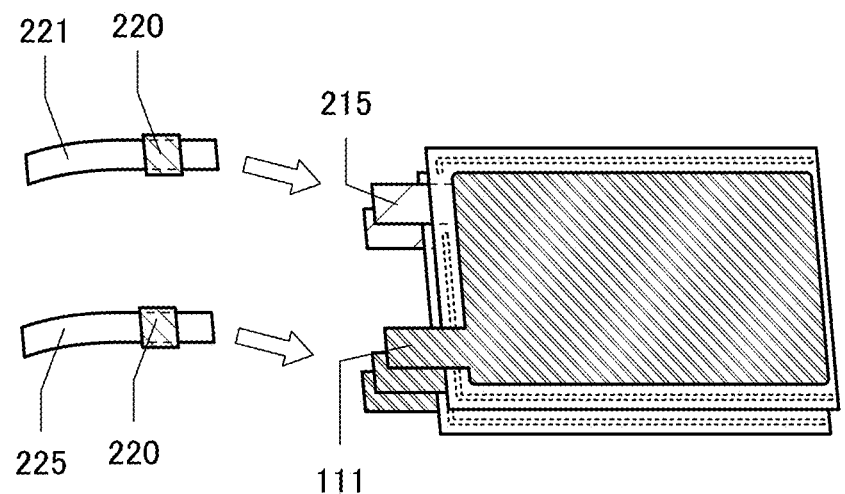
FIGS. 7A and 7B illustrate an example of a manufacturing method of a secondary battery.

Next, the positive electrode 215 and the negative electrode 111 are stacked with each other as illustrated in FIG. 7A.

Next, the positive electrode lead 221 including the sealing layer 220 is electrically connected to positive electrode tabs of the plurality of positive electrode current collectors 205 by ultrasonic wave irradiation while pressure is applied (ultrasonic welding).

The lead electrode is likely to be cracked or cut by stress due to external force applied after manufacture of the power storage unit.

Figure 7B:
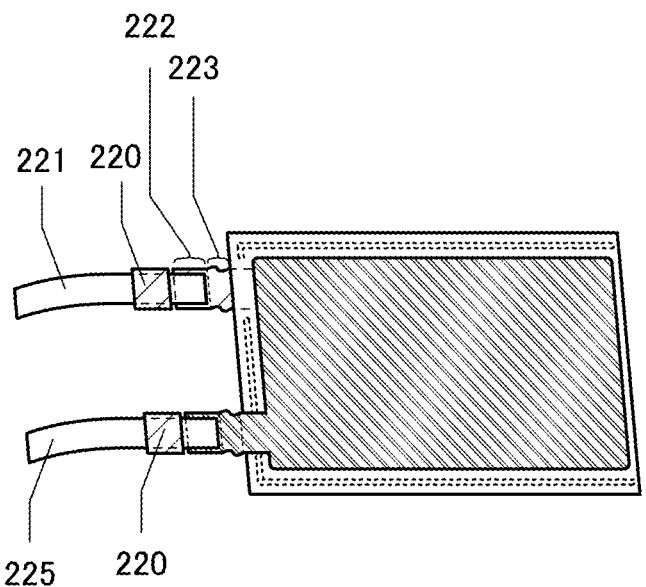

Here, when subjected to ultrasonic welding, the positive electrode lead 221 is placed between bonding dies provided with projections, whereby a connection region 222 and a bent portion 223 can be formed in the positive electrode tab (see FIG. 7B).

This bent portion 223 can relieve stress due to external force applied after fabrication of the secondary battery 200. Accordingly, the reliability of the secondary battery 200 can be increased.

The bent portion 223 is not necessarily formed in the positive electrode tab. The positive electrode current collector may be formed using a high-strength material such as stainless steel to a thickness of 10 μm or less, in order to easily relieve stress due to external force applied after fabrication of a secondary battery.

It is needless to say that two or more of the above examples may be combined to relieve concentration of stress in the positive electrode tab.

Then, in a manner similar to that of the positive electrode current collector 205, the negative electrode lead 225 including the sealing layer 220 is electrically connected to the negative electrode tab of the negative electrode current collector 101 by ultrasonic welding.

4. Bonding at Side of Exterior Body

Next, a film used as an exterior body is folded along a dotted line (see FIG. 8A), and thermocompression bonding is performed along one side of the folded exterior body. A portion where thermocompression bonding is performed along one side of the exterior body 207 is shown as a bonding portion 207a in FIG. 8B.

5. Sealing

Then, the positive electrode 215 electrically connected to the positive electrode lead 221 and the negative electrode 111 electrically connected to the negative electrode lead 225 are covered by the exterior body 207 (see FIG. 8C).

Next, thermocompression bonding is performed along one side of the exterior body 207 that overlaps the positive electrode lead 221 and the negative electrode lead 225. A portion where thermocompression bonding is performed along one side of the exterior body 207 is shown as a bonding portion 207a in FIG. 9A as in FIG. 8B.

Figure 9A:
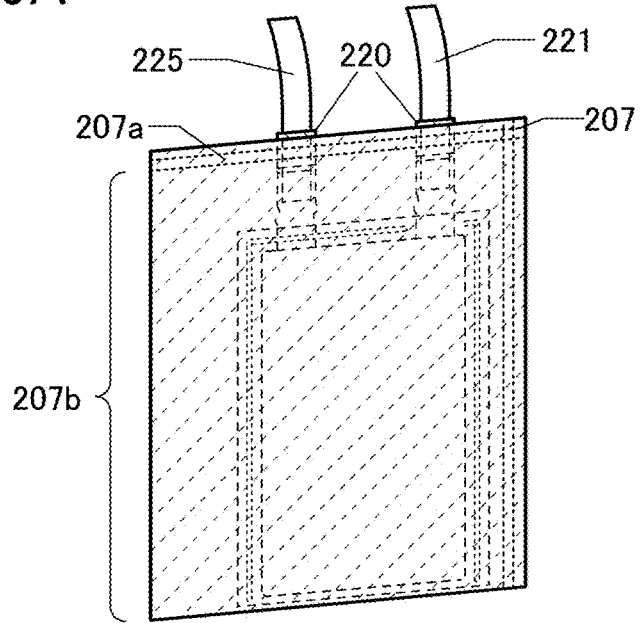
FIGS. 9A and 9B illustrate an example of a manufacturing method of a secondary battery.

Then, an electrolyte solution 204 is injected from an unsealed side 207b of the exterior body 207 illustrated in FIG. 9A. Then, the unsealed side 207b of the exterior body 207 is sealed under vacuum, heat, and pressure. This treatment is performed in an environment from which oxygen is eliminated, for example, in a glove box. The evacuation to a vacuum may be performed with a vacuum sealer, a liquid pouring sealer, or the like. Heating and pressing can be performed by setting the exterior body 207 between two heatable bars included in the sealer. An example of the conditions is as follows: the degree of vacuum is 60 kPa, the heating temperature is 190° C., the pressure is 0.1 MPa, and the time is 3 seconds. Here, pressure may be applied through the exterior body 207. The application of pressure enables removal of bubbles which enter between the positive electrode and the negative electrode when the electrolyte solution is injected.

Figure 9B:
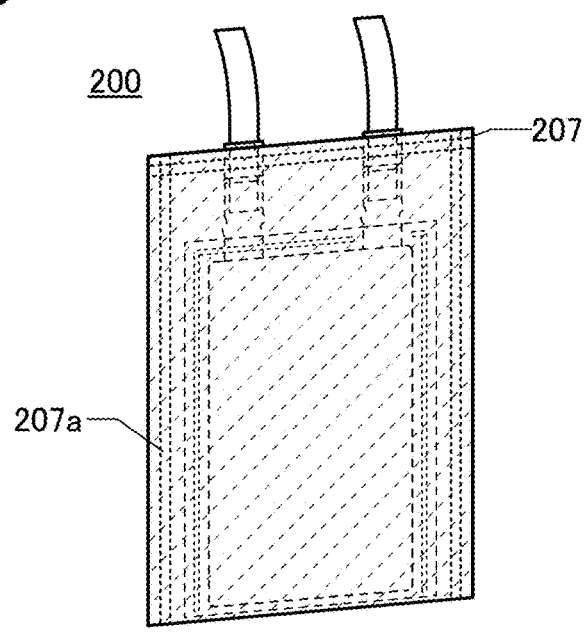

Through the above-described process, the secondary battery 200 can be fabricated (see FIG. 9B).

6. After Aging Treatment, Performing Degasification and Resealing

After the secondary battery 200 is fabricated through the above step, charging and discharging is preferably performed in the aging treatment. Furthermore, it is more preferable that gas caused by decomposition of an electrolyte solution or the like at the time of aging treatment be let out and sealing be performed again.

The charging and discharging of the aging treatment is preferably performed while the secondary battery 200 is pressurized in the thickness direction (i.e., the direction parallel to the shortest of the length, width, and height of the exterior body of the secondary battery). By pressurizing the secondary battery 200, deformation such as wrinkles in the negative electrode can be further suppressed. The pressing force can be 10 MPa, for example.

7. Modification Example

Figure 10A:
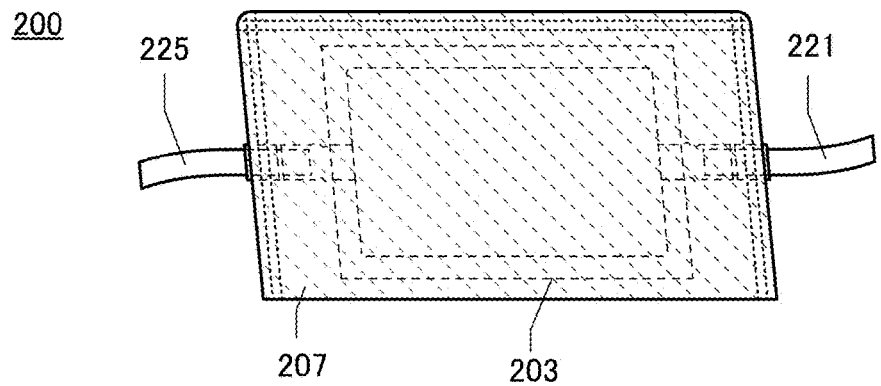
FIGS. 10A and 10B illustrate an example of a manufacturing method of a secondary battery.
Figure 10B:
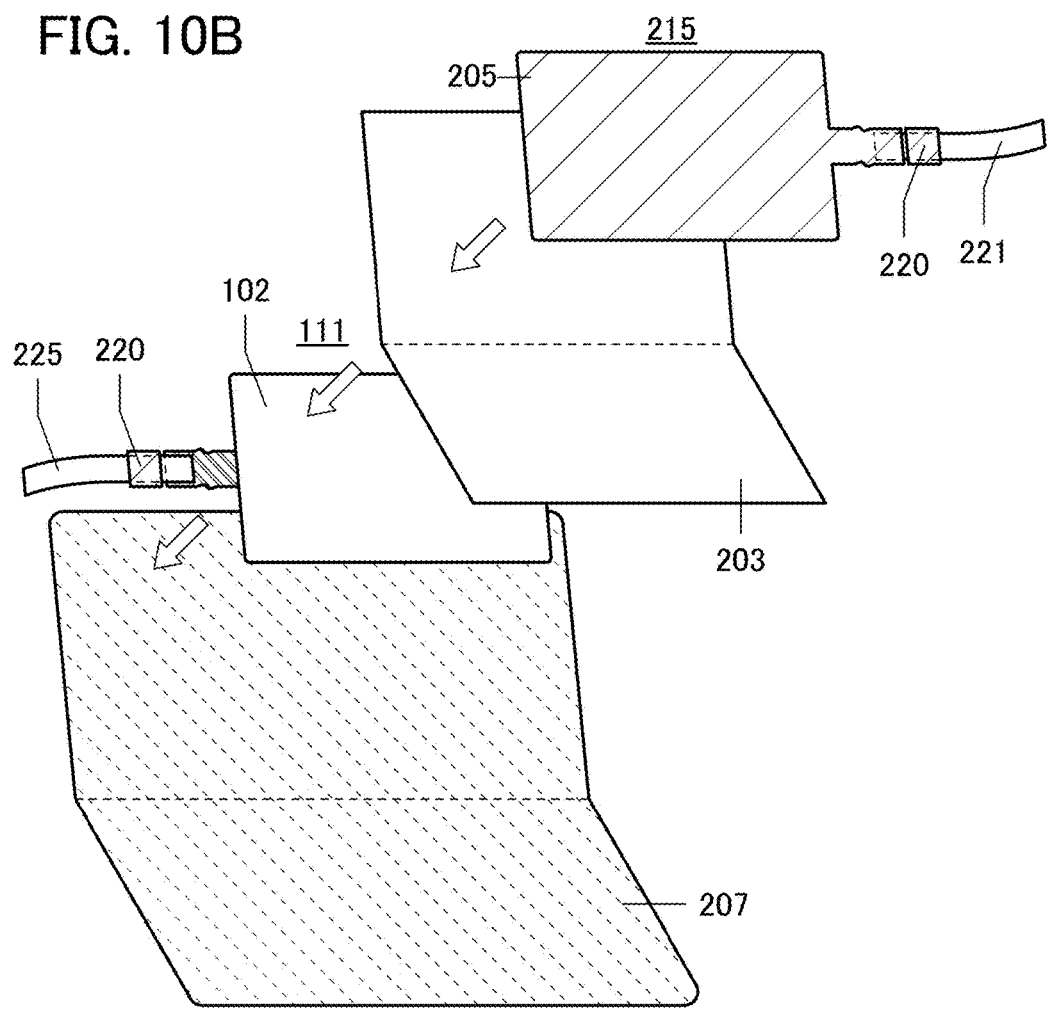

FIG. 10A shows the secondary battery 200 as a modification example of the secondary battery 200. The secondary battery 200 shown in FIG. 10A is different from the secondary battery 200 shown in FIG. 4 in the arrangement of the positive electrode lead 221 and the negative electrode lead 225. Specifically, the positive electrode lead 221 and the negative electrode lead 225 in the secondary battery 200 in FIG. 4 are provided on the same side of the exterior body 207, whereas the positive electrode lead 221 and the negative electrode lead 225 in the secondary battery 200 in FIGS. 10A and 10B are provided on different sides of the exterior body 207. The lead electrodes of the secondary battery of one embodiment of the present invention can be freely positioned as described above; therefore, the degree of freedom in design is high. Accordingly, a product including the secondary battery of one embodiment of the present invention can have a high degree of freedom in design. Furthermore, a yield of products each including the secondary battery of one embodiment of the present invention can be increased.

FIG. 10B illustrates a fabrication process of the secondary battery 200 in FIG. 10A. The manufacturing method of the secondary battery 200 in FIG. 4 can be referred to for the details.

Pressing (e.g., embossing) may be performed to form projections and depressions in advance on a surface of a film used as the exterior body 207. The projections and depressions on the surface of the film increase flexibility of a secondary battery and further relieves stress. The depressions or projections of a surface (or a rear surface) of the film formed by embossing form an obstructed space that is sealed by the film serving as a part of a wall of the sealing structure and whose inner volume is variable. It can be said that the depressions or projections of the film form an accordion structure (bellows structure) in this obstructed space. Note that embossing, which is a kind of pressing, is not necessarily employed and any method that allows formation of a relief on part of the film is employed.

Since a high capacitance material is used for the negative electrode active material, the negative electrode 111 of the secondary battery 200 of one embodiment of the present invention can be made thin. Therefore, this structure is more preferable in the case where the secondary battery 200 is curved or in the case where the secondary battery 200 has flexibility.

This embodiment can be implemented in appropriate combination with any of the other embodiments and example.

Embodiment 4

In this embodiment, other examples of the secondary battery of the present invention including the negative electrode described in Embodiment 1 are described with reference to FIGS. 11A and 11B, FIGS. 12A to 12C, FIGS. 13A to 13C, FIGS. 14A and 14B, FIGS. 15A1 to 15B2, and FIGS. 16A and 16B.

<Cylindrical Secondary Battery>

Figure 11A:
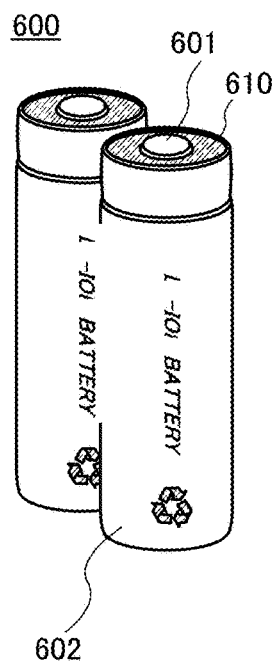
FIGS. 11A and 11B illustrate an example of a secondary battery.

First, as another example of the secondary battery, a cylindrical secondary battery is shown. A cylindrical secondary battery is described with reference to FIGS. 11A and 11B. As illustrated in FIG. 11A, a cylindrical secondary battery 600 includes a positive electrode cap (battery cap) 601 on its top surface and a battery can (outer can) 602 on its side surface and bottom surface. The positive electrode cap 601 and the battery can 602 are insulated from each other by a gasket (insulating gasket) 610.

Figure 11B:
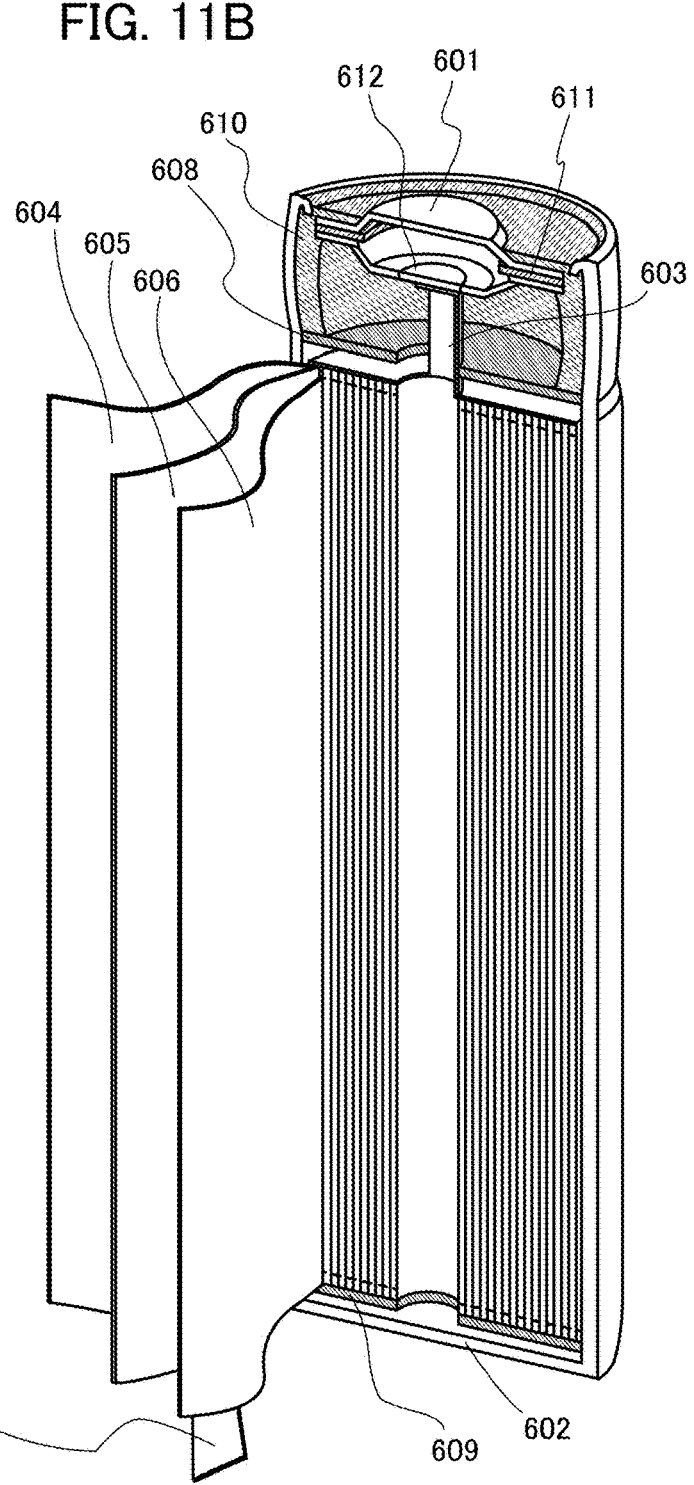

FIG. 11B is a schematic view of a cross-section of the cylindrical secondary battery. Inside the battery can 602 having a hollow cylindrical shape, a battery element in which a strip-like positive electrode 604 and a strip-like negative electrode 606 are wound with a separator 605 interposed therebetween is provided. Although not illustrated, the battery element is wound around a center pin as a center. One end of the battery can 602 is close and the other end thereof is open. Alternatively, the battery can 602 is preferably covered with nickel, aluminum, or the like in order to prevent corrosion caused by a nonaqueous electrolytic solution. Alternatively, it is preferable to cover the battery can 602 with nickel, aluminum, or the like in order to prevent corrosion due to the electrolytic solution. Inside the battery can 602, the battery element in which the positive electrode, the negative electrode, and the separator are wound is interposed between a pair of insulating plates 608 and 609 which face each other. Further, a nonaqueous electrolytic solution (not illustrated) is injected inside the battery can 602 provided with the battery element. As the nonaqueous electrolytic solution, a nonaqueous electrolytic solution which is similar to that of a secondary battery of the above embodiments can be used.

The positive electrode 604 and the negative electrode 606 can be formed in a manner similar to that of the positive electrode and the negative electrode of the thin secondary battery described in the above embodiment. Since the positive electrode and the negative electrode of the cylindrical secondary battery are wound, active materials are formed on both sides of the current collectors. A positive electrode terminal (positive electrode current collecting lead) 603 is connected to the positive electrode 604, and a negative electrode terminal (negative electrode current collecting lead) 607 is connected to the negative electrode 606. Both the positive electrode terminal 603 and the negative electrode terminal 607 can be formed using a metal material such as aluminum. The positive electrode terminal 603 is welded to a safety valve mechanism 612, and the negative electrode terminal 607 is welded to the inner bottom of the battery can 602. The safety valve mechanism 612 is electrically connected to the positive electrode cap 601 through a positive temperature coefficient (PTC) element 611. The safety valve mechanism 612 cuts off electrical connection between the positive electrode cap 601 and the positive electrode 604 when the internal pressure of the battery exceeds a predetermined threshold value. Further, the PTC element 611, which serves as a thermally sensitive resistor whose resistance increases as temperature rises, limits the amount of current by increasing the resistance, in order to prevent abnormal heat generation. Note that barium titanate ($BaTiO_3$)-based semiconductor ceramic or the like can be used for the PTC element.

Note that in FIGS. 11A and 11B, the cylindrical secondary battery is given as an example of the secondary battery; however, any of secondary batteries with a variety of shapes, such as a sealed secondary battery and a rectangular secondary battery, can be used. Further, a structure in which a plurality of positive electrodes, a plurality of negative electrodes, and a plurality of separators are stacked or wound may be employed. For example, FIGS. 12A to 12C, FIGS. 13A to 13C, FIGS. 14A and 14B, FIGS. 15A1 to 15B2, and FIGS. 16A and 16B illustrate examples of other secondary batteries.

<Structure Example of Secondary Battery>

FIGS. 12A to 12C and FIGS. 13A to 13C illustrate structural examples of thin secondary batteries. A wound body 993 illustrated in FIG. 12A includes a negative electrode 994, a positive electrode 995, and a separator 996.

The wound body 993 is obtained by winding a sheet of a stack in which the negative electrode 994 overlaps with the positive electrode 995 with the separator 996 provided therebetween. The wound body 993 is covered with a rectangular sealed container or the like; thus, a rectangular secondary battery is fabricated.

Note that the number of stacks each including the negative electrode 994, the positive electrode 995, and the separator 996 may be determined as appropriate depending on capacity and an element volume which are required. The negative electrode 994 is connected to a negative electrode current collector (not illustrated) via one of a lead electrode 997 and a lead electrode 998. The positive electrode 995 is connected to a positive electrode current collector (not illustrated) via the other of the lead electrode 997 and the lead electrode 998.

Figure 12A:
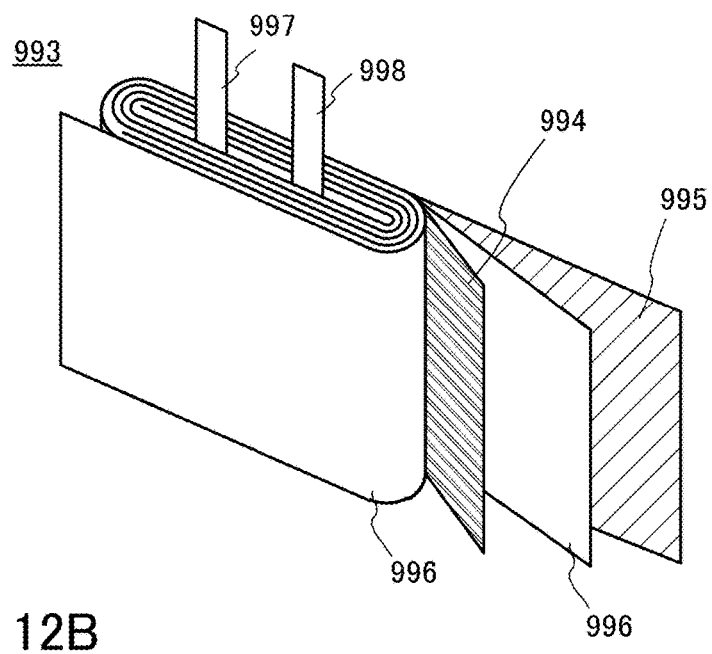
FIGS. 12A to 12C illustrate an example of secondary battery.
Figure 12B:
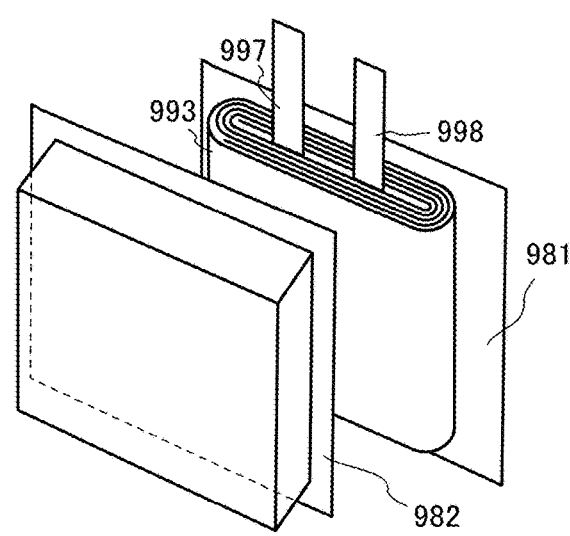
Figure 12C:
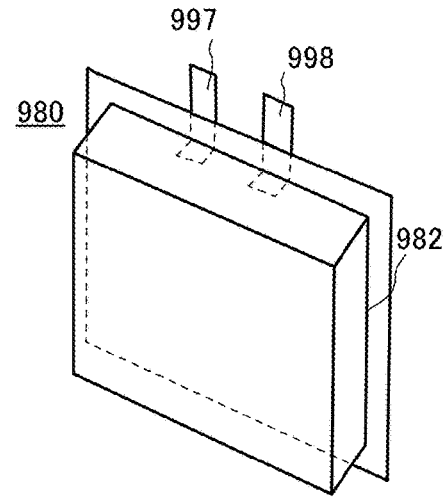

In a secondary battery 980 illustrated in FIGS. 12B and 12C, the wound body 993 is packed in a space formed by bonding a film 981 and a film 982 having a depressed portion that serve as exterior bodies by thermocompression bonding or the like. The wound body 993 includes the lead electrode 997 and the lead electrode 998, and is soaked in an electrolytic solution inside a space surrounded by the film 981 and the film 982 having a depressed portion.

For the film 981 and the film 982 having a depressed portion, a metal material such as aluminum or a resin material can be used, for example. With the use of a resin material for the film 981 and the film 982 having a depressed portion, the film 981 and the film 982 having a depressed portion can be deformed when external force is applied; thus, a flexible secondary battery can be manufactured.

Although FIGS. 12B and 12C illustrate an example where a space is formed by two films, the wound body 993 may be placed in a space formed by bending one film.

Furthermore, a flexible secondary battery can be fabricated when a resin material or the like is used for the exterior body and the sealed container of the thin secondary battery. Note that in the case where a resin material is used for the exterior body and the sealed container, a conductive material is used for a portion connected to the outside.

For example, FIGS. 13B and 13C illustrate another example of a flexible thin secondary battery. The wound body 993 illustrated in FIG. 13A is the same as that illustrated in FIG. 12A, and a detailed description thereof is omitted.

In the secondary battery 990 illustrated in FIGS. 13B and 13C, the wound body 993 is surrounded by the exterior body 991. The wound body 993 includes the lead electrode 997 and the lead electrode 998, and is soaked in an electrolytic solution inside a space surrounded by the exterior body 991 and an exterior body 992. For example, a metal material such as aluminum or a resin material can be used for the exterior bodies 991 and 992. With the use of a resin material for the exterior bodies 991 and 992, the exterior bodies 991 and 992 can be changed in their forms when external force is applied; thus, a flexible thin secondary battery can be fabricated.

<Structural Example of Power Storage System>

Structural examples of power storage systems will be described with reference to FIGS. 14A and 14B, FIGS. 15A1 to 15B2, and FIGS. 16A and 16B. Here, a power storage system refers to, for example, a device including a secondary battery.

Figure 14A:
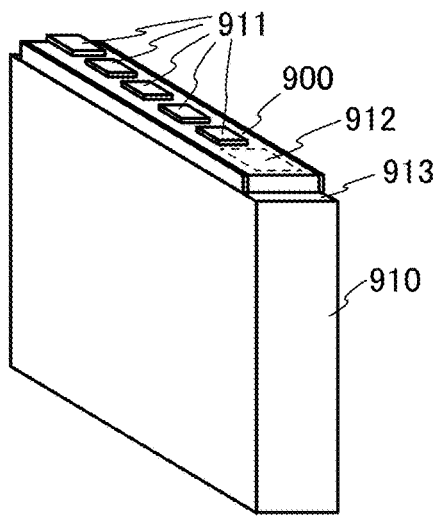
FIGS. 14A and 14B illustrate an example of a power storage system.
Figure 14B:
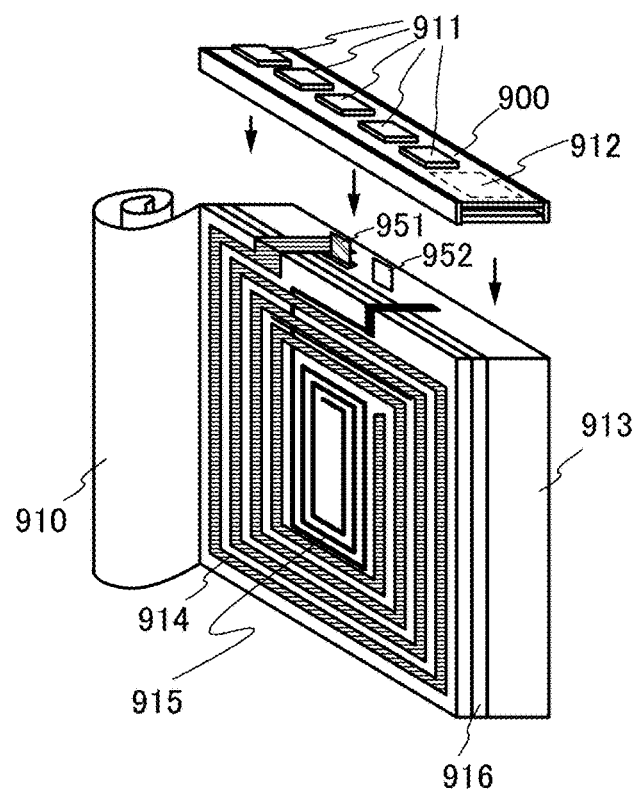

FIGS. 14A and 14B are external views of a power storage system. The power storage system includes a circuit board 900 and a secondary battery 913. A label 910 is attached to the secondary battery 913. As shown in FIG. 14B, the power storage system further includes a terminal 951, a terminal 952, an antenna 914, and an antenna 915.

The circuit board 900 includes terminals 911 and a circuit 912. The terminals 911 are connected to the terminals 951 and 952, the antennas 914 and 915, and the circuit 912. Note that a plurality of terminals 911 serving as a control signal input terminal, a power supply terminal, and the like may be provided.

The circuit 912 may be provided on the rear side of the circuit board 900. Each of the antennas 914 and 915 is not limited to having a coil shape and may have a linear shape or a plate shape. Further, a planar antenna, an aperture antenna, a traveling-wave antenna, an EH antenna, a magnetic-field antenna, or a dielectric antenna may be used. Alternatively, the antenna 914 or the antenna 915 may be a flat-plate conductor. The flat-plate conductor can serve as one of conductors for electric field coupling. That is, the antenna 914 or the antenna 915 can serve as one of two conductors of a capacitor. Thus, power can be transmitted and received not only by an electromagnetic field or a magnetic field but also by an electric field.

The line width of the antenna 914 is preferably larger than that of the antenna 915. This makes it possible to increase the amount of electric power received by the antenna 914.

The power storage system includes a layer 916 between the secondary battery 913 and the antennas 914 and 915. The layer 916 has a function of blocking an electromagnetic field from the secondary battery 913, for example. As the layer 916, for example, a magnetic body can be used.

Note that the structure of the power storage system is not limited to that shown in FIGS. 14A and 14B.

For example, as shown in FIGS. 15A1 and 15A2, two opposite surfaces of the secondary battery 913 in FIGS. 14A and 14B may be provided with respective antennas. FIG. 15A1 is an external view showing one of the opposite sides, and FIG. 15A2 is an external view showing the other of the opposite sides. For portions similar to those in FIGS. 14A and 14B, a description of the power storage system illustrated in FIGS. 14A and 14B can be referred to as appropriate.

As illustrated in FIG. 15A1, the antenna 914 is provided on one of the opposite surfaces of the secondary battery 913 with the layer 916 interposed therebetween, and as illustrated in FIG. 15A2, the antenna 915 is provided on the other of the opposite surfaces of the secondary battery 913 with a layer 917 interposed therebetween. The layer 917 has a function of blocking an electromagnetic field from the secondary battery 913. As the layer 917, for example, a magnetic body can be used.

With the above structure, both of the antennas 914 and 915 can be increased in size.

Alternatively, as illustrated in FIGS. 15B1 and 15B2, two opposite surfaces of the secondary battery 913 in FIGS. 14A and 14B may be provided with different types of antennas. FIG. 15B1 is an external view showing one of the opposite sides, and FIG. 15B2 is an external view showing the other of the opposite sides. For portions similar to those in FIGS. 14A and 14B, a description of the power storage system illustrated in FIGS. 14A and 14B can be referred to as appropriate.

As illustrated in FIG. 15B1, the antenna 914 and the antenna 915 are provided on one of the opposing surfaces of the secondary battery 913 with the layer 916 provided therebetween, and as illustrated in FIG. 15B2, an antenna 918 is provided on the other of the opposing surfaces of the secondary battery 913 with the layer 917 provided therebetween. The antenna 918 has a function of performing data communication with an external device, for example. An antenna with a shape that can be applied to the antennas 914 and 915, for example, can be used as the antenna 918. As an example of a method for communication between the power storage system and another device via the antenna 918, a response method that can be used between the power storage system and another device, such as NFC, can be employed.

Figure 16A:
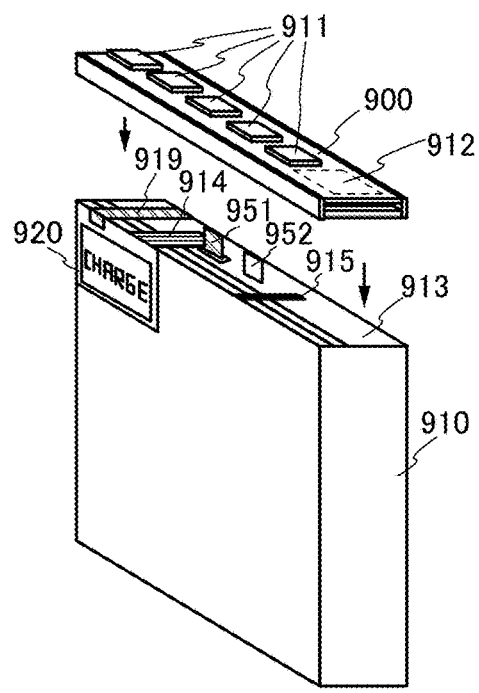
FIGS. 16A and 16B illustrate an example of a power storage system.

Alternatively, as illustrated in FIG. 16A, the secondary battery 913 in FIGS. 14A and 14B may be provided with a display device 920. The display device 920 is electrically connected to the terminal 911 via a terminal 919. It is possible that the label 910 is not provided in a portion where the display device 920 is provided. For portions similar to those in FIGS. 14A and 14B, a description of the power storage system illustrated in FIGS. 14A and 14B can be referred to as appropriate.

The display device 920 can display, for example, an image showing whether or not charging is being carried out, an image showing the amount of stored power, or the like. As the display device 920, electronic paper, a liquid crystal display device, an electroluminescent (EL) display device, or the like can be used. For example, power consumption of the display device 920 can be reduced when electronic paper is used.

Figure 16B:
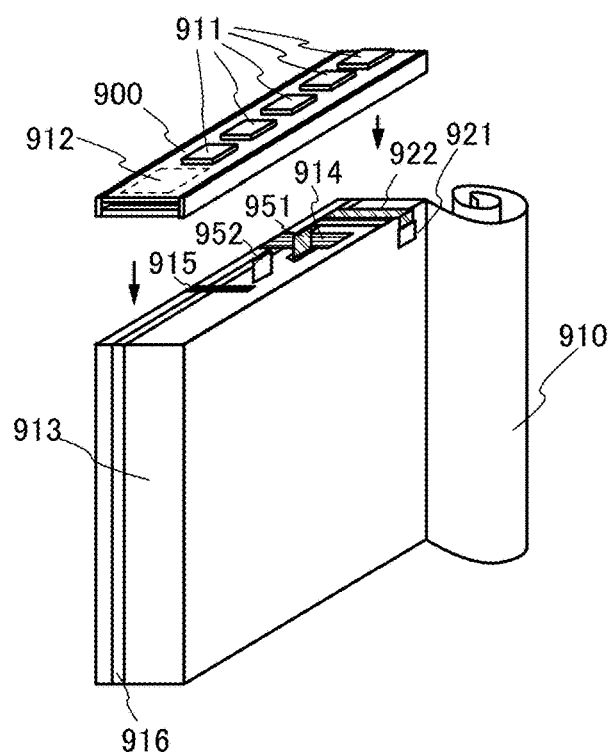

Alternatively, as illustrated in FIG. 16B, the secondary battery 913 illustrated in FIGS. 14A and 14B may be provided with a sensor 921. The sensor 921 is electrically connected to the terminal 911 via a terminal 922. For portions similar to those in FIGS. 14A and 14B, a description of the power storage system illustrated in FIGS. 14A and 14B can be referred to as appropriate.

As the sensor 921, a sensor that has a function of measuring, for example, force, displacement, position, speed, acceleration, angular velocity, rotational frequency, distance, light, liquid, magnetism, temperature, chemical substance, sound, time, hardness, electric field, electric current, voltage, electric power, radiation, flow rate, humidity, gradient, oscillation, odor, or infrared rays can be used. With the sensor 921, for example, data on the environment (e.g., temperature) where the power storage system is placed can be acquired and stored in a memory in the circuit 912.

The electrode of one embodiment of the present invention is used in the secondary battery and the power storage system that are described in this embodiment. The capacity of the secondary battery and the power storage system can thus be high. Furthermore, energy density can be high. Moreover, reliability can be high, and life can be long.

This embodiment can be implemented in combination with any of the other embodiments as appropriate.

Embodiment 5

A battery management unit (BMU) which can be combined with the secondary battery including the negative electrode described in the above embodiment and a transistor suitable for a circuit included in the battery management unit are described with reference to FIG. 17, FIGS. 18A to 18C, FIG. 19, FIG. 20, FIGS. 21A to 21C, FIG. 22, and FIG. 23. In this embodiment, a battery management unit of a power storage device including battery cells that are connected in series is particularly described.

When a plurality of battery cells connected in series are charged and discharged repeatedly, each battery cell has different capacity (output voltage) from one another due to the variation in charge and discharge characteristics among the battery cells. A discharge capacity of all of the plurality of battery cells connected in series depends on a battery cell with small capacity. The variation in capacities among the battery cells reduces the capacity of the all the battery cells at the time of discharging. Charging based on a battery cell with small capacity may cause insufficient charging. Charging based on a battery cell with high capacity may cause overcharge.

Thus, the battery management unit of the power storage device including battery cells connected in series has a function of reducing variation in capacities among the battery cells which causes insufficient charging or overcharge. Although circuit structures for reducing variation in capacities among the battery cells include a resistive type, a capacitor type, and an inductor type, here, a circuit structure which can reduce variation in capacities among the battery cells using transistors with a low off-state current is explained as an example.

A transistor including an oxide semiconductor in its channel formation region (an OS transistor) is preferably used as the transistor with a low off-state current. When an OS transistor with a low off-state current is used in the circuit of the battery management unit of the power storage device, the amount of electric charge leaking from a battery can be reduced, and reduction in capacity with the lapse of time can be suppressed.

As the oxide semiconductor used in the channel formation region, an In-M-Zn oxide (M is Ga, Sn, Y, Zr, La, Ce, or Nd) is used. In the case where the atomic ratio of the metal elements of a target for forming an oxide semiconductor film is In:M:Zn=$x_1$:$y_1$:$z_1$, $x_1/y_1$ is preferably greater than or equal to $\frac{1}{3}$ and less than or equal to 6, further preferably greater than or equal to 1 and less than or equal to 6, and $z_1/y_1$ is preferably greater than or equal to $\frac{1}{3}$ and less than or equal to 6, further preferably greater than or equal to 1 and less than or equal to 6. Note that when $z_1/y_1$ is greater than or equal to 1 and less than or equal to 6, a CAAC-OS film as the oxide semiconductor film is easily formed.

Here, the details of the CAAC-OS film are described.

The CAAC-OS film is one of oxide semiconductor films having a plurality of c-axis aligned crystal parts.

In a combined analysis image (also referred to as a high-resolution TEM image) of a bright-field image and a diffraction pattern of a CAAC-OS film, which is obtained using a transmission electron microscope (TEM), a plurality of crystal parts can be observed. However, in the high-resolution TEM image, a boundary between crystal parts, that is, a grain boundary is not clearly observed. Thus, in the CAAC-OS film, a reduction in electron mobility due to the grain boundary is less likely to occur.

According to the high-resolution cross-sectional TEM image of the CAAC-OS film observed in a direction substantially parallel to a sample surface, metal atoms are arranged in a layered manner in the crystal parts. Each metal atom layer has a morphology reflecting unevenness of a surface over which the CAAC-OS film is formed (hereinafter, a surface over which the CAAC-OS film is formed is referred to as a formation surface) or of a top surface of the CAAC-OS film, and is arranged parallel to the formation surface or the top surface of the CAAC-OS film.

On the other hand, according to the high-resolution planar TEM image of the CAAC-OS film observed in a direction substantially perpendicular to the sample surface, metal atoms are arranged in a triangular or hexagonal configuration in the crystal parts. However, there is no regularity of arrangement of metal atoms between different crystal parts.

A CAAC-OS film is subjected to structural analysis with an X-ray diffraction (XRD) apparatus. For example, when the CAAC-OS film including an InGaZnO$_4$ crystal is analyzed by an out-of-plane method, a peak appears frequently when the diffraction angle (2θ) is around 31°. This peak is derived from the (009) plane of the InGaZnO$_4$ crystal, which indicates that crystals in the CAAC-OS film have c-axis alignment, and that the c-axes are aligned in a direction substantially perpendicular to the formation surface or the top surface of the CAAC-OS film.

Note that when the CAAC-OS film with an InGaZnO$_4$ crystal is analyzed by an out-of-plane method, a peak of 2θ may also be observed at around 36°, in addition to the peak of 2θ at around 31°. The peak of 2θ at around 36° indicates that a crystal having no c-axis alignment is included in part of the CAAC-OS film. It is preferable that in the CAAC-OS film, a peak of 2θ appear at around 31° and a peak of 2θ not appear at around 36°.

The CAAC-OS film is an oxide semiconductor film having low impurity concentration. The impurity is an element other than the main components of the oxide semiconductor film, such as hydrogen, carbon, silicon, or a transition metal element. In particular, an element that has higher bonding strength to oxygen than a metal element included in the oxide semiconductor film, such as silicon, disturbs the atomic arrangement of the oxide semiconductor film by depriving the oxide semiconductor film of oxygen and causes a decrease in crystallinity. Further, a heavy metal such as iron or nickel, argon, carbon dioxide, or the like has a large atomic radius (molecular radius), and thus disturbs the atomic arrangement of the oxide semiconductor film and causes a decrease in crystallinity when it is contained in the oxide semiconductor film. Note that the impurity contained in the oxide semiconductor film might serve as a carrier trap or a carrier generation source.

The CAAC-OS film is an oxide semiconductor film having a low density of defect states. In some cases, oxygen vacancies in the oxide semiconductor film serve as carrier traps or serve as carrier generation sources when hydrogen is captured therein.

The state in which impurity concentration is low and density of defect states is low (the number of oxygen vacancies is small) is referred to as a "highly purified intrinsic" or "substantially highly purified intrinsic" state. A highly purified intrinsic or substantially highly purified intrinsic oxide semiconductor film has few carrier generation sources, and thus can have a low carrier density. Thus, a transistor including the oxide semiconductor film rarely has negative threshold voltage (is rarely normally on). The highly purified intrinsic or substantially highly purified intrinsic oxide semiconductor film has few carrier traps. Accordingly, the transistor including the oxide semiconductor film has little variation in electrical characteristics and high reliability. Electric charge trapped by the carrier traps in the oxide semiconductor film takes a long time to be released, and might behave like fixed electric charge. Thus, the transistor which includes the oxide semiconductor film having high impurity concentration and a high density of defect states has unstable electrical characteristics in some cases.

With the use of the CAAC-OS film in a transistor, variation in the electrical characteristics of the transistor due to irradiation with visible light or ultraviolet light is small.

Since the OS transistor has a wider band gap than a transistor including silicon in its channel formation region (a Si transistor), dielectric breakdown is unlikely to occur when a high voltage is applied. Although a voltage of several hundreds of volts is generated when battery cells are connected in series, the above described OS transistor is suitable for a circuit of a battery management unit which is used for such battery cells in the power storage device.

Figure 17:
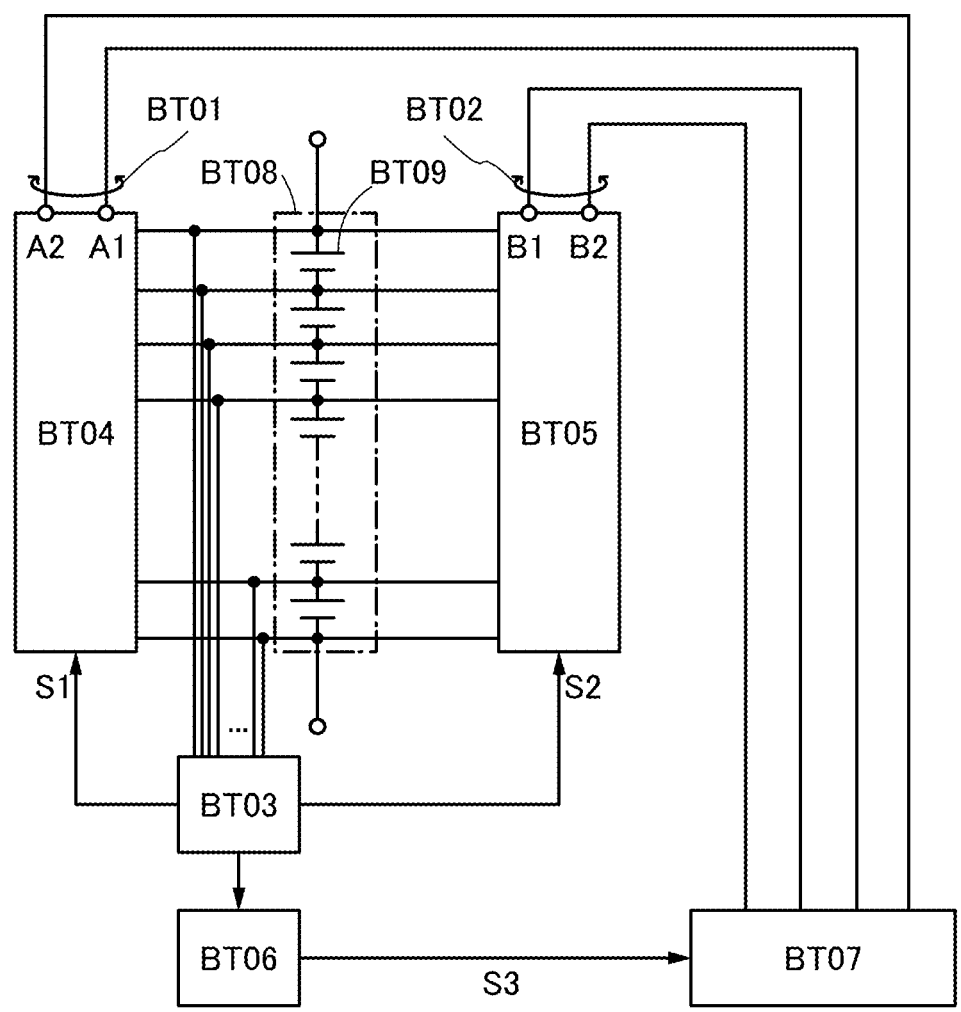
FIG. 17 is a block diagram illustrating a battery management unit of a power storage device.

FIG. 17 is an example of a block diagram of the power storage device. A power storage device BT00 illustrated in FIG. 17 includes a terminal pair BT01, a terminal pair BT02, a switching control circuit BT03, a switching circuit BT04, a switching circuit BT05, a voltage transformation control circuit BT06, a voltage transformer circuit BT07, and a battery portion BT08 including a plurality of battery cells BT09 connected in series.

In the power storage device BT00 illustrated in FIG. 17, a portion including the terminal pair BT01, the terminal pair BT02, the switching control circuit BT03, the switching circuit BT04, the switching circuit BT05, the voltage transformation control circuit BT06, and the voltage transformer circuit BT07 can be referred to as a battery management unit.

The switching control circuit BT03 controls operations of the switching circuits BT04 and BT05. Specifically, the switching control circuit BT03 selects battery cells to be discharged (a discharge battery cell group) and battery cells to be charged (a charge battery cell group) in accordance with voltage measured for every battery cell BT09.

Furthermore, the switching control circuit BT03 outputs a control signal S1 and a control signal S2 on the basis of the selected discharge battery cell group and the selected charge battery cell group. The control signal S1 is output to the switching circuit BT04. The control signal S1 controls the switching circuit BT04 so that the terminal pair BT01 and the discharge battery cell group are connected. In addition, the control signal S2 is output to the switching circuit BT05. The control signal S2 controls the switching circuit BT05 so that the terminal pair BT02 and the charge battery cell group are connected.

The switching control circuit BT03 generates the control signal S1 and the control signal S2 on the basis of connection relation of the switching circuit BT04, the switching circuit BT05, and the voltage transformer circuit BT07 so that terminals having the same polarity of the terminal pair BT01 and the discharge battery cell group are connected with each other, or terminals having the same polarity of the terminal pair BT02 and the charge battery cell group are connected with each other.

An operation of the switching control circuit BT03 is described in detail.

First, the switching control circuit BT03 measures the voltage of each of the plurality of battery cells BT09. Then, the switching control circuit BT03 determines that the battery cell BT09 having a voltage higher than a predetermined threshold value is a high-voltage battery cell (high-voltage cell) and that a battery cell BT09 having a voltage lower than the predetermined threshold value is a low-voltage battery cell (low-voltage cell), for example.

As a method to determine whether a battery cell is a high-voltage cell or a low-voltage cell, any of various methods can be employed. For example, the switching control circuit BT03 may determine whether each battery cell BT09 is a high-voltage cell or a low-voltage cell on the basis of the voltage of a battery cell BT09 having the highest voltage or the lowest voltage among the plurality of battery cells BT09. In this case, the switching control circuit BT03 can determine whether each battery cell BT09 is a high-voltage cell or a low-voltage cell by determining whether or not a ratio of a voltage of each battery cell BT09 to the reference voltage is the predetermined value or more. Then, the switching control circuit BT03 determines a charge battery cell group and a discharge battery cell group on the basis of the determination result.

Note that high-voltage cells and low-voltage cells are mixed in various states in the plurality of battery cells BT09. For example, the switching control circuit BT03 selects a portion having the largest number of high-voltage cells connected in series as the discharge battery cell group of mixed high-voltage cells and low-voltage cells. Furthermore, the switching control circuit BT03 selects a portion having the largest number of low-voltage cells connected in series as the charge battery cell group. In addition, the switching control circuit BT03 may preferentially select battery cells BT09 which are near overcharge or overdischarge as the discharge battery cell group or the charge battery cell group.

Figure 18A:
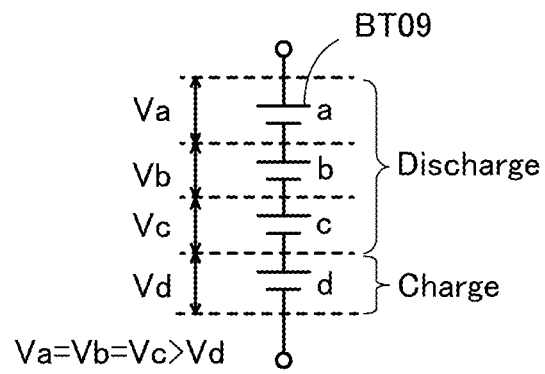
FIGS. 18A to 18C are conceptual diagrams illustrating a battery management unit of a power storage device.
Figure 18B:
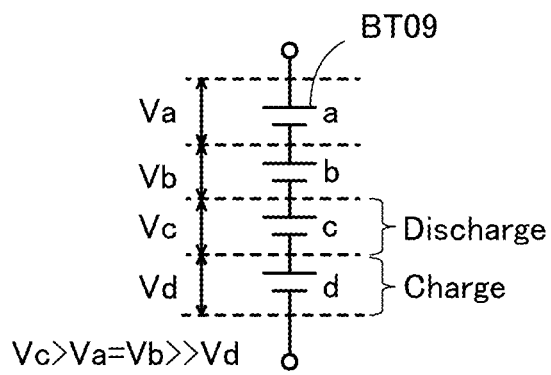
Figure 18C:
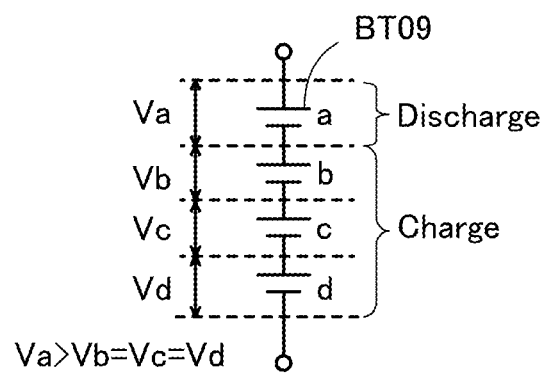

Here, operation examples of the switching control circuit BT03 in this embodiment are described with reference to FIGS. 18A to 18C. FIGS. 18A to 18C illustrate operation examples of the switching control circuit BT03. Note that FIGS. 18A to 18C each illustrate the case where four battery cells BT09 are connected in series as an example for convenience of explanation.

FIG. 18A shows the case where the relation of voltages Va, Vb, Vc, and Vd is Va=Vb=Vc>Vd where the voltages Va, Vb, Vc, and Vd are voltages of a battery cell a, a battery cell b, a battery cell c, and a battery cell d, respectively. That is, a series of three high-voltage cells a to c and one low-voltage cell d are connected in series. In that case, the switching control circuit BT03 selects the series of three high-voltage cells a to c as the discharge battery cell group. In addition, the switching control circuit BT03 selects the low-voltage cell d as the charge battery cell group.

Next, FIG. 18B shows the case where the relation of the voltages is Vc>Va=Vb>>Vd. That is, a series of two low-voltage cells a and b, one high-voltage cell c, and one low-voltage cell d which is close to overdischarge are connected in series. In that case, the switching control circuit BT03 selects the high-voltage cell c as the discharge battery cell group. Since the low-voltage cell d is close to overdischarge, the switching control circuit BT03 preferentially selects the low-voltage cell d as the charge battery cell group instead of the series of two low-voltage cells a and b.

Lastly, FIG. 18C shows the case where the relation of the voltages is Va>Vb=Vc=Vd. That is, one high-voltage cell a and a series of three low-voltage cells b to d are connected in series. In that case, the switching control circuit BT03 selects the high-voltage cell a as the discharge battery cell group. In addition, the switching control circuit BT03 selects the series of three low-voltage cells b to d as the charge battery cell group.

On the basis of the determination result shown in the examples of FIGS. 18A to 18C, the switching control circuit BT03 outputs the control signal S1 and the control signal S2 to the switching circuit BT04 and the switching circuit BT05, respectively. Information showing the discharge battery cell group being the connection destination of the switching circuit BT04 is set in the control signal S1. Information showing the charge battery cell group being a connection destination of the switching circuit BT05 is set in the control signal S2.

The above is the detailed description of the operation of the switching control circuit BT03.

The switching circuit BT04 sets the discharge battery cell group selected by the switching control circuit BT03 as the connection destination of the terminal pair BT01 in response to the control signal Si output from the switching control circuit BT03.

The terminal pair BT01 includes a pair of terminals A1 and A2. The switching circuit BT04 sets the connection destination of the terminal pair BT01 by connecting one of the pair of terminals A1 and A2 to a positive electrode terminal of a battery cell BT09 positioned on the most upstream side (on the high potential side) of the discharge battery cell group, and the other to a negative electrode terminal of a battery cell BT09 positioned on the most downstream side (on the low potential side) of the discharge battery cell group. Note that the switching circuit BT04 can recognize the position of the discharge battery cell group on the basis of the information set in the control signal S1.

The switching circuit BT05 sets the charge battery cell group selected by the switching control circuit BT03 as the connection destination of the terminal pair BT02 in response to the control signal S2 output from the switching control circuit BT03.

The terminal pair BT02 includes a pair of terminals B1 and B2. The switching circuit BT05 sets the connection destination of the terminal pair BT02 by connecting one of the pair of terminals B1 and B2 to a positive electrode terminal of a battery cell BT09 positioned on the most upstream side (on the high potential side) of the charge battery cell group, and the other to a negative electrode terminal of a battery cell BT09 positioned on the most downstream side (on the low potential side) of the charge battery cell group. Note that the switching circuit BT05 can recognize the position of the charge battery cell group on the basis of the information set in the control signal S2.

Figure 19:
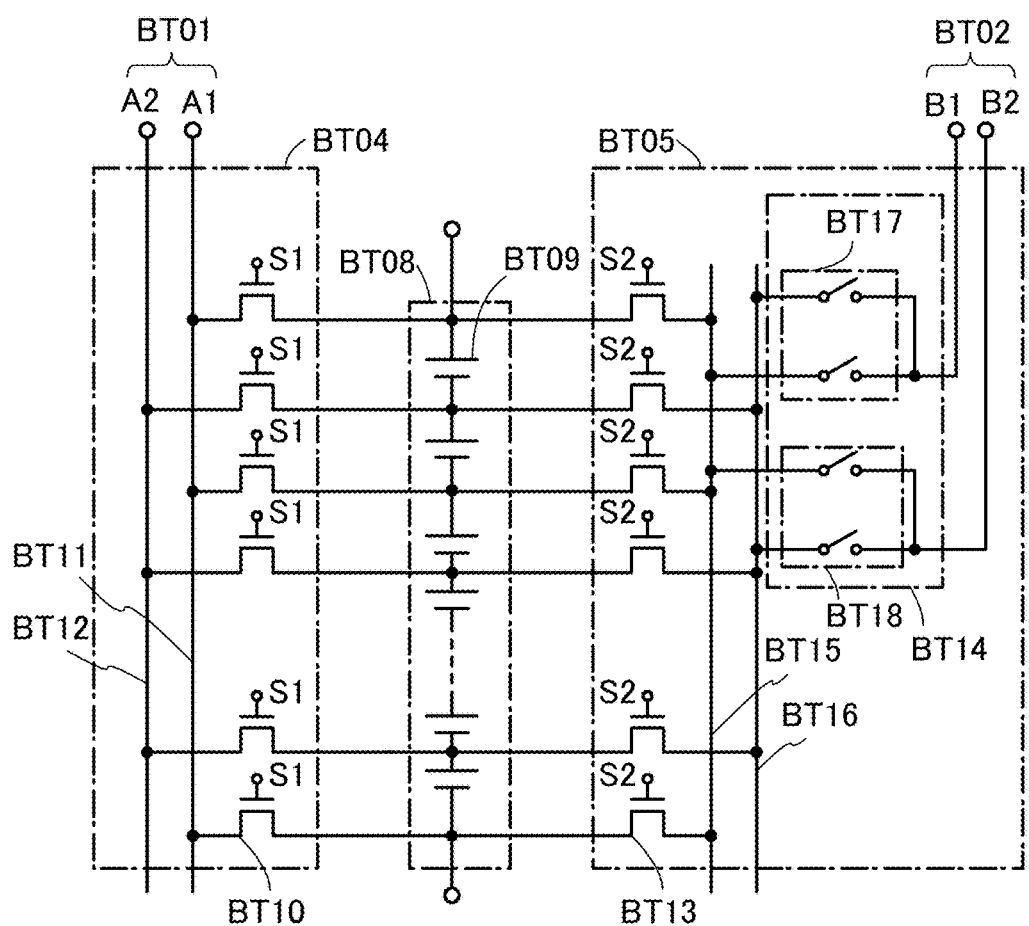
FIG. 19 is a circuit diagram illustrating a battery management unit of a power storage device.
Figure 20:
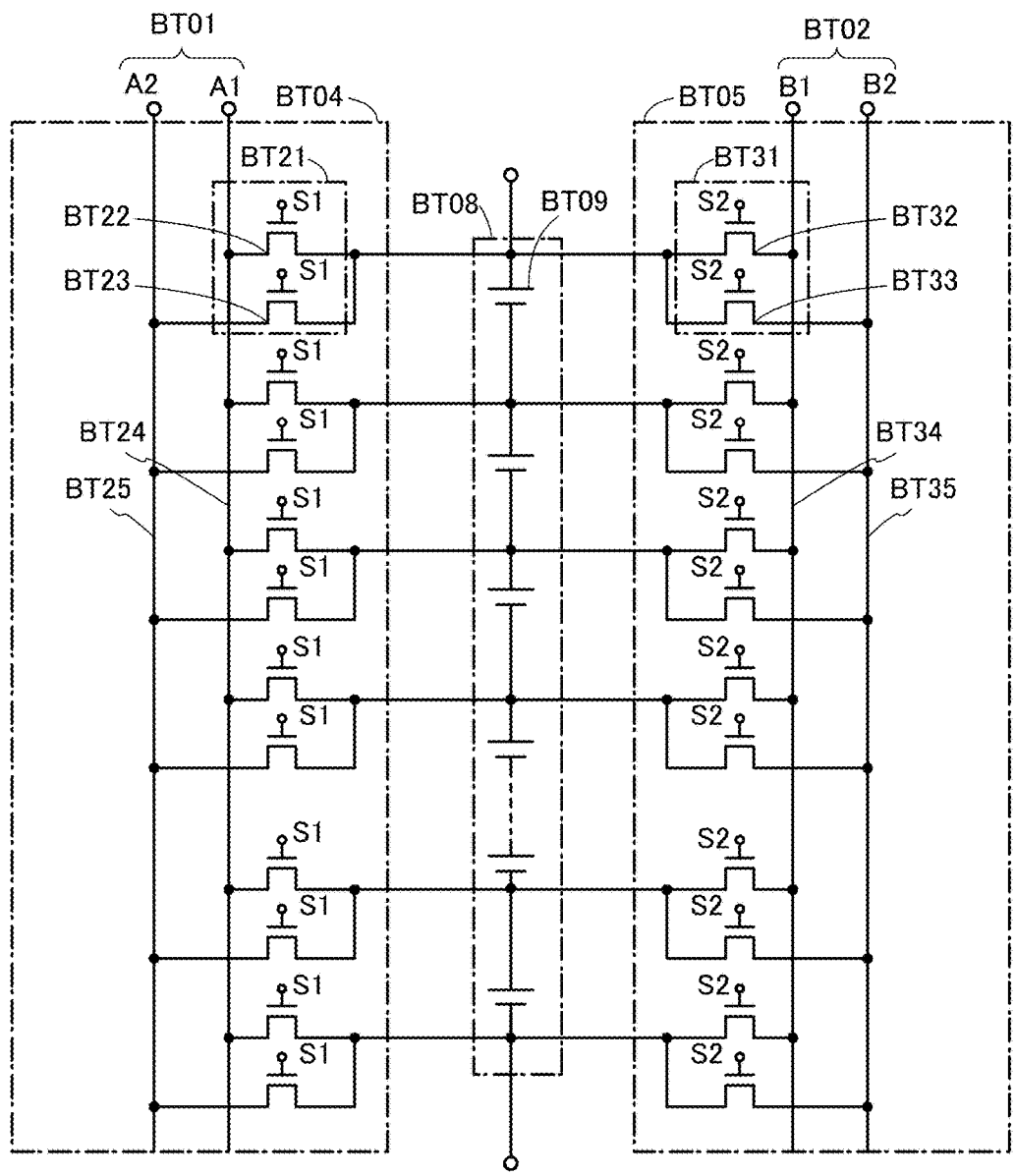
FIG. 20 is a circuit diagram illustrating a battery management unit of a power storage device.

FIG. 19 and FIG. 20 are circuit diagrams showing configuration example of the switching circuits BT04 and BT05.

In FIG. 19, the switching circuit BT04 includes a plurality of the transistors BT10, a bus BT11, and a bus BT12. The bus BT11 is connected to the terminal A1. The bus BT12 is connected to the terminal A2. Sources or drains of the plurality of transistors BT10 are connected alternately to the bus BT11 and the bus BT12. Sources or drains which are not connected to the bus BT11 and the bus BT12 of the plurality of the transistors BT10 are each connected between two adjacent battery cells BT09.

A source or a drain of the transistor BT10 which is not connected to the bus BT11 on the most upstream side of the plurality of transistors BT10 is connected to a positive electrode terminal of a battery cell BT09 on the most upstream side of the battery portion BT08. A source or a drain of a transistor BT10 which is not connected to the bus BT11 of the transistor BT10 on the most downstream side of the plurality of transistors BT10 is connected to a negative electrode terminal of a battery cell BT09 on the most downstream side of the battery portion BT08.

The switching circuit BT04 connects the discharge battery cell group to the terminal pair BT01 by bringing one of the plurality of transistors BT10 which are connected to the bus BT11 and one of the plurality of transistors BT10 which are connected to the bus BT12 into an on state in response to the control signal S1 supplied to gates of the plurality of transistors BT10. Accordingly, the positive electrode terminal of the battery cell BT09 on the most upstream side of the discharge battery cell group is connected to one of the pair of terminals A1 and A2. In addition, the negative electrode terminal of the battery cell BT09 on the most downstream side of the discharge battery cell group is connected to the other of the pair of terminals A1 and A2 (i.e., a terminal which is not connected to the positive electrode terminal).

OS transistors are preferably used as the transistors BT10. Since the off-state current of the OS transistor is low, the amount of electric charge leaking from battery cells which do not belong to the discharge battery cell group can be reduced, and reduction in capacity with the lapse of time can be suppressed. In addition, dielectric breakdown is unlikely to occur in the OS transistor when a high voltage is applied. Therefore, the battery cell BT09 and the terminal pair BT01, which are connected to the transistor BT10 in an off state, can be insulated from each other even when an output voltage of the discharge battery cell group is high.

In FIG. 19, the switching circuit BT05 includes a plurality of transistors BT13, a current control switch BT14, a bus BT15, and a bus BT16. The bus BT15 and the bus BT16 are provided between the plurality of transistors BT13 and the current control switch BT14. Sources or drains of the plurality of transistors BT13 are connected alternately to the bus BT15 and the bus BT16. Sources or drains which are not connected to the bus BT15 and the bus BT16 of the plurality of transistors BT13 are each connected between two adjacent battery cells BT09.

A source or a drain of a transistor BT13 which is not connected to the bus BT15 on the most upstream side of the plurality of transistors BT13 is connected to the positive electrode terminal of the battery cell BT09 on the most upstream side of the battery portion BT08. A source or a drain of a transistor BT13 which is not connected to the bus BT15 on the most downstream side of the plurality of transistors BT13 is connected to the negative electrode terminal of the battery cell BT09 on the most downstream side of the battery portion BT08.

OS transistors are preferably used as the transistors BT13 like the transistors BT10. Since the off-state current of the OS transistor is low, the amount of electric charge leaking from the battery cells which do not belong to the charge battery cell group can be reduced, and reduction in capacity with the lapse of time can be suppressed. In addition, dielectric breakdown is unlikely to occur in the OS transistor when a high voltage is applied. Therefore, the battery cell BT09 and the terminal pair BT02, which are connected to the transistor BT13 in an off state, can be insulated from each other even when a voltage for charging the charge battery cell group is high.

The current control switch BT14 includes a switch pair BT17 and a switch pair BT18. One end of the switch pair BT17 is connected to the terminal B1. The other ends of the switch pair BT17 extend from respective switches. One switch is connected to the bus BT15, and the other switch is connected to the bus BT16. One end of the switch pair BT18 is connected to the terminal B2. The other ends of the switch pair BT18 extend from respective switches. One switch is connected to the bus BT15, and the other switch is connected to the bus BT16.

OS transistors are preferably used for the switches included in the switch pair BT17 and the switch pair BT18 like the transistors BT10 and BT13.

The switching circuit BT05 connects the charge battery cell group and the terminal pair BT02 by controlling the combination of on and off states of the transistors BT13 and the current control switch BT14 in response to the control signal S2.

For example, the switching circuit BT05 connects the charge battery cell group and the terminal pair BT02 in the following manner.

The switching circuit BT05 brings a transistor BT13 connected to the positive electrode terminal of a battery cell BT09 on the most upstream side of the charge battery cell group into an on state in response to the control signal S2 supplied to gates of the plurality of the transistors BT13. In addition, the switching circuit BT05 brings a transistor BT13 connected to the negative electrode terminal of a battery cell BT09 on the most downstream side of the charge battery cell group into an on state in response to the control signal S2 supplied to the gates of the plurality of the transistors BT13.

The polarities of voltages applied to the terminal pair BT02 can vary in accordance with the connection structures of the voltage transformer circuit BT07 and the discharge battery cell group connected to the terminal pair BT01. In order to supply current in a direction for charging the charge battery cell group, terminals with the same polarity of the terminal pair BT02 and the charge battery cell group are required to be connected. In view of this, the current control switch BT14 is controlled by the control signal S2 so that the connection destination of the switch pair BT17 and that of the switch pair BT18 are changed in accordance with the polarities of the voltages applied to the terminal pair BT02.

The state where voltages are applied to the terminal pair BT02 so as to make the terminal B1 a positive electrode and the terminal B2 a negative electrode is described as an example. Here, in the case where the battery cell BT09 positioned on the most downstream side of the battery portion BT08 is in the charge battery cell group, the switch pair BT17 is controlled to be connected to the positive electrode terminal of the battery cell BT09 in response to the control signal S2. That is, the switch of the switch pair BT17 connected to the bus BT16 is turned on, and the switch of the switch pair BT17 connected to the bus BT15 is turned off. In contrast, the switch pair BT18 is controlled to be connected to the negative electrode terminal of the battery cell BT09 positioned on the most downstream side of the battery portion BT08 in response to the control signal S2. That is, the switch of the switch pair BT18 connected to the bus BT15 is turned on, and the switch of the switch pair BT18 connected to the bus BT16 is turned off. In this manner, terminals with the same polarity of the terminal pair BT02 and the charge battery cell group are connected to each other. In addition, the current which flows from the terminal pair BT02 is controlled to be supplied in a direction so as to charge the charge battery cell group.

In addition, instead of the switching circuit BT05, the switching circuit BT04 may include the current control switch BT14. In that case, the polarities of the voltages applied to the terminal pair BT02 are controlled by controlling the polarities of the voltages applied to the terminal pair BT01 in response to the operation of the current control switch BT14 and the control signal S1. Thus, the current control switch BT14 controls the direction of current which flows to the charge battery cell group from the terminal pair BT02.

FIG. 20 is a circuit diagram illustrating structure examples of the switching circuit BT04 and the switching circuit BT05 which are different from those of FIG. 19.

In FIG. 20, the switching circuit BT04 includes a plurality of transistor pairs BT21, a bus BT24, and a bus BT25. The bus BT24 is connected to the terminal A1. The bus BT25 is connected to the terminal A2. One ends of the plurality of transistor pairs BT21 extend from transistors BT22 and transistors BT23. Sources or drains of the transistors BT22 are connected to the bus BT24. Sources or drains of the transistors BT23 are connected to the bus BT25. In addition, the other ends of the plurality of transistor pairs are each connected between two adjacent battery cells BT09. The other end of the transistor pair BT21 on the most upstream side of the plurality of transistor pairs BT21 is connected to the positive electrode terminal of the battery cell BT09 on the most upstream side of the battery portion BT08. The other end of the transistor pair BT21 on the most downstream side of the plurality of transistor pairs BT21 is connected to a negative electrode terminal of the battery cell BT09 on the most downstream side of the battery portion BT08.

The switching circuit BT04 switches the connection destination of the transistor pair BT21 to one of the terminal A1 and the terminal A2 by turning on or off the transistors BT22 and BT23 in response to the control signal S1. Specifically, when the transistor BT22 is turned on, the transistor BT23 is turned off, so that the connection destination of the transistor pair BT21 is the terminal A1. On the other hand, when the transistor BT23 is turned on, the transistor BT22 is turned off, so that the connection destination of the transistor pair BT21 is the terminal A2. Which of the transistors BT22 and BT23 is turned on is determined by the control signal S1.

Two transistor pairs BT21 are used to connect the terminal pair BT01 and the discharge battery cell group. Specifically, the connection destinations of the two transistor pairs BT21 are determined on the basis of the control signal S1, and the discharge battery cell group and the terminal pair BT01 are connected. The connection destinations of the two transistor pairs BT21 are controlled by the control signal S1 so that one of the connection destinations is the terminal A1 and the other is the terminal A2.

The switching circuit BT05 includes a plurality of transistor pairs BT31, a bus BT34 and a bus BT35. The bus BT34 is connected to the terminal B1. The bus BT35 is connected to the terminal B2. One ends of the plurality of transistor pairs BT31 extend from transistors BT32 and transistors BT33. One end extending from the transistor BT32 is connected to the bus BT34. One end extending from the transistor BT33 is connected to the bus BT35. The other ends of the plurality of transistor pairs BT31 are each connected between two adjacent battery cells BT09. The other end of the transistor pair BT31 on the most upstream side of the plurality of transistor pairs BT31 is connected to the positive electrode terminal of the battery cell BT09 on the most upstream side of the battery portion BT08. The other end of the transistor pair BT31 on the most downstream side of the plurality of transistor pairs BT31 is connected to the negative electrode terminal of the battery cell BT09 on the most downstream side of the battery portion BT08.

The switching circuit BT05 switches the connection destination of the transistor pair BT31 to one of the terminal B1 and the terminal B2 by turning on or off the transistors BT32 and BT33 in response to the control signal S2. Specifically, when the transistor BT32 is turned on, the transistor BT33 is turned off, so that the connection destination of the transistor pair BT31 is the terminal B1. On the other hand, when the transistor BT33 is turned on, the transistor BT32 is turned off, so that the connection destination of the transistor pair BT31 is the terminal B2. Which of the transistors BT32 and BT33 is turned on is determined by the control signal S2.

Two transistor pairs BT31 are used to connect the terminal pair BT02 and the charge battery cell group. Specifically, the connection destinations of the two transistor pairs BT31 are determined on the basis of the control signal S2, and the charge battery cell group and the terminal pair BT02 are connected. The connection destinations of the two transistor pairs BT31 are controlled by the control signal S2 so that one of the connection destinations is the terminal B1 and the other is the terminal B2.

The connection destinations of the two transistor pairs BT31 are determined by the polarities of the voltages applied to the terminal pair BT02. Specifically, in the case where voltages which make the terminal B1 a positive electrode and the terminal B2 a negative electrode are applied to the terminal pair BT02, the transistor pair BT31 on the upstream side is controlled by the control signal S2 so that the transistor BT32 is turned on and the transistor BT33 is turned off. In contrast, the transistor pair BT31 on the downstream side is controlled by the control signal S2 so that the transistor BT33 is turned on and the transistor BT32 is turned off. In the case where voltages which make the terminal B1 a negative electrode and the terminal B2 a positive electrode are applied to the terminal pair BT02, the transistor pair BT31 on the upstream side is controlled by the control signal S2 so that the transistor BT33 is turned on and the transistor BT32 is turned off. In contrast, the transistor pair BT31 on the downstream side is controlled by the control signal S2 so that the transistor BT32 is turned on and the transistor BT33 is turned off. In this manner, terminals with the same polarity of the terminal pair BT02 and the charge battery cell group are connected to each other. In addition, the current which flows from the terminal pair BT02 is controlled to be supplied in a direction for charging the charge battery cell group.

The voltage transformation control circuit BT06 controls operation of the voltage transformer circuit BT07. The voltage transformation control circuit BT06 generates a voltage transformation signal S3 for controlling the operation of the voltage transformer circuit BT07 on the basis of the number of the battery cells BT09 included in the discharge battery cell group and the number of the battery cells BT09 included in the charge battery cell group and outputs the voltage transformation signal S3 to the voltage transformer circuit BT07.

In the case where the number of the battery cells BT09 included in the discharge battery cell group is larger than that included in the charge battery cell group, it is necessary to prevent a charging voltage which is too high from being applied to the charge battery cell group. Thus, the voltage transformation control circuit BT06 outputs the voltage transformation signal S3 for controlling the voltage transformer circuit BT07 so that a discharging voltage (Vdis) is lowered within a range where the charge battery cell group can be charged.

In the case where the number of the battery cells BT09 included in the discharge battery cell group is less than or equal to that included in the charge battery cell group, a voltage necessary for charging the charge battery cell group needs to be secured. Therefore, the voltage transformation control circuit BT06 outputs the voltage transformation signal S3 for controlling the voltage transformer circuit BT07 so that the discharging voltage (Vdis) is raised within a range where a charging voltage which is too high is not applied to the charge battery cell group.

The voltage value of the charging voltage which is too high is determined in the light of product specifications and the like of the battery cell BT09 used in the battery portion BT08. The voltage which is raised or lowered by the voltage transformer circuit BT07 is applied as a charging voltage (Vcha) to the terminal pair BT02.

Figure 21A:
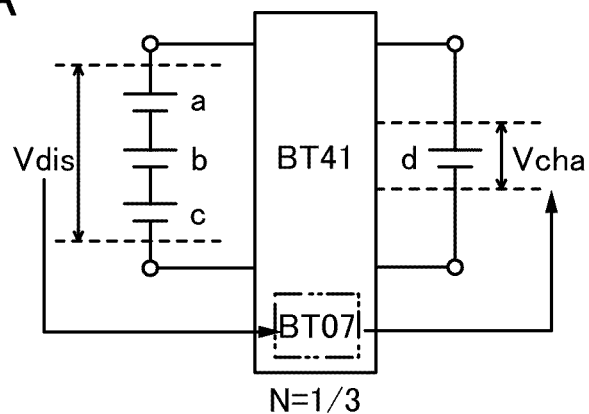
FIGS. 21A to 21C are conceptual diagrams illustrating a battery management unit of a power storage device.
Figure 21B:
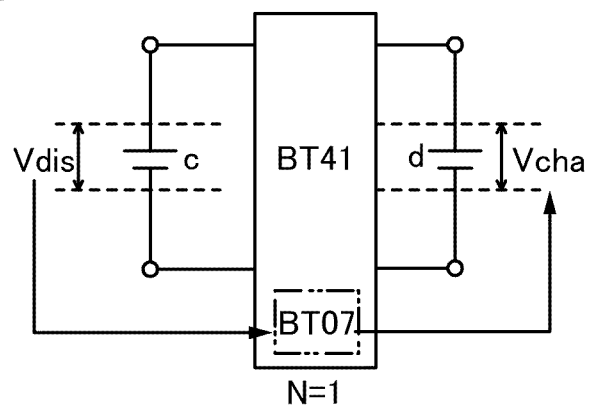
Figure 21C:
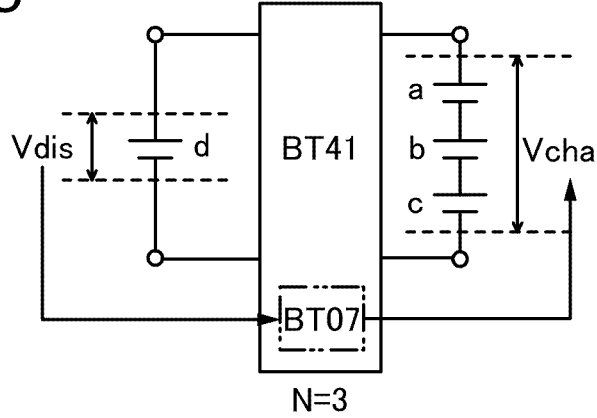

Here, operation examples of the voltage transformation control circuit BT06 in this embodiment are described with reference to FIGS. 21A to 21C. FIGS. 21A to 21C are conceptual diagrams for explaining the operation examples of the voltage transformation control circuit BT06 corresponding to the discharge battery cell group and the charge battery cell group described in FIGS. 18A to 18C. FIGS. 21A to 21C each illustrate a battery management unit BT41. The battery management unit BT41 includes the terminal pair BT01, the terminal pair BT02, the switching control circuit BT03, the switching circuit BT04, the switching circuit BT05, the voltage transformation control circuit BT06, and the voltage transformer circuit BT07.

In an example illustrated in FIG. 21A, the series of three high-voltage cells a to c and one low-voltage cell d are connected in series as described in FIG. 18A. In that case, as described using FIG. 18A, the switching control circuit BT03 selects the high-voltage cells a to c as the discharge battery cell group, and selects the low-voltage cell d as the charge battery cell group. The voltage transformation control circuit BT06 calculates a conversion ratio N for converting the discharging voltage (Vdis) to the charging voltage (Vcha) based on the ratio of the number of the battery cells BT09 included in the charge battery cell group to the number of the battery cells BT09 included in the discharge battery cell group.

In the case where the number of the battery cells BT09 included in the discharge battery cell group is larger than that included in the charge battery cell group, when a discharging voltage is applied to the terminal pair BT02 without transforming the voltage, overvoltage may be applied to the battery cells BT09 included in the charge battery cell group through the terminal pair BT02. Thus, in the case of FIG. 21A, it is necessary that a charging voltage (Vcha) applied to the terminal pair BT02 be lower than the discharging voltage. In addition, in order to charge the charge battery cell group, it is necessary that the charging voltage be higher than the total voltage of the battery cells BT09 included in the charge battery cell group. Thus, the voltage transformation control circuit BT06 sets the conversion ratio N larger than the ratio of the number of the battery cells BT09 included in the charge battery cell group to the number of the battery cells BT09 included in the discharge battery cell group.

Thus, the voltage transformation control circuit BT06 preferably sets the conversion ratio N larger than the ratio of the number of the battery cells BT09 included in the charge battery cell group to the number of the battery cells BT09 included in the discharge battery cell group by about 1% to 10%. Here, the charging voltage is made higher than the voltage of the charge battery cell group, but the charging voltage is equal to the voltage of the charge battery cell group in reality. Note that the voltage transformation control circuit BT06 feeds a current for charging the charge battery cell group in accordance with the conversion ratio N in order to make the voltage of the charge battery cell group equal to the charging voltage. The value of the current is set by the voltage transformation control circuit BT06.

In the example illustrated in FIG. 21A, since the number of the battery cells BT09 included in the discharge battery cell group is three and the number of the battery cells BT09 included in the charge battery cell group is one, the voltage transformation control circuit BT06 calculates a value which is slightly larger than ⅓ as the conversion ratio N. Then, the voltage transformation control circuit BT06 outputs the voltage transformation signal S3, which lowers the discharging voltage in accordance with the conversion ratio N and converts the voltage into a charging voltage, to the voltage transformer circuit BT07. The voltage transformer circuit BT07 applies the charging voltage which is obtained by transformation in response to the voltage transformation signal S3 to the terminal pair BT02. Then, the battery cells BT09 included in the charge battery cell group are charged with the charging voltage applied to the terminal pair BT02.

In each of examples illustrated in FIGS. 21B and 21C, the conversion ratio N is calculated in a manner similar to that of FIG. 21A. In each of the examples illustrated in FIGS. 21B and 21C, since the number of the battery cells BT09 included in the discharge battery cell group is less than or equal to the number of the battery cells BT09 included in the charge battery cell group, the conversion ratio N is 1 or more. Therefore, in this case, the voltage transformation control circuit BT06 outputs the voltage transformation signal S3 for raising the discharging voltage and converting the voltage into the charging voltage.

The voltage transformer circuit BT07 converts the discharging voltage applied to the terminal pair BT01 into a charging voltage on the basis of the voltage transformation signal S3. The voltage transformer circuit BT07 applies the converted charging voltage to the terminal pair BT02. Here, the voltage transformer circuit BT07 electrically insulates the terminal pair BT01 from the terminal pair BT02. Accordingly, the voltage transformer circuit BT07 prevents a short circuit due to a difference between the absolute voltage of the negative electrode terminal of the battery cell BT09 on the most downstream side of the discharge battery cell group and the absolute voltage of the negative electrode terminal of the battery cell BT09 on the most downstream side of the charge battery cell group. Furthermore, the voltage transformer circuit BT07 converts the discharging voltage, which is the total voltage of the discharge battery cell group, into the charging voltage on the basis of the voltage transformation signal S3 as described above.

An insulated direct current (DC)-DC converter or the like can be used in the voltage transformer circuit BT07. In that case, the voltage transformation control circuit BT06 controls the charging voltage converted by the voltage transformer circuit BT07 by outputting a signal for controlling the on/off ratio (the duty ratio) of the insulated DC-DC converter as the voltage transformation signal S3.

Examples of the insulated DC-DC converter include a flyback converter, a forward converter, a ringing choke converter (RCC), a push-pull converter, a half-bridge converter, and a full-bridge converter, and a suitable converter is selected in accordance with the value of the intended output voltage.

Figure 22:
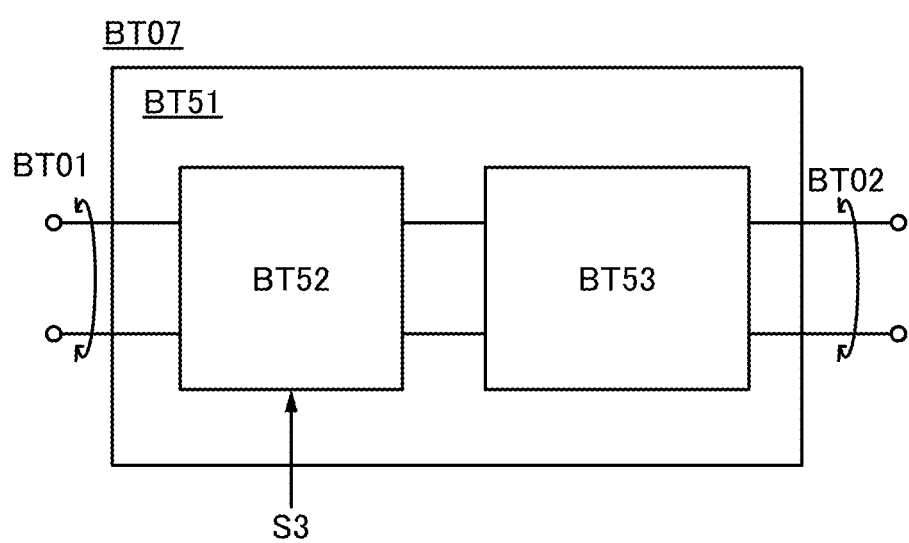
FIG. 22 is a block diagram illustrating a battery management unit of a power storage device.

The structure of the voltage transformer circuit BT07 including the insulated DC-DC converter is illustrated in FIG. 22. An insulated DC-DC converter BT51 includes a switch portion BT52 and a transformer BT53. The switch portion BT52 is a switch for switching on/off of the insulated DC-DC converter, and a metal oxide semiconductor field-effect transistor (MOSFET), a bipolar transistor, or the like is used as the switch portion BT52. The switch portion BT52 periodically turns on and off the insulated DC-DC converter BT51 in accordance with the voltage transformation signal S3 controlling the on/off ratio which is output from the voltage transformation control circuit BT06. The switch portion BT52 can have any of various structures in accordance with the type of the insulated DC-DC converter which is used. The transformer BT53 converts the discharging voltage applied from the terminal pair BT01 into the charging voltage. In detail, the transformer BT53 operates in conjunction with the on/off state of the switch portion BT52 and converts the discharging voltage into the charging voltage in accordance with the on/off ratio. As the time during which the switch portion BT52 is on becomes longer in its switching period, the charging voltage is increased. On the other hand, as the time during which the switch portion BT52 is on becomes shorter in its switching period, the charging voltage is decreased. In the case where the insulated DC-DC converter is used, the terminal pair BT01 and the terminal pair BT02 can be insulated from each other inside the transformer BT53.

Figure 23:
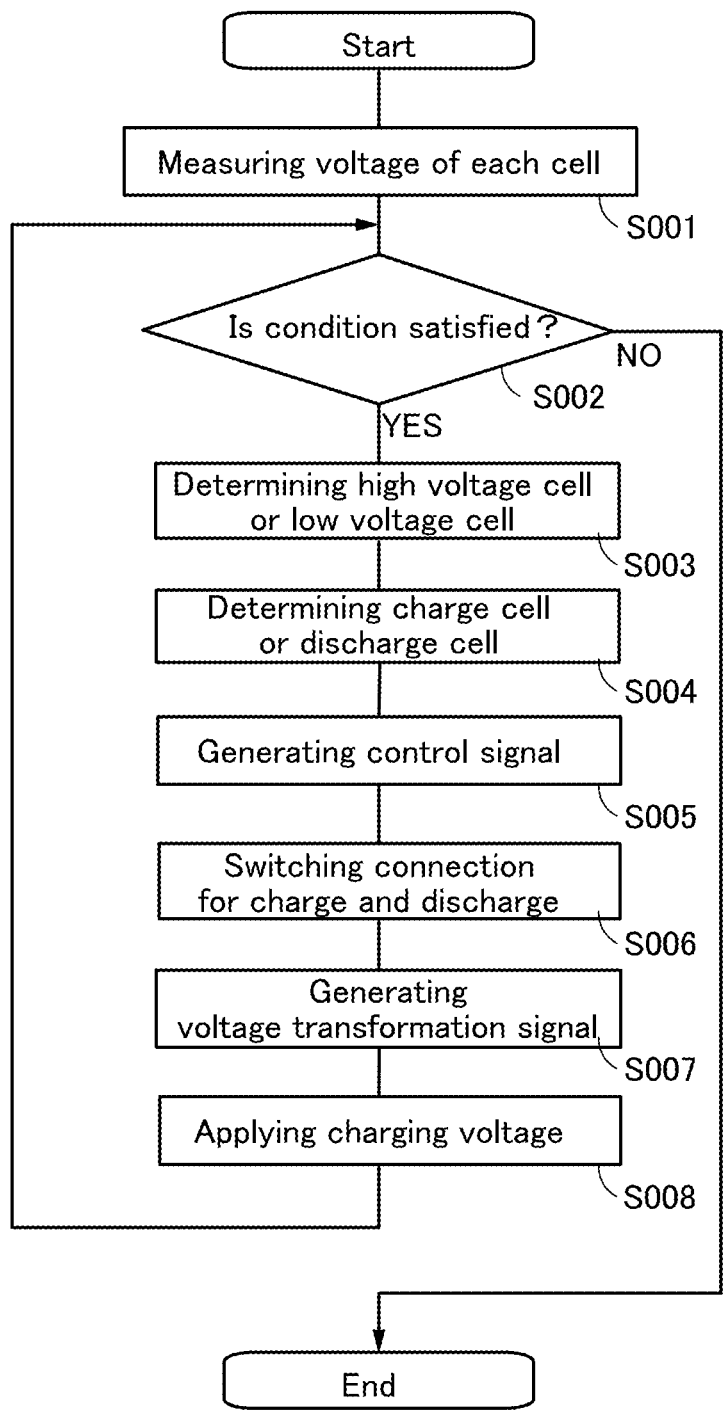
FIG. 23 is a flow chart showing an operation of a battery management unit of a power storage device.

A flow of operation of the power storage device BT00 in this embodiment is described with reference to FIG. 23. FIG. 23 is a flow chart illustrating the flow of the operation of the power storage device BT00.

First, the power storage device BT00 obtains a voltage measured for each of the plurality of battery cells BT09 (step S001). Then, the power storage device BT00 determines whether or not the condition for starting the operation of suppressing variation in voltages of the plurality of battery cells BT09 lower than the predetermined threshold value is satisfied (step S002). An example of the condition can be that the difference between the maximum value and the minimum value of the voltage measured for each of the plurality of battery cells BT09 is higher than or equal to the predetermined threshold value. In the case where the condition is not satisfied (step S002: NO), the power storage device BT00 does not perform the following operation because voltages of the battery cells BT09 are well balanced. In contrast, in the case where the condition is satisfied (step S002: YES), the power storage device BT00 performs the operation of suppressing variation in the voltages of the battery cells BT09 lower than the predetermined threshold value. In this operation, the power storage device BT00 determines whether each battery cell BT09 is a high-voltage cell or a low-voltage cell on the basis of the measured voltage of each cell (step S003). Then, the power storage device BT00 determines a discharge battery cell group and a charge battery cell group on the basis of the determination result (step S004). In addition, the power storage device BT00 generates the control signal S1 for setting the determined discharge battery cell group as the connection destination of the terminal pair BT01, and the control signal S2 for setting the determined charge battery cell group as the connection destination of the terminal pair BT02 (step S005). The power storage device BT00 outputs the generated control signals S1 and S2 to the switching circuit BT04 and the switching circuit BT05, respectively. Then, the switching circuit BT04 connects the terminal pair BT01 and the discharge battery cell group, and the switching circuit BT05 connects the terminal pair BT02 and the discharge battery cell group (step S006). The power storage device BT00 generates the voltage transformation signal S3 based on the number of the battery cells BT09 included in the discharge battery cell group and the number of the battery cells BT09 included in the charge battery cell group (step S007). Then, the power storage device BT00 converts the discharging voltage applied to the terminal pair BT01 into a charging voltage based on the voltage transformation signal S3 and applies the charging voltage to the terminal pair BT02 (step S008). In this way, electric charge of the discharge battery cell group is transferred to the charge battery cell group.

Although the plurality of steps are shown in order in the flow chart of FIG. 23, the order of performing the steps is not limited to the order.

According to the above embodiment, when an electric charge is transferred from the discharge battery cell group to the charge battery cell group, a structure where an electric charge from the discharge battery cell group is temporarily stored, and the stored electric charge is sent to the charge battery cell group is unnecessary, unlike in the a capacitor type circuit. Accordingly, the charge transfer efficiency per unit time can be increased. In addition, the switching circuit BT04 and the switching circuit BT05 determine which battery cell in the discharge battery cell group and the charge battery cell group to be connected to the voltage transformer circuit.

Furthermore, the voltage transformer circuit BT07 converts the discharging voltage applied to the terminal pair BT01 into the charging voltage based on the number of the battery cells BT09 included in the discharge battery cell group and the number of the battery cells BT09 included in the charge battery cell group, and applies the charging voltage to the terminal pair BT02. Thus, even when any battery cell BT09 is selected as the discharge battery cell group and the charge battery cell group, an electric charge can be transferred without any problems.

Furthermore, the use of OS transistors as the transistor BT10 and the transistor BT13 can reduce the amount of electric charge leaking from the battery cells BT09 which do not belong to the charge battery cell group or the discharge battery cell group. Accordingly, a decrease in capacity of the battery cells BT09 which do not contribute to charging or discharging can be suppressed. In addition, the variation in characteristics of the OS transistor due to heat is smaller than that of an Si transistor. Accordingly, even when the temperature of the battery cells BT09 is increased, an operation such as turning on or off the transistors in response to the control signals S1 and S2 can be performed normally.

Embodiment 6

In this embodiment, an example of an electronic device including the secondary battery including the negative electrode described in Embodiment 1 is described.

FIGS. 24A to 24F illustrate examples of electronic devices including flexible secondary batteries. Examples of an electronic device including a flexible secondary battery include television sets (also referred to as televisions or television receivers), monitors of computers or the like, digital cameras or digital video cameras, digital photo frames, mobile phones (also referred to as cellular phones or mobile phone devices), portable game machines, portable information terminals, audio reproducing devices, and large game machines such as pachinko machines.

In addition, a flexible secondary battery can be incorporated along a curved inside/outside wall surface of a house or a building or a curved interior/exterior surface of an automobile.

Figure 24A:
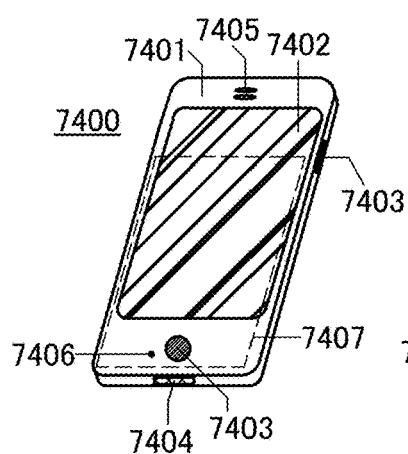
FIGS. 24A to 24F illustrate examples of electronic devices.

FIG. 24A illustrates an example of a mobile phone. A cellular phone 7400 is provided with a display portion 7402 incorporated in a housing 7401, an operation button 7403, an external connection port 7404, a speaker 7405, a microphone 7406, and the like. Note that the mobile phone 7400 includes a secondary battery 7407.

Figure 24B:
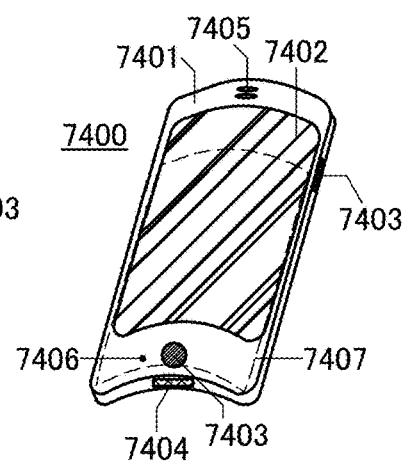
Figure 24C:
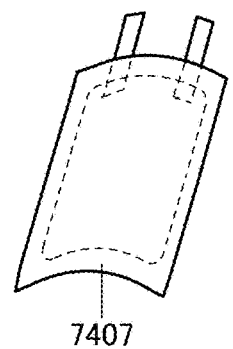

The mobile phone 7400 illustrated in FIG. 24B is bent. When the whole mobile phone 7400 is curved by external force, the secondary battery 7407 included in the mobile phone 7400 is also curved. FIG. 24C illustrates the curved secondary battery 7407. The secondary battery 7407 is a thin secondary battery. The secondary battery 7407 is curved and fixed.

Figure 24D:
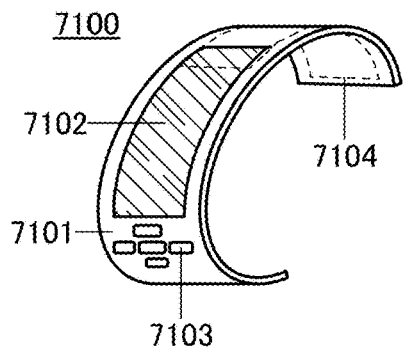
Figure 24E:
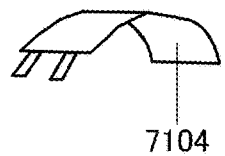
Figure 24F:
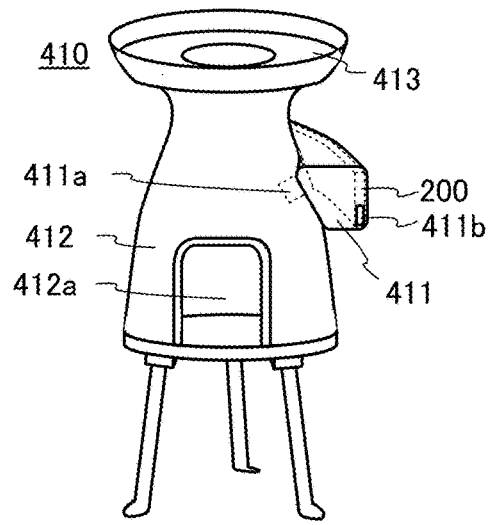

FIG. 24D illustrates an example of a bangle display device. A portable display device 7100 includes a housing 7101, a display portion 7102, an operation button 7103, and a secondary battery 7104. FIG. 24E illustrates the bent secondary battery 7104. When the curved secondary battery 7104 is on a user's arm, the housing changes its form and the curvature of a part or the whole of the secondary battery 7104 is changed. Note that the radius of curvature of a curve at a point refers to the radius of the circular arc that best approximates the curve at that point. The reciprocal of the radius of curvature is curvature. Specifically, a part or the whole of the housing or the main surface of the secondary battery 7104 is changed in the range of radius of curvature from 40 mm to 150 mm. When the radius of curvature at the main surface of the secondary battery 7104 is 40 mm to 150 mm, the reliability can be kept high.

A flexile secondary battery can be provided with high space efficiency in any of a variety of electronic devices. For example, in a stove 410 illustrated in FIG. 24F, a module 411 is attached to a main body 412. The module 411 includes the secondary battery 200, a motor, a fan, an air outlet 411a, and a thermoelectric generation device. In the stove 410, after a fuel is injected through an opening 412a and ignited, outside air can be sent through the air outlet 411a to the inside of the stove 410 by rotating the motor and the fan which are included in the module 411 using power of the secondary battery 200. In this manner, the stove 410 can have strong heating power because outside air can be taken into the inside of the stove 410 efficiently. In addition, cooking can be performed on an upper grill 413 with thermal energy generated by the combustion of fuel. The thermal energy is converted into power with the thermoelectric generation device of the module 411, and the secondary battery 200 is charged with the power. The power charged into the secondary battery 200 can be output through an external terminal 411b.

This embodiment can be implemented in appropriate combination with any of the structures described in the other embodiments.

Embodiment 7

In this embodiment, examples of electronic devices that can include the secondary battery including the negative electrode described in Embodiment 1 are described.

Figure 25A:
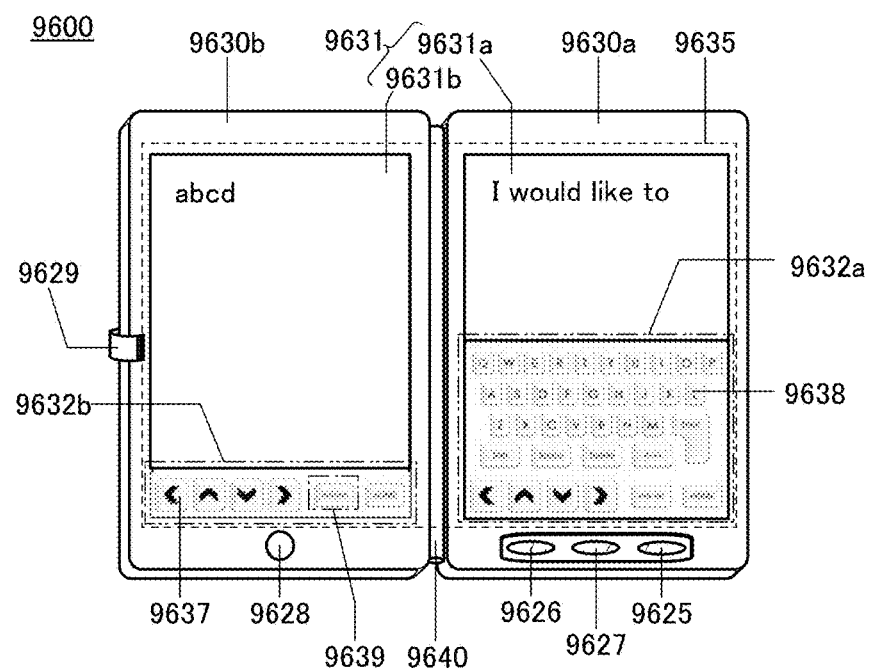
FIGS. 25A to 25C illustrate an example of an electronic device.
Figure 25B:
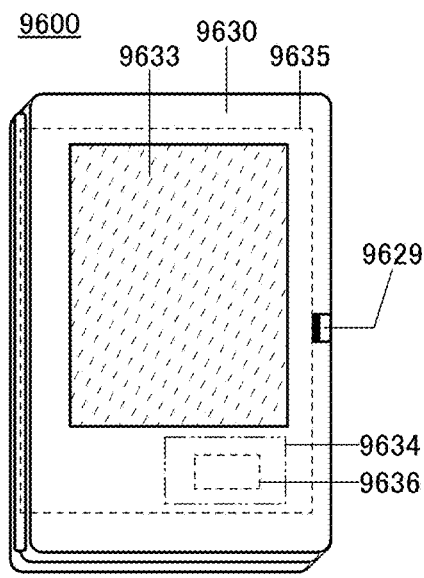

FIGS. 25A and 25B illustrate an example of a foldable tablet terminal. A tablet terminal 9600 illustrated in FIGS. 25A and 25B includes a housing 9630a, a housing 9630b, a movable portion 9640 connecting the housings 9630a and 9630b, a display portion 9631 provided with a display portion 9631a and a display portion 9631b, a display mode switch 9626, a power switch 9627, a power saver switch 9625, a fastener 9629, and an operation switch 9628. FIGS. 25A and 25B illustrate the tablet terminal 9600 opened and closed, respectively.

The tablet terminal 9600 includes a secondary battery 9635 inside the housings 9630a and 9630b. The secondary battery 9635 is provided across the housings 9630a and 9630b, passing through the movable portion 9640.

Part of the display portion 9631a can be a touch panel region 9632a, and data can be input by touching operation keys 9638 that are displayed. Note that FIG. 25A shows, as an example, that half of the area of the display portion 9631a has only a display function and the other half of the area has a touch panel function. However, the structure of the display portion 9631a is not limited to this, and all the area of the display portion 9631a may have a touch panel function. For example, all the area of the display portion 9631a can display keyboard buttons and serve as a touch panel while the display portion 9631b can be used as a display screen.

As in the display portion 9631a, part of the display portion 9631b can be a touch panel region 9632b. When a keyboard display switching button 9639 displayed on the touch panel is touched with a finger, a stylus, or the like, a keyboard can be displayed on the display portion 9631b.

Touch input can be performed in the touch panel region 9632a and the touch panel region 9632b at the same time.

The switch 9626 for switching a display mode allows switching between a landscape mode and a portrait mode, color display and black-and-white display, and the like. The power saver switch 9625 can control display luminance in accordance with the amount of external light in use of the tablet terminal 9600, which is measured with an optical sensor incorporated in the tablet terminal 9600. In addition to the optical sensor, other detecting devices such as sensors for determining inclination, such as a gyroscope or an acceleration sensor, may be incorporated in the tablet terminal.

Note that FIG. 25A shows an example in which the display portion 9631a and the display portion 9631b have the same display area; however, one embodiment of the present invention is not limited and one of the display portions may be different from the other display portion in size and display quality. For example, one of the display portions 9631a and 9631b may display higher definition images than the other.

The tablet terminal is closed in FIG. 25B. The tablet terminal includes the housing 9630, a solar cell 9633, and a charge and discharge control circuit 9634 including a DC-DC converter 9636. The secondary battery of one embodiment of the present invention is used for the secondary battery 9635.

The tablet terminal 9600 can be folded so that the housings 9630a and 9630b overlap with each other when not in use. Thus, the display portions 9631a and 9631b can be protected, which increases the durability of the tablet terminal 9600. In addition, the secondary battery 9635 of one embodiment of the present invention has flexibility and can be repeatedly bent without a large decrease in charge and discharge capacity. Thus, a highly reliable tablet terminal can be provided.

The tablet terminal illustrated in FIGS. 25A and 25B can also have a function of displaying various kinds of data (e.g., a still image, a moving image, and a text image), a function of displaying a calendar, a date, or the time on the display portion, a touch-input function of operating or editing data displayed on the display portion by touch input, a function of controlling processing by various kinds of software (programs), and the like.

The solar cell 9633, which is attached on the surface of the tablet terminal, supplies electric power to a touch panel, a display portion, an image signal processor, and the like. Note that the solar cell 9633 can be provided on one or both surfaces of the housing 9630 and the secondary battery 9635 can be charged efficiently. When the secondary battery of one embodiment of the present invention is used as the secondary battery 9635, a tablet terminal can be used for a long period because the deterioration of discharge capacity caused by repetition of charging and discharging can be suppressed.

Figure 25C:
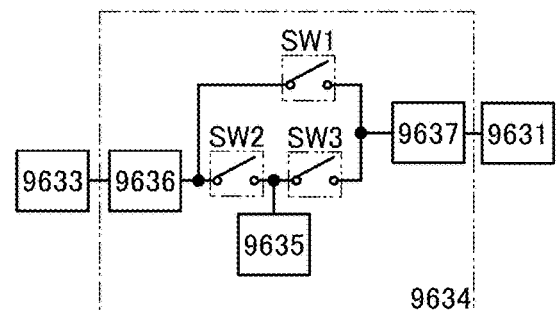

The structure and the operation of the charge and discharge control circuit 9634 illustrated in FIG. 25B will be described with reference to a block diagram in FIG. 25C. The solar cell 9633, the secondary battery 9635, the DC-DC converter 9636, a converter 9637, switches SW1 to SW3, and the display portion 9631 are illustrated in FIG. 25C, and the secondary battery 9635, the DC-DC converter 9636, the converter 9637, and the switches SW1 to SW3 correspond to the charge and discharge control circuit 9634 in FIG. 25B.

First, an example of operation in the case where power is generated by the solar cell 9633 using external light is described. The voltage of electric power generated by the solar cell is raised or lowered by the DC-DC converter 9636 to a voltage for charging the secondary battery 9635. When the display portion 9631 is operated with the power from the solar cell 9633, the switch SW1 is turned on and the voltage of the power is raised or lowered by the converter 9637 to a voltage needed for operating the display portion 9631. In addition, when display on the display portion 9631 is not performed, the switch SW1 is turned off and the switch SW2 is turned on so that the secondary battery 9635 may be charged.

Note that the solar cell 9633 is described as an example of a power generation means; however, one embodiment of the present invention is not limited to this example. The secondary battery 9635 may be charged using another power generation means such as a piezoelectric element or a thermoelectric conversion element (Peltier element). For example, the secondary battery 9635 may be charged with a non-contact power transmission module capable of performing charging by transmitting and receiving electric power wirelessly (without contact), or any of the other charge means used in combination.

Figure 26:
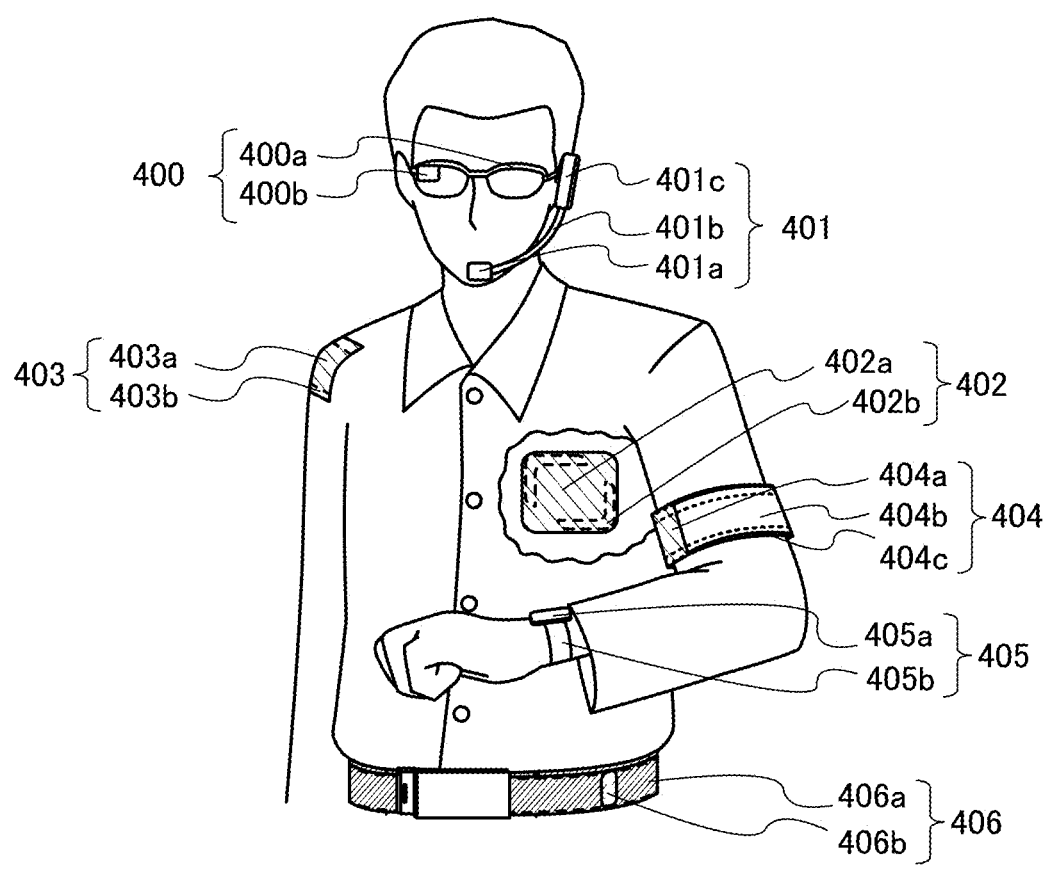
FIG. 26 illustrates examples of electronic devices.

The secondary battery including the negative electrode described in Embodiment 1 can be provided in wearable devices illustrated in FIG. 26.

For example, the secondary battery can be provided in a glasses-type device 400 illustrated in FIG. 26. The glasses-type device 400 includes a frame 400a and a display part 400b. The secondary battery 200 is provided in a temple of the frame 400a having a curved shape, whereby the glasses-type device 400 can have a well-balanced weight and can be used continuously for a long time.

The secondary battery can be provided in a headset-type device 401. The headset-type device 401 includes at least a microphone part 401a, a flexible pipe 401b, and an earphone part 401c. The secondary battery 200 can be provided in the flexible pipe 401b and the earphone part 401c.

Furthermore, the secondary battery can be provided in a device 402 that can be attached directly to a body. The secondary battery 402b is provided in a thin housing 402a of the device 402.

Furthermore, the secondary battery can be provided in a device 403 that can be attached to clothes. The secondary battery 403b can be provided in a thin housing 403a of the device 403.

Furthermore, the secondary battery can be provided in an armband device 404. In the armband device 404, a display portion 404b is provided over a main body 404a and a secondary battery 404c can be provided in the main body 404a.

Furthermore, the secondary battery can be provided in a watch-type device 405. The watch-type device 405 includes a display portion 405a and a belt portion 405b, and the secondary battery 200 can be provided in the display portion 405a or the belt portion 405b.

Furthermore, the secondary battery can be provided in a belt-type device 406. The belt-type device 406 includes a display portion 406a and a wireless power feeding and receiving portion 406b, and the secondary battery 200 can be provided inside the belt portion 406a.

Figure 27:
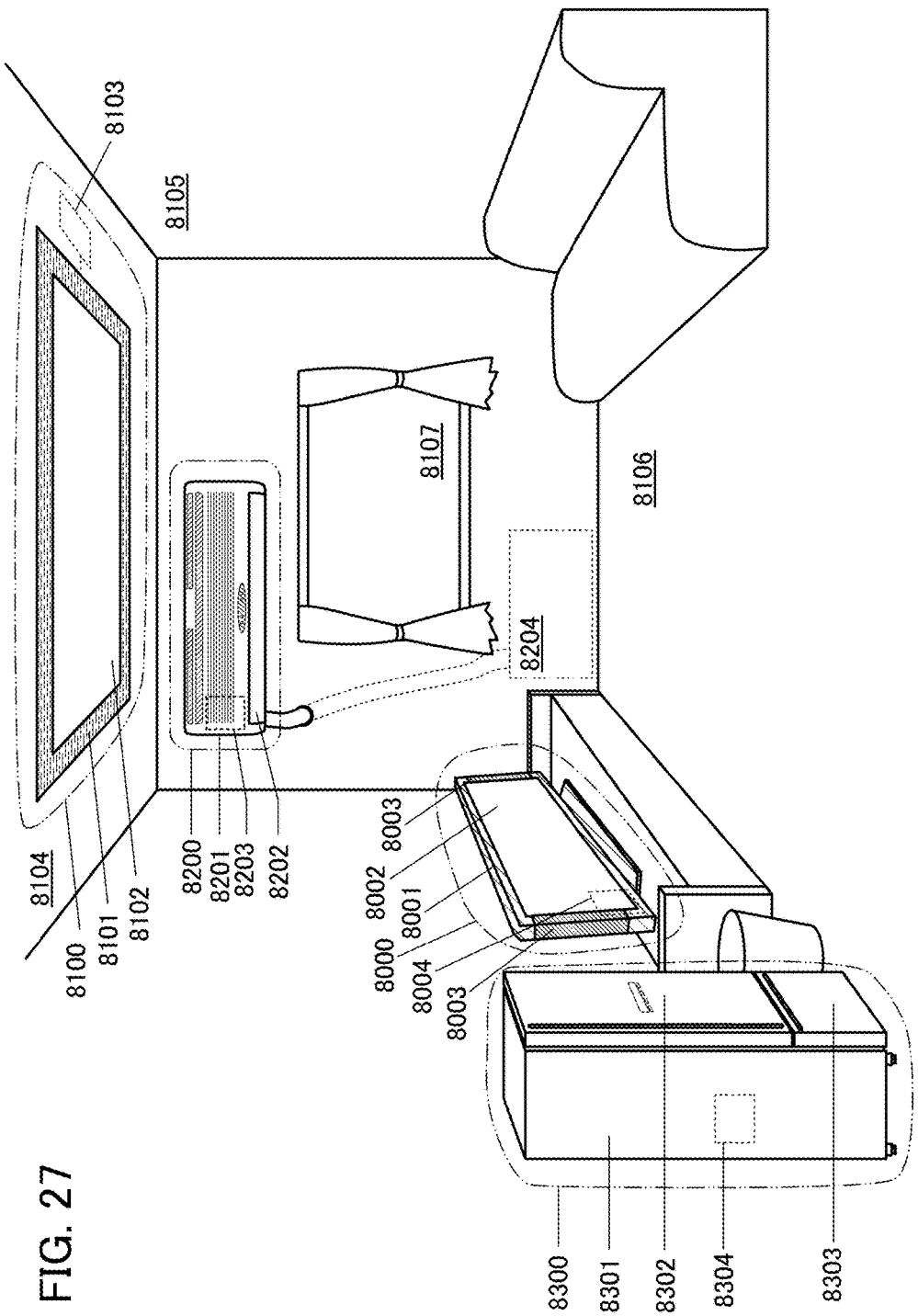
FIG. 27 illustrates examples of electronic devices.

FIG. 27 illustrates examples of other electronic devices. In FIG. 27, a display device 8000 is an example of an electronic device using a secondary battery 8004 of one embodiment of the present invention. Specifically, the display device 8000 corresponds to a display device for TV broadcast reception and includes a housing 8001, a display portion 8002, speaker portions 8003, the secondary battery 8004, and the like. The secondary battery 8004 of one embodiment of the present invention is provided in the housing 8001. The display device 8000 can receive power from a commercial power source. Alternatively, the display device 8000 can use power stored in the secondary battery 8004. Thus, the display device 8000 can be operated with the use of the secondary battery 8004 of one embodiment of the present invention as an uninterruptible power source even when power cannot be supplied from a commercial power source due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used for the display portion 8002.

Note that the display device includes, in its category, all of information display devices for personal computers, advertisement displays, and the like besides TV broadcast reception.

In FIG. 27, an installation lighting device 8100 is an example of an electronic device using a secondary battery 8103 of one embodiment of the present invention. Specifically, the installation lighting device 8100 includes a housing 8101, a light source 8102, the secondary battery 8103, and the like. Although FIG. 27 illustrates the case where the secondary battery 8103 is provided in a ceiling 8104 on which the housing 8101 and the light source 8102 are installed, the secondary battery 8103 may be provided in the housing 8101. The installation lighting device 8100 can receive power from a commercial power source. Alternatively, the installation lighting device 8100 can use power stored in the secondary battery 8103. Thus, the installation lighting device 8100 can be operated with the use of the secondary battery 8103 of one embodiment of the present invention as an uninterruptible power source even when power cannot be supplied from a commercial power source due to power failure or the like.

Note that although the installation lighting device 8100 provided in the ceiling 8104 is illustrated in FIG. 27 as an example, the secondary battery of one embodiment of the present invention can be used as an installation lighting device provided in, for example, a wall 8105, a floor 8106, a window 8107, or the like other than the ceiling 8104. Alternatively, the secondary battery can be used in a tabletop lighting device or the like.

As the light source 8102, an artificial light source which emits light artificially by using electric power can be used. Specifically, an incandescent lamp, a discharge lamp such as a fluorescent lamp, and light-emitting elements such as an LED and an organic EL element are given as examples of the artificial light source.

In FIG. 27, an air conditioner including an indoor unit 8200 and an outdoor unit 8204 is an example of an electronic device using a secondary battery 8203 of one embodiment of the present invention. Specifically, the indoor unit 8200 includes a housing 8201, an air outlet 8202, the secondary battery 8203, and the like. Although FIG. 27 illustrates the case where the secondary battery 8203 is provided in the indoor unit 8200, the secondary battery 8203 may be provided in the outdoor unit 8204. Alternatively, the secondary batteries 8203 may be provided in both the indoor unit 8200 and the outdoor unit 8204. The air conditioner can receive power from a commercial power source. Alternatively, the air conditioner can use power stored in the secondary battery 8203. Particularly in the case where the secondary batteries 8203 are provided in both the indoor unit 8200 and the outdoor unit 8204, the air conditioner can be operated with the use of the secondary battery 8203 of one embodiment of the present invention as an uninterruptible power source even when power cannot be supplied from a commercial power source due to power failure or the like.

Note that although the split-type air conditioner including the indoor unit and the outdoor unit is illustrated in FIG. 27 as an example, the secondary battery of one embodiment of the present invention can be used in an air conditioner in which the functions of an indoor unit and an outdoor unit are integrated in one housing.

In FIG. 27, an electric refrigerator-freezer 8300 is an example of an electronic device using a secondary battery 8304 of one embodiment of the present invention. Specifically, the electric refrigerator-freezer 8300 includes a housing 8301, a door for a refrigerator 8302, a door for a freezer 8303, the secondary battery 8304, and the like. The secondary battery 8304 is provided inside the housing 8301 in FIG. 27. The electric refrigerator-freezer 8300 can receive power from a commercial power source. Alternatively, the electric refrigerator-freezer 8300 can use power stored in the secondary battery 8304. Thus, the electric refrigerator-freezer 8300 can be operated with the use of the secondary battery 8304 of one embodiment of the present invention as an uninterruptible power source even when power cannot be supplied from a commercial power source due to power failure or the like.

This embodiment can be implemented in appropriate combination with any of the structures described in the other embodiments.

Embodiment 8

In this embodiment, examples of vehicles including the secondary battery including the negative electrode described in Embodiment 1 are described.

The use of secondary batteries in vehicles enables production of next-generation clean energy vehicles such as hybrid electric vehicles (HEVs), electric vehicles (EVs), and plug-in hybrid electric vehicles (PHEVs).

Figure 28A:
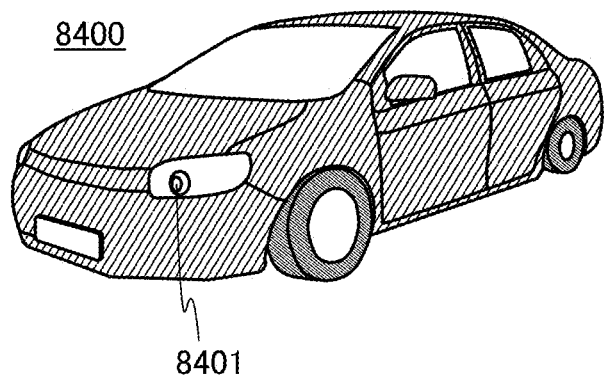
FIGS. 28A and 28B illustrate examples of electronic devices.
Figure 28B:
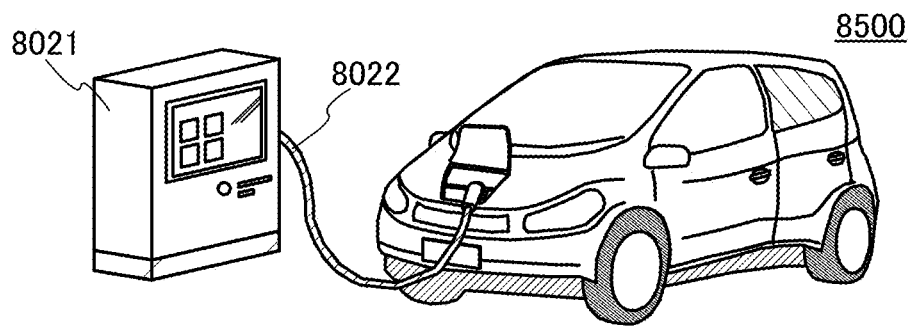

FIGS. 28A and 28B each illustrate an example of a vehicle using one embodiment of the present invention. An automobile 8400 illustrated in FIG. 28A is an electric vehicle which runs on the power of the electric motor. Alternatively, the automobile 8400 is a hybrid electric vehicle capable of driving using either the electric motor or the engine as appropriate. One embodiment of the present invention achieves a high-mileage vehicle. The automobile 8400 includes the secondary battery. The secondary battery is used not only to drive the electric motor, but also to supply electric power to a light-emitting device such as a headlight 8401 or a room light (not illustrated).

The secondary battery can also supply electric power to a display device of a speedometer, a tachometer, or the like included in the automobile 8400. Furthermore, the secondary battery can supply electric power to a semiconductor device included in the automobile 8400, such as a navigation system.

FIG. 28B illustrates an automobile 8500 including the secondary battery. The automobile 8500 can be charged when the secondary battery is supplied with electric power through external charging equipment by a plug-in system, a contactless power feeding system, or the like. In FIG. 28B, the power storage device included in the automobile 8500 is charged with the use of a ground-based charging apparatus 8021 through a cable 8022. In charging, a given method such as CHAdeMO (registered trademark) or Combined Charging System may be referred to for a charging method, the standard of a connector, or the like as appropriate. The charging apparatus 8021 may be a charging station provided in a commerce facility or a power source in a house. With the use of a plug-in technique, the secondary battery included in the automobile 8500 can be charged by being supplied with electric power from outside, for example. The charging can be performed by converting AC electric power into DC electric power through a converter such as an AC-DC converter.

Further, although not illustrated, the vehicle may include a power receiving device so as to be charged by being supplied with electric power from an above-ground power transmitting device in a contactless manner. In the case of the contactless power supply system, by fitting the power transmitting device in a road or an exterior wall, charging can be performed not only when the electric vehicle is stopped but also when driven. In addition, the contactless power supply system may be utilized to perform transmission/reception between vehicles. A solar cell may be provided in the exterior of the automobile to charge the secondary battery when the automobile stops or moves. To supply electric power in such a contactless manner, an electromagnetic induction method or a magnetic resonance method can be used.

According to one embodiment of the present invention, the secondary battery can have improved cycle characteristics and reliability. Furthermore, according to one embodiment of the present invention, the secondary battery itself can be made compact and lightweight as a result of improved characteristics of the secondary battery. The compact and lightweight secondary battery contributes to a reduction in the weight of a vehicle, and thus increases the driving radius. Furthermore, the secondary battery included in the vehicle can be used as a power source for supplying electric power to products other than the vehicle. In such a case, the use of a commercial power source can be avoided at peak time of electric power demand.

This embodiment can be implemented in appropriate combination with any of the structures described in the other embodiments.

Example 1

In this example, description is given of the comparison results after charging and discharging of a negative electrode having a plurality of projections and depressions provided in the negative electrode current collector and the negative electrode active material layer and the negative electrode which does not have projections and depressions provided in the negative electrode current collector and the negative electrode active material layer.

(Sample A)

First, a negative electrode having a plurality of projections and depressions provided in a negative electrode current collector and a negative electrode active material layer is formed as a sample A, and a secondary battery which incorporates the negative electrode was charged and discharged while pressure was applied to the secondary battery.

The negative electrode of the sample A was formed in the following manner. First, 18-μm-thick copper foil was used as a negative electrode current collector. SiO with a particle size of about 5 μm was used as the negative electrode active material, and acetylene black (AB) and polyimide (PI) as a conductive additive and a binder were mixed thereto. The ratio of the SiO, AB and PI in the mixture was 80:5:15 (weight ratio). One surface of the negative electrode current collector was coated with the mixture, whereby the negative electrode active material layer was formed.

Figure 29A:
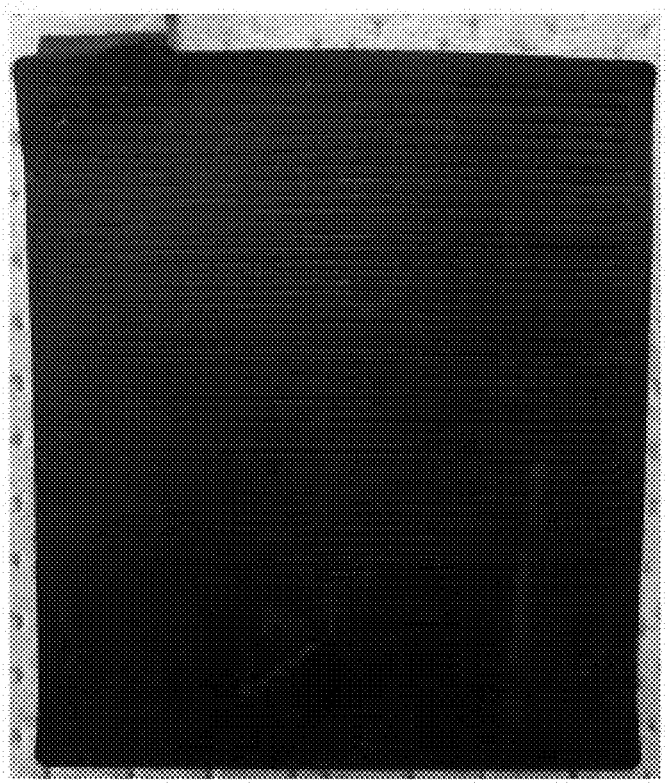
FIGS. 29A and 29B are photographs of a negative electrode before being charged and discharged.
Figure 29B:
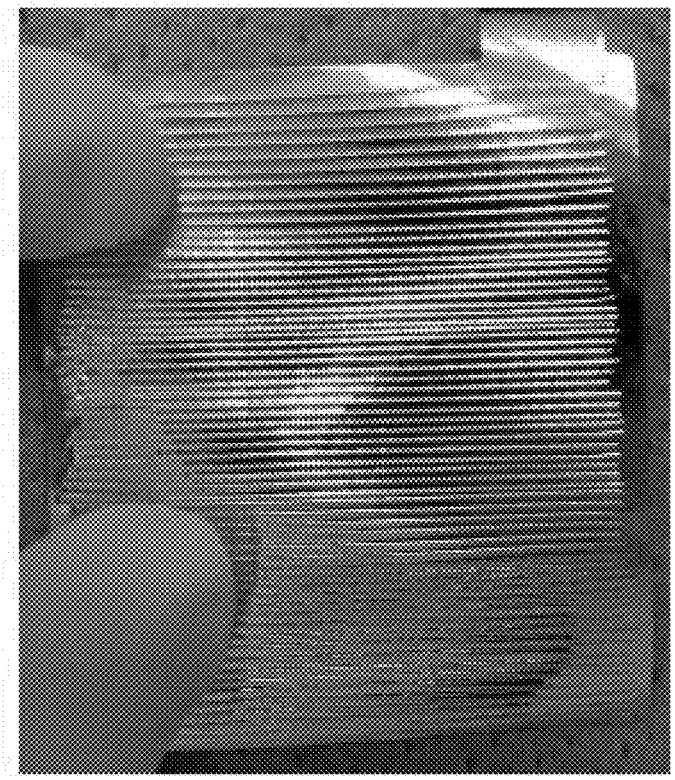

After the negative electrode active material layer was formed on the negative electrode current collector, a plurality of projections and depressions were formed parallel to each other with a space of about 1 mm by using a cutter knife. FIG. 29 shows a negative electrode in which a plurality of projections and depressions were formed in the negative electrode current collector and the negative electrode active material layer. FIG. 29A shows a surface of the negative electrode current collector on which the negative electrode active material layer was formed, FIG. 29B shows a surface of the negative electrode current collector on which the negative electrode active material layer was not formed.

A secondary battery was fabricated using the negative electrode formed through the above step. Other materials of the secondary battery are described below.

Aluminum was used for a positive electrode current collector. A material represented by a composition formula $Li_{1.68}Mn_{0.8062}Ni_{0.318}O_3$ was used as a positive electrode active material, and acetylene black (AB) and PVDF as a conductive additive and a binder were mixed thereto. The ratio of $Li_{1.68}Mn_{0.8062}Ni_{0.318}O_3$, AB, and PVDF in the mixture was 90:5:5 (weight ratio). The capacity of the positive electrode with respect to the capacity of the negative electrode was 85%.

As a separator, polypropylene was used.

An electrolyte solution was formed by dissolving 1.2 mol/L of $LiPF_6$ in an organic solvent in which EC, DEC, and EMC were mixed at a weight ratio of 3:6:1, and adding 0.5 weight % of propanesultone (PS) and 0.5 weight % of vinylene carbonate (VC) thereto as an additive.

As an exterior body, an aluminum laminate film was used. As the aluminum laminate film, 40-μm-thick aluminum one surface of which was adhered to 25 μm-thick oriented nylon with a 3-μm-thick dry laminate layer and the other surface of which was provided with 45-μm-thick polypropylene was used.

The secondary battery which was manufactured using the above materials was charged and discharged while pressure was applied to the secondary battery.

Pressure of 10 MPa was applied in a thickness direction of the secondary battery (i.e., the direction parallel to the shortest of the length, width, and height of the exterior body of the secondary battery).

The charging and discharging was performed by CC charging and discharging (charge termination voltage is 4.6 V, discharge termination voltage is 1.5 V).

(Sample B)

Next, a negative electrode was fabricated as a sample B in a manner similar to that of the sample A, except that projections and depressions were not formed in a negative electrode current collector and a negative electrode active material layer. Then, the negative electrode incorporated in a secondary battery was charged and discharged while pressure was applied to the secondary battery in manner similar to that of the sample A.

(Sample C)

Next, a negative electrode was fabricated as a sample C in a manner similar to that of the sample B. Then, the negative electrode incorporated in a secondary battery was charged and discharged in a manner to similar to that of the sample B, except that pressure was not applied during charging and discharging.

Figure 30A:
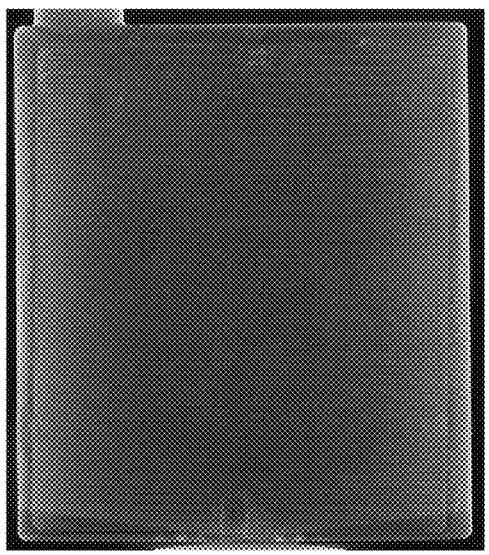
FIGS. 30A to 30C are X-ray CT images of negative electrodes after charging and discharging.
Figure 30B:
Figure 30C:
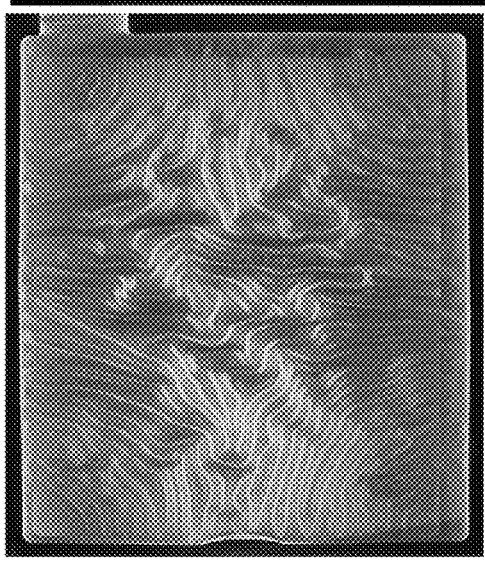

FIGS. 30A to 30C are X-ray CT images of negative electrodes of the sample A, the sample B, and the sample C manufactured in the above-described manner after being charged and discharged. FIG. 30A is an image of the sample A, FIG. 30B is an image of the sample B, and FIG. 30C is an image of the sample C.

Large wrinkles were generated in the negative electrode of the sample C which had no projections and depressions in the negative electrode current collector and the negative electrode active material layer and was not pressurized during charging and discharging. The difference in height between the peak and the valley of the wrinkle was approximately 200 μm to 300 μm, and the volume of the secondary battery was increased. Furthermore, a shadow showing accumulation of a gas generated by decomposition of an electrolyte solution was observed in deep wrinkles.

Wrinkles in the negative electrode current collector were suppressed but clearly observed in the sample B which was pressurized during charging and discharging.

On the contrary, wrinkles were not observed in the sample A which has projections and depressions in the negative electrode current collector and the negative electrode active material layer and was pressurized during charging and discharging.

Figure 31A:
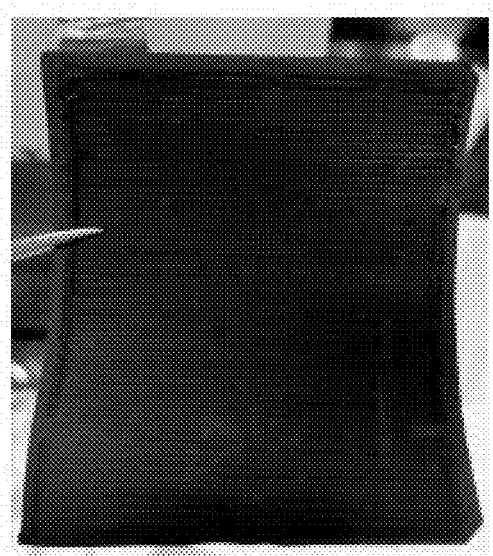
FIGS. 31A to 31C are X-ray CT images of negative electrodes after charging and discharging.
Figure 31B:
Figure 31C:
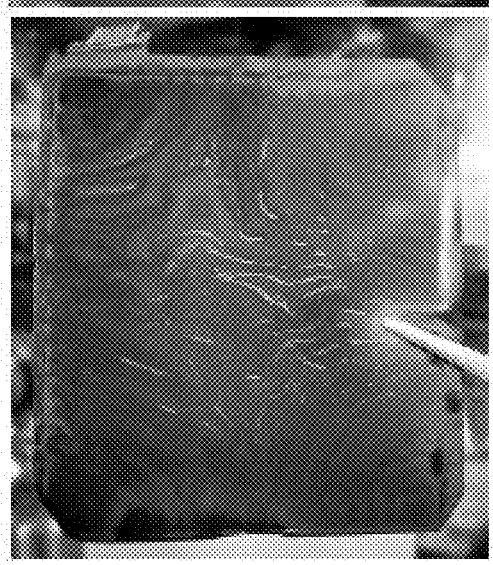

Furthermore, the negative electrodes of the sample A, the sample B, and the sample C were taken out from the secondary batteries and observed. FIG. 31A is a photograph of the negative electrode of the sample A, FIG. 31B is a photograph of the negative electrode of the sample B, and FIG. 31C is a photograph of the negative electrode of the sample C.

Portions where the negative electrode active material layer was separated along wrinkles were observed in the sample C which had no projections and depressions in the negative electrode current collector and the negative electrode active material layer and was not pressurized during charging and discharging. In addition, the color of the negative electrode active material layer was abnormal.

The defects observed in the sample C were reduced in the sample B which was pressurized during charging and discharging.

The separation of the negative electrode active material layer and the abnormal color thereof were not observed in the sample A which has projections and depressions in the negative electrode current collector and the negative electrode active material layer and was pressurized during charging and discharging.

The above-described result reveals that forming a plurality of projections and depressions in the negative electrode current collector and the negative electrode active material layer can suppress deformation of the negative electrode by absorbing expansion of the negative electrode active material due to charging.

Example 2

In this example, initial charge and discharge characteristics of the sample A and the sample B in Example 1 (i.e., the negative electrode having a plurality of projections and depressions in the negative electrode current collector and the negative electrode active material layer, and the negative electrode having no projections and depressions in the negative electrode current collector and the negative electrode active material layer) are described.

Figure 32:
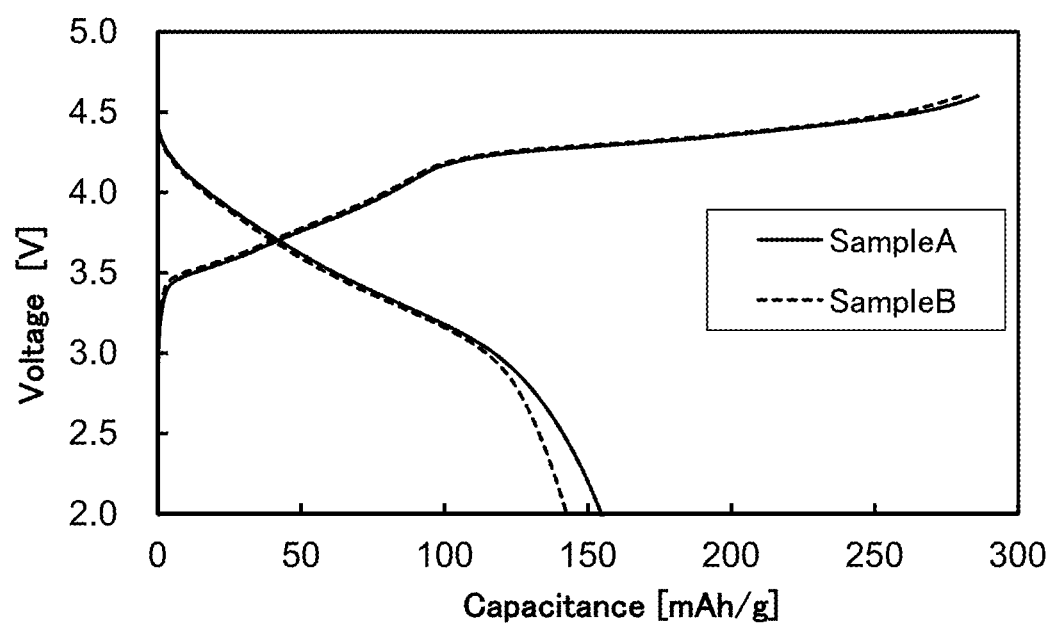
FIG. 32 is a graph showing charge and discharge characteristics of a secondary battery.

FIG. 32 shows a graph of initial charge and discharge characteristics of the sample A and the sample B described in Example 1. The solid line shows the charge and discharge characteristics of the sample A, and the dotted line shows those of the sample B. The upward curve is a charge curve, and the downward curve is a discharge curve.

The result of FIG. 32 reveals that a negative electrode having a plurality of projections and depressions in the negative electrode current collector and the negative electrode active material layer has higher discharge capacity than the negative electrode not having a plurality of projections and depressions in the negative electrode current collector and the negative electrode active material layer.

This application is based on Japanese Patent Application serial no. 2014-217229 filed with Japan Patent Office on Oct. 24, 2014, the entire contents of which are hereby incorporated by reference.

What is claimed is:

1. A secondary battery comprising:
a negative electrode;
a positive electrode;
an electrolyte solution; and
a separator,
wherein the negative electrode includes a negative electrode current collector and a negative electrode active material layer,
wherein the negative electrode current collector includes a first surface and a second surface opposite to the first surface,
wherein the negative electrode active material layer is positioned on a first surface side,
wherein the negative electrode active material layer comprises $SiO_y$ (2>y>0), and wherein the $SiO_y$ comprises an amorphous silicon,
wherein the negative electrode active material layer includes a first depression and a second depression,
wherein the negative electrode current collector includes a third depression and a fourth depression on the first surface,
wherein the negative electrode current collector includes a first projection and a second projection on the second surface,
wherein the first depression, the third depression and the first projection overlap each other,
wherein the second depression, the fourth depression and the second projection overlap each other, and
wherein, in a top view of the negative electrode, each of the first depression, the second depression, the third depression, and the fourth depression has a linear shape.

2. The secondary battery according to claim 1, wherein the negative electrode current collector is exposed at a bottom of the first depression.

3. The secondary battery according to claim 1, wherein the $SiO_y$ comprises $SiO_y$ ($0.95 \leq y \leq 1.05$).

4. The secondary battery according to claim 1, further comprising a graphene on a surface of the negative electrode active material layer.

5. A secondary battery comprising a positive electrode and a negative electrode, the negative electrode comprising:
- a negative electrode current collector; and
- a negative electrode active material layer,
- wherein the negative electrode current collector includes a first surface and a second surface opposite to the first surface,
- wherein the negative electrode active material layer is positioned on a first surface side,
- wherein the negative electrode active material layer comprises $SiO_y$ ($2>y>0$), and wherein the $SiO_y$ comprises an amorphous silicon,
- wherein the negative electrode active material layer includes a first depression and a second depression,
- wherein the negative electrode current collector includes a third depression and a fourth depression on the first surface,
- wherein the negative electrode current collector includes a first projection and a second projection on the second surface,
- wherein the first depression, the third depression and the first projection overlap each other,
- wherein the second depression, the fourth depression and the second projection overlap each other,
- wherein, in a top view of the negative electrode, a long side of the third depression and a long side of the fourth depression are parallel to a short side of the negative electrode current collector, and
- wherein a length of the long side of the third depression and a length of the long side of the fourth depression are 80% or more and 100% or less of a length of the short side of the negative electrode current collector.

6. The secondary battery according to claim 5, wherein the negative electrode current collector is exposed at a bottom of the first depression.

7. The secondary battery according to claim 5, wherein the $SiO_y$ comprises $SiO_y$ ($0.95 \leq y \leq 1.05$).

8. The secondary battery according to claim 5, further comprising a graphene on a surface of the negative electrode active material layer.

9. The secondary battery according to claim 1, wherein each of the first depression, the second depression, the third depression, and the fourth depression has a long side which is parallel to a short side of the negative electrode current collector.

10. The secondary battery according to claim 1, wherein a depth of the first depression is different from a depth of the second depression.

* * * * *